(12) United States Patent
Shirai

(10) Patent No.: US 12,175,617 B2
(45) Date of Patent: Dec. 24, 2024

(54) INFORMATION PROCESSING SYSTEM AND METHOD FOR JUDGING WHETHER TO ALLOW A MOBILE MEDIUM TO MOVE WITHIN A VIRTUAL SPACE

(71) Applicant: GREE, Inc., Tokyo (JP)

(72) Inventor: Akihiko Shirai, Kanagawa (JP)

(73) Assignee: GREE, INC., Tokyo (JP)

( * ) Notice: Subject to any disclaimer, the term of this patent is extended or adjusted under 35 U.S.C. 154(b) by 147 days.

(21) Appl. No.: 17/956,874

(22) Filed: Sep. 30, 2022

(65) Prior Publication Data

US 2023/0092494 A1     Mar. 23, 2023

Related U.S. Application Data

(63) Continuation of application No. PCT/JP2021/043166, filed on Nov. 25, 2021.

(30) Foreign Application Priority Data

Nov. 27, 2020 (JP) ................................. 2020-197316
Dec. 1, 2020 (JP) ................................. 2020-199677

(51) Int. Cl.
*G06T 19/00* (2011.01)
*G06F 21/31* (2013.01)
*G06T 19/20* (2011.01)

(52) U.S. Cl.
CPC .............. *G06T 19/20* (2013.01); *G06F 21/31* (2013.01); *G06T 19/003* (2013.01); *G06T 2219/024* (2013.01); *G06T 2219/2004* (2013.01)

(58) Field of Classification Search
None
See application file for complete search history.

(56) References Cited

U.S. PATENT DOCUMENTS

| 2005/0181872 A1 | 8/2005 | Acharya et al. |
| 2009/0144282 A1* | 6/2009 | Uramoto ............. G06F 21/6218 |
| | | 707/999.009 |
| 2010/0077034 A1 | 3/2010 | Alkov et al. |

FOREIGN PATENT DOCUMENTS

| JP | 2001-014409 A | 1/2001 |
| JP | 2003-067317 A | 3/2003 |

(Continued)

OTHER PUBLICATIONS

Office Action issued on May 16, 2023, in corresponding Japanese patent Application No. 2022-053097, 4 pages.

(Continued)

*Primary Examiner* — Martin Mushambo
(74) *Attorney, Agent, or Firm* — XSENSUS LLP

(57) ABSTRACT

An information processing system comprises processing circuitry configured to render a virtual space; render each mobile medium associated with each user, each mobile medium being able to move within the virtual space; associate designated movement authority information to a first mobile medium, the first mobile medium being associated with a first user based on a first input from the first user; switch the designated movement authority information from association with the first mobile medium to association with a second mobile medium, the second mobile medium being associated with a second user different from the first user and based on a second input from the first user; and judge, based on the designated movement authority information, whether to allow one mobile medium to move toward a designated position within the virtual space.

17 Claims, 35 Drawing Sheets

(56) References Cited

FOREIGN PATENT DOCUMENTS

| JP | 2004-267433 A | | 9/2004 |
|---|---|---|---|
| JP | 2007-523572 A | | 8/2007 |
| JP | 2008-107895 A | | 5/2008 |
| JP | 2009-134653 A | | 6/2009 |
| JP | 2011154419 A | * | 8/2011 |
| JP | 2012-008638 A | | 1/2012 |
| JP | 2014-529792 A | | 11/2014 |
| JP | 2019-192178 A | | 10/2019 |
| JP | 2020-110376 A | | 7/2020 |

OTHER PUBLICATIONS

Phantasy Star Online 2 Episode 4 Start Guidebook, Kadokawa Co., Ltd., Feb. 10, 2016, p. 28-29.

Office Action issued on May 30, 2023, in corresponding Japanese patent Application No. 2021-206590, 7 pages.

International Search Report and Written Opinion mailed on Jan. 25, 2022, received for PCT Application PCT/JP2021/043166, filed on Nov. 25, 2021, 7 pages including English Translation.

Notice of Reasons for Refusal mailed on Jan. 18, 2020, received for JP Application 2020-197316, 5 pages Including English Translation.

Reconsideration Report by Examiner before Appeal received for Japanese Patent Application No. 2022-053097, mailed on Feb. 16, 2024, 6 pages.

Office Action issued Oct. 1, 2024 in Japanese Patent Application No. 2023-191437.

Office Action issued Oct. 22, 2024 in Japanese Patent Application No. 2023-208068.

\* cited by examiner

FIG. 8

| Ticket ID | Designated position | Owner ID | Purchase information | Transfer authentication information | Ticket-taking authentication information | Transfer information | Validity flag | Ticket-taker ID | Ticket-taking information | ... |
|---|---|---|---|---|---|---|---|---|---|---|
| TC01 | *** | U01 | *** | *** | *** | *** | 1 | *** | *** | ... |
| TC02 | *** | U01 | *** | *** | *** | *** | 1 | *** | *** | ... |
| TC03 | *** | U08 | *** | ... | ... | ... | 0 | ... | ... | ... |
| ... | ... | ... | ... | ... | ... | ... | ... | ... | ... | ... |

FIG. 9

| Entering user | Ticket ID | Provided content | ... |
|---|---|---|---|
| U 0 1 | ＊＊＊ | ＊＊＊ | ... |
| U 0 2 | ＊＊＊ | ＊＊＊ | ... |
| ... | ... | ... | ... |

900

| Operation staff | ... |
|---|---|
| S U 0 1 | ... |
| S U 0 2 | ... |
| ... | ... |

902

INFORMATION PROCESSING SYSTEM AND METHOD FOR JUDGING WHETHER TO ALLOW A MOBILE MEDIUM TO MOVE WITHIN A VIRTUAL SPACE

CROSS-REFERENCE TO RELATED APPLICATIONS

This application is a bypass continuation of and claims priority to PCT/JP2021/043166, filed Nov. 25, 2021, which claims priority to JP 2020-197316, filed Nov. 27, 2020, and JP 2020-199677, filed Dec. 1, 2020, and the contents of each of which is hereby incorporated by reference in their entirety.

BACKGROUND

Conventionally, a ticket ID that specifies a ticket according to a ticket purchase application from a user terminal is associated with a user ID. The IDs are registered into a database. The database is referenced with respect to inquiries according to a user ID and a content ID from a server. Transmissions to the server are made so that content is provided to the user ID on a condition that a ticket ID and a user ID corresponding to the content ID exist.

SUMMARY

In one aspect of the present disclosure, an information processing system comprises processing circuitry. The processing circuitry is configured to render a virtual space: render each mobile medium associated with each user, each mobile medium being able to move within the virtual space: associate designated movement authority information to a first mobile medium, the first mobile medium being associated with a first user based on a first input from the first user: switch the designated movement authority information from association with the first mobile medium to association with a second mobile medium, the second mobile medium being associated with a second user different from the first user and based on a second input from the first user; and judge, based on the designated movement authority information, whether to allow one mobile medium to move toward a designated position within the virtual space.

BRIEF DESCRIPTION OF THE DRAWINGS

FIG. 8 is a diagram for describing data in a ticket information memory unit.

FIG. 9 is a diagram for describing data in a spatial state memory unit.

DETAILED DESCRIPTION

The inventors have recognized that, with conventional technology, it is difficult to transfer, form one user to another user, information on authority to move to a location that provides specific content, such as a ticket, safely using a simple configuration.

The inventors have developed the technology in this disclosure to make it easier and safer to transfer, from one user to another user, movement authority information.

In accordance with the present disclosure, an information processing unit that includes a space rendering processor that renders a virtual space: a medium rendering processor that renders each mobile medium associated with each user, each mobile medium being able to move within the virtual space: a first movement authority processor that associates designated movement authority information to a first mobile medium associated with a first user based on a first input from the first user: a second movement authority processor that switches an association of the designated movement authority information associated with the first mobile medium by the first movement authority processor to a second mobile medium associated with a second user different from the first user based on a second input from the first user; and a judging processor that judges whether to allow one mobile medium to move toward a designated position within the virtual space based on whether or not the designated movement authority information is associated with the one mobile medium.

Each embodiment will be described in detail below with reference to the attached drawings.

Embodiment 1

(Overview of a Virtual Reality Generating System)

Figure 1:
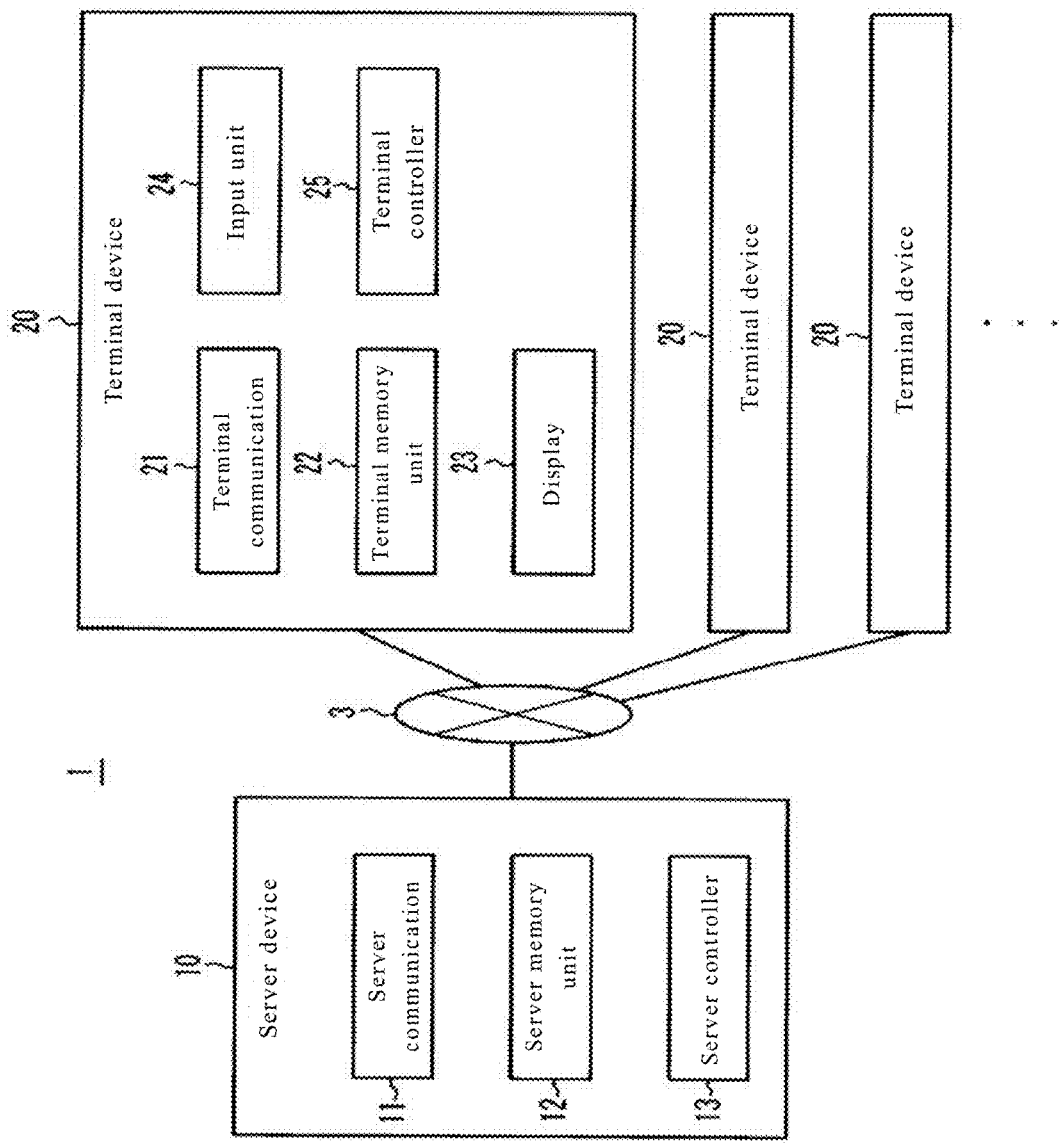
FIG. 1 is a block diagram of a virtual reality generating system according to the present embodiment.

An overview of a virtual reality generating system 1 according to an embodiment will be described with reference to FIG. 1. FIG. 1 is a block diagram of the virtual reality generating system 1 according to the present embodiment. The virtual reality generating system 1 includes a server device 10 and at least one terminal device 20. For the sake of simplicity, three of the terminal devices 20 are illustrated in FIG. 1, however, there may be any number of the terminal devices 20 so long as there are two or more.

The server device 10 is an information processor such as a server, or the like, managed by an operator that provides, for example, one or more virtual realities. The terminal device 20 is an information processor, for example, a cell phone, a smartphone, a tablet terminal, a Personal Computer (PC), a head-mounted display, or a game device, or the like, used by a user. A plurality of the terminal devices 20 can be connected to the server device 10 through a network 3 by a mode that typically differs by user.

The terminal device 20 is able to execute a virtual reality application according the present embodiment. The virtual reality application may be received by the terminal device 20 from the server device 10 or a designated application distribution server through the network 3, or, may be pre-recorded in a memory device included in the terminal device 20 or in a memory medium, such as a memory card, or the like, that the terminal device 20 can read. The server device 10 and the terminal device 20 are communicatively connected through the network 3. For example, the server device 10 and the terminal device 20 operate jointly to execute various processes related to a virtual reality.

Note that the network 3 may include a wireless communication network, the Internet, a Virtual Private Network (VPN), a Wide Area Network (WAN), a wired network, or any combination, or the like, thereof.

An overview of the virtual reality according to the present embodiment will be described here. The virtual reality according to the present embodiment is a virtual reality, or the like, relating to any reality such as, for example, education, travel, role playing, a simulation, or entertainment, or the like, such as a concert, and a virtual reality medium such as an avatar is used in conjunction with the execution of the virtual reality. For example, the virtual reality according to the present embodiment is realized by a 3D virtual space, various types of virtual reality media appearing in the virtual space, and various types of content provided in the virtual space.

A virtual reality medium is electronic data used in the virtual reality including, for example, a card, an item, a point, a currency in a service (or a currency in a virtual reality), a ticket, a character, an avatar, a parameter, or the like. Furthermore, the virtual reality medium may be virtual reality-related information such as level information, status information, virtual reality parameter information (a physical strength value, attack power, or the like), or ability information (a skill, an ability, a spell, a job, or the like). The virtual reality medium is also electronic data that can be acquired, owned, used, managed, exchanged, combined, strengthened, sold, disposed, granted, or the like, within virtual reality by a user, and a use mode of the virtual reality medium is not limited to that specified in the present specification.

In the present embodiment, users include a general user and a staff user (an example of a third user). The general user is a user who is not involved in operating the virtual reality generating system 1, and the staff user is a user who is involved in operating the virtual reality generating system 1. The staff user takes a role (of agent) of supporting the general user within the virtual reality. The staff user includes, for example, a user referred to as a so-called game master. Below, unless otherwise stated, the user refers to both the general user and the staff user.

Furthermore, the user may also include a guest user. The guest user may be an artist or influencer, or the like, who operates a guest avatar that functions as content (content provided by the server device 10) to be describe later. Note that there may be cases where some of the staff users become the guest users, and there may be cases where not all user attributes are clear.

Content (content provided in the virtual reality) provided by the server device 10 can come in any variety and in any volume, however, as one example in the present embodiment, the content provided by the server device 10 may include digital content such as various types of video. The video may be video in real time, or video not in real time. Furthermore, the video may be video based on actual images or video based on Computer Graphics (CG). The video may be video for providing information. In such cases, the video may be related to a specific genre of information providing services (information providing services related to travel, living, food, fashion, health, beauty, or the like), broadcasting services (e.g., YouTube (registered trademark)) by a specific user, or the like.

Furthermore, as one example in the present embodiment, the content provided by the server device 10 may include guidance, advice, or the like, to be described later, from the staff user. For example, the content may include guidance, advice, or the like, from a dance teacher as content provided by means of a virtual reality relating to a dance lesson. In this case, the dance teacher becomes the staff user, a student thereof becomes the general user, and the student is able to receive individual guidance from the teacher in the virtual reality.

Furthermore, in another embodiment, the content provided by the server device 10 may be various types of performances, talk shows, meetings, gatherings, or the like, by one or more of the staff users or the guest users through a staff avatar m2 or a guest avatar, respectively.

A mode for providing content in the virtual reality may be any mode, and, for example, if the content is video, the video is rendered on a display of a display device (virtual reality medium) within the virtual space. Note that the display device in the virtual space may be of any form, such as a screen set within the virtual space, a large-screen display set within the virtual space, a display, or the like, of a mobile terminal within the virtual space.

(Configuration of the Server Device)

A specific description of the server device 10 is provided next. The server device 10 is configured of a server computer. The server device 10 may be realized through joint operation of a plurality of server computers. For example, the server device 10 may be realized through joint operation of a server computer that provides various types of content, a server computer that realizes various types of authentication servers, and the like. The server device 10 may also include a web server. In this case, some of the functions of the terminal device 20 to be described later may be executed by a browser processing an HTML document, or various types of similar programs (JavaScript), received from the web server.

The server device 10 includes a server communication unit 11, a server memory unit 12, and a server controller 13. Server device 10 and its components may include, be encompassed by or be a component of control circuitry and/or processing circuitry. Further, the functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor. The server communication unit 11 includes an interface that sends and receives information by communicating wirelessly or by wire with an external device. The server communication unit 11 may include, for example, a wireless Local Area Network (LAN) communication module, a wired LAN communication module, or the like. The server communication unit 11 is able to transmit and receive information to and from the terminal device 20 through the network 3.

The server memory unit 12 is, for example, a memory device that stores various information and programs necessary for various types of processes relating to a virtual reality. For example, the server memory unit 12 stores a virtual reality application.

The server memory unit 12 also stores data for rendering a virtual space, for example, an image, or the like, of an indoor space such as a building or an outdoor space. Note that a plurality of types of data for rendering the virtual space may be prepared and properly used for each virtual space.

The server memory unit 12 also stores various images (texture images) to be projected (texture mapping) on various objects arranged within a 3D virtual space.

For example, the server memory unit 12 stores rendering information of a user avatar m1 as a virtual reality medium associated with each user. The user avatar m1 is rendered in the virtual space based on the rendering information of the user avatar m1.

The server memory unit 12 also stores rendering information for the staff avatar m2 as a virtual reality medium associated with each of the staff users. The staff avatar m2 is rendered in the virtual space based on the rendering information of the staff avatar m2.

The server memory unit 12 also stores rendering information relating to various types of objects that are different from the user avatar m1 and the staff avatar m2, such as, for example, a building, a wall, a tree, a shrub, or a Non-Player Character (NPC), or the like. These various types of objects are rendered within the virtual space based on relevant rendering information.

Below, an object corresponding to any virtual medium (e.g., a building, a wall, a tree, a shrub, or an NPC, or the like) that is different from the user avatar m1 and the staff avatar m2, and that is rendered within the virtual space, is referred to as a second object m3. Note that, in the present embodiment, the second object may include an object fixed within the virtual space, a mobile object within the virtual space, or the like. The second object may also include an object that is always arranged within the virtual space, an object that is arranged therein only in a case where designated conditions have been met, or the like.

The server controller 13 may include a dedicated microprocessor, a Central Processing Unit (CPU) that executes a specific function by reading a specific program, a Graphics Processing Unit (GPU), or the like. For example, the server controller 13, operating jointly with the terminal device 20, executes the virtual reality application corresponding to a user operation with respect to a display 23 of the terminal device 20. The server controller 13 also executes various processes relating to the virtual reality.

For example, the server controller 13 renders the user avatar m1, the staff avatar m2, and the like, together with the virtual space (image), which are then displayed on the display 23. The server controller 13 also moves the user avatar m1 and the staff avatar m2 within the virtual space in response to a designated user operation. The specific processes of the server controller 13 will be described in detail later.

(Configuration of the Terminal Device)

The configuration of the terminal device 20 will be described. As is illustrated in FIG. 1, the terminal device 20 includes a terminal communication unit 21, a terminal memory unit 22, the display 23, an input unit 24, and a terminal controller 25. Terminal device 20 and its components may include, be encompassed by or be a component of control circuitry and/or processing circuitry.

The terminal communication unit 21 includes an interface that sends and receives information by communicating wirelessly or by wire with an external device. The terminal communication unit 21 may include a wireless communication module, a wireless LAN communication module, a wired LAN communication module, or the like, that supports a mobile communication standard such as, for example, Long Term Evolution (LTE) (registered trademark), LTE-Advanced (LTE-A), a fifth-generation mobile communication system, Ultra Mobile Broadband (UMB), or the like. The terminal communication unit 21 is able to transmit and receive information to and from the server device 10 through the network 3.

The terminal memory unit 22 includes, for example, a primary memory device and a secondary memory device. For example, the terminal memory unit 22 may include semiconductor memory, magnetic memory, optical memory, or the like. The terminal memory unit 22 stores various information and programs that are received from the server device 10 and used in processing a virtual reality. The information and programs used in processing the virtual reality are acquired from the external device through the terminal communication unit 21. For example, a virtual reality application program may be acquired from a designated application distribution server. Below, the application program is also referred to simply as the application. Furthermore, part or all of, for example, information relating to a user, information relating to a virtual reality medium of a different user, or the like, as described above, may be acquired from the server device 10.

The display 23 includes a display device such as, for example, a liquid crystal display, an organic Electro-Luminescence (EL) display, or the like. The display 23 is able to display various images. The display 23 is configured of, for example, a touch panel that functions as an interface that detects various user operations. Note that the display 23 may be in the form of a head mounted display.

The input unit 24 includes, for example, an input interface that includes the touch panel provided integrally with the display 23. The input unit 24 is able to accept user input for the terminal device 20. The input unit 24 may also include a physical key, as well as any input interface, including a pointing device such as a mouse, or the like. Furthermore, the input unit 24 may be capable of accepting contactless user input such as audio input or gesture input. Note that the gesture input may use a sensor (image sensor, acceleration sensor, distance sensor, or the like) for detecting a physical movement of a user body.

The terminal controller 25 includes one or more processors. The terminal controller 25 controls the overall movement of the terminal device 20.

The terminal controller 25 sends and receives information through the terminal communication unit 21. For example, the terminal controller 25 receives various types of information and programs used in various types of processes relating to the virtual reality from, at least, either the server device 10 or a different external server. The terminal controller 25 stores the received information and programs in the terminal memory unit 22. For example, a browser (Internet browser) for connecting to a web server may be stored in the terminal memory unit 22.

The terminal controller 25 starts the virtual reality application based on a user operation. The terminal controller 25, operating jointly with the server device 10, executes various types of processes relating to the virtual reality. For example, the terminal controller 25 displays an image of a virtual space on the display 23. For example, a Graphic User Interface (GUI) that detects the user operation may be displayed on a screen. The terminal controller 25 is able to detect the user operation with respect to the screen through the input unit 24. For example, the terminal controller 25 is able to detect a user tap operation, long tap operation, flick operation, swipe operation, and the like. The tap operation involves the user touching the display 23 with a finger and then lifting the finger off therefrom. The terminal controller 25 sends operation information to the server device 10.

Examples of a Virtual Reality

The server controller 13, operating jointly with the terminal device 20, displays an image of a virtual space on the display 23, and then updates the image of the virtual space based on progress of a virtual reality and a user operation. In the present embodiment, the server controller 13, operating jointly with the terminal device 20, renders an object arranged in a 3D virtual space expressed as seen from a virtual camera arranged in the virtual space.

Note that although the rendering process described below is realized by the server controller 13, in another embodiment, all or part of the rendering process described below may be realized by the server controller 13. For example, in the description below, at least part of the image of the virtual space displayed on the terminal device 20 may be a web display displayed on the terminal device 20 based on data generated by the server device 10, and at least part of a screen may be a native display displayed through a native application installed on the terminal device 20.

Figure 2A:
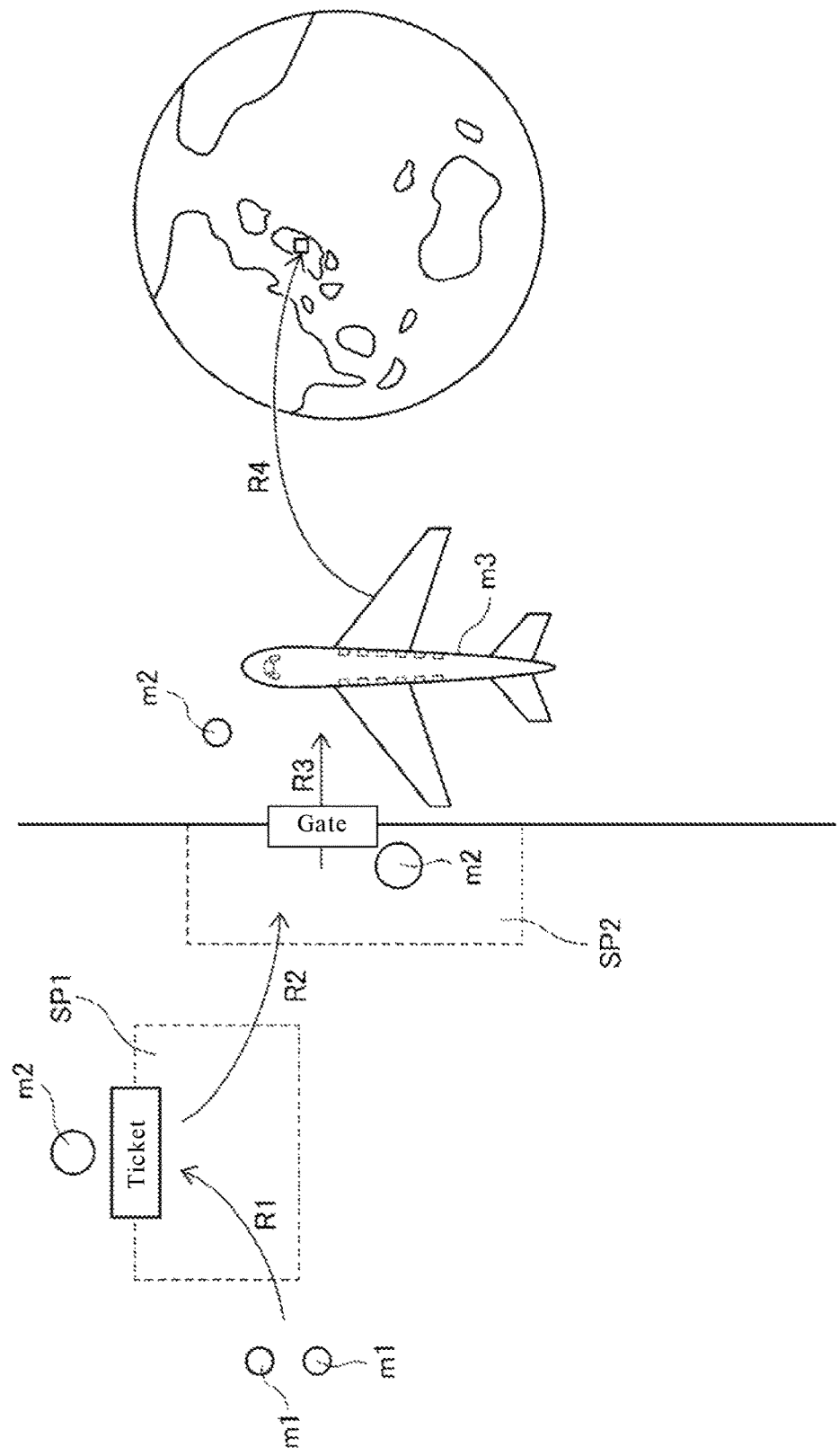
FIG. 2A is an explanatory drawing of an example of a virtual reality that can be generated by the virtual reality generating system.
Figure 2B:
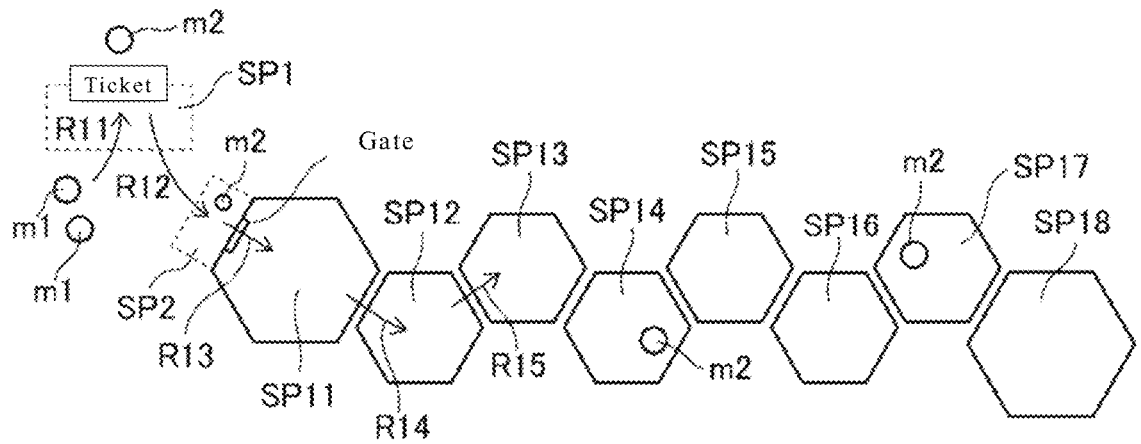
FIG. 2B is an explanatory drawing of another example of a virtual reality that can be generated by the virtual reality generating system.
Figure 2C:
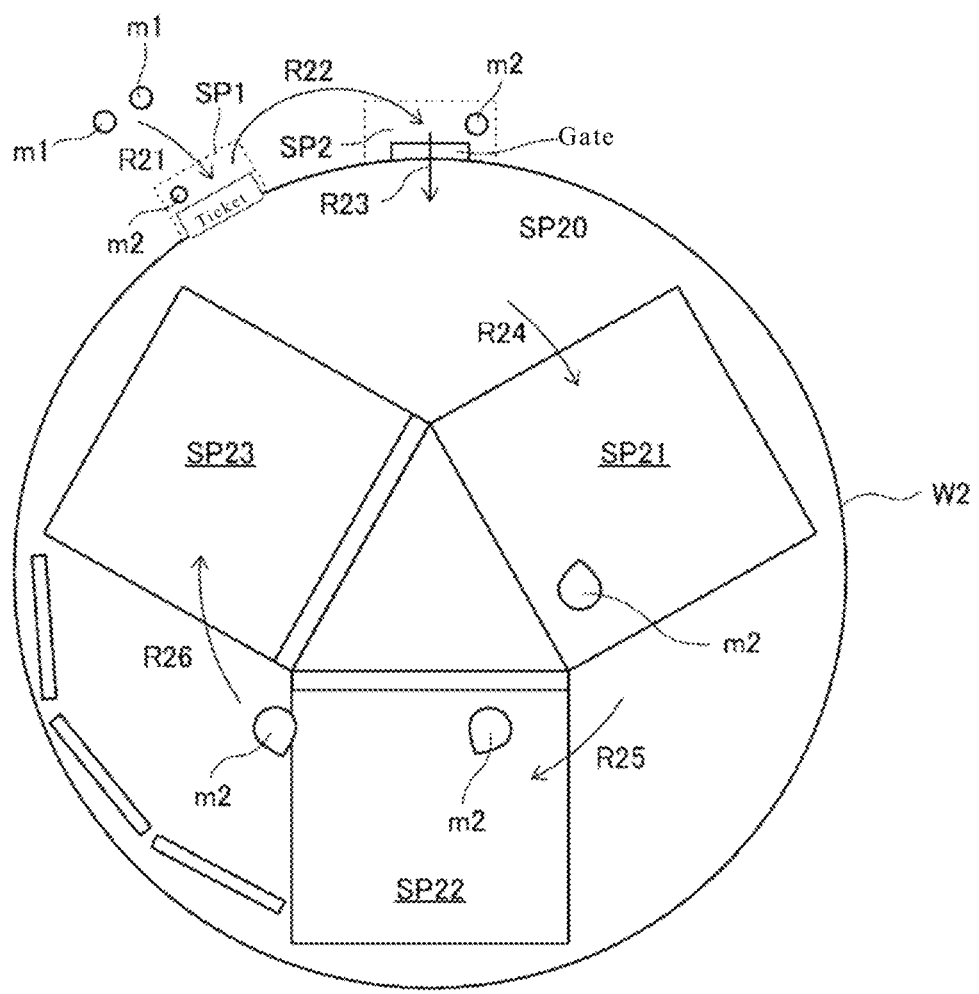
FIG. 2C is an explanatory drawing of yet another example of a virtual reality that can be generated by the virtual reality generating system.

FIG. 2A through FIG. 2C are explanatory drawings of several examples of the virtual reality that can be generated by the virtual reality generating system 1.

FIG. 2A is an explanatory drawing of a virtual reality relating to travel, and a conceptual drawing of a virtual space when viewed in a plane. In this case, a position SP1 for purchasing and receiving a ticket (in this case an airline ticket, or the like) and a position SP2 near a gate have been set within the virtual space. FIG. 2A illustrates the user avatar m1 that is associated with two separate users.

Figure 3:
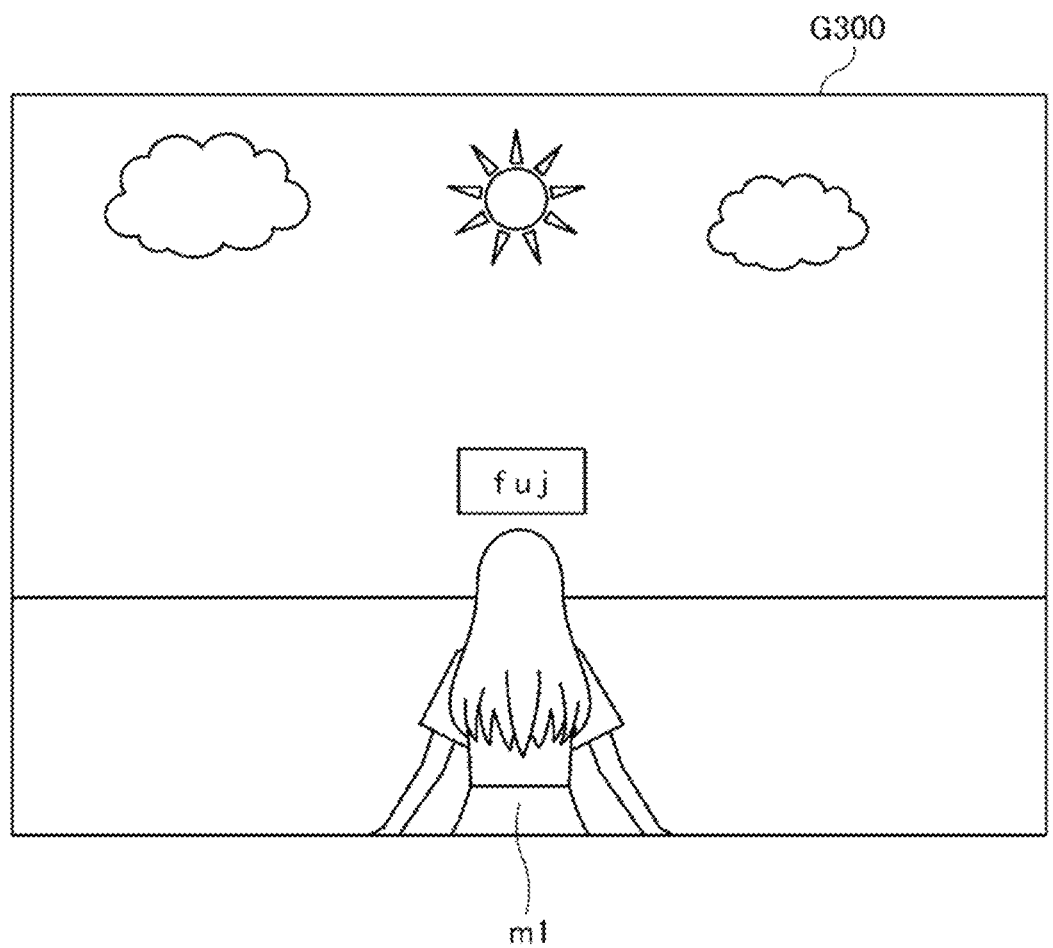
FIG. 3 is an explanatory drawing of an image of a user avatar positioned within a virtual space.

The two users decide to travel together in the virtual reality and to enter into the virtual space, each through the user avatar m1. Then, the two users, each through the user avatar m1, obtain the ticket (see arrow R1) at the position SP1, arrive at (see arrow R2) the position SP2, and then, pass through (see arrow R3) the gate and board an airplane (the second object m3). Then, the airplane takes off and arrives at a desired destination (see arrow R4). During this time, the two users experience the virtual reality, each through the terminal device 20 and the display 23. For example, an image G300 of the user avatar m1 positioned within the virtual space relating to the desired destination is illustrated in FIG. 3. Thus, the image G300 may be displayed on the terminal device 20 of the user relating to the user avatar m1. In this case, the user can move and engage in sightseeing, or the like, within the virtual space through the user avatar m1 (to which the user name "fuj" has been assigned). FIG. 2B is an explanatory drawing of a virtual reality relating to education, and a conceptual drawing of a virtual space when viewed in a plane. In this case too, the position SP1 for purchasing and receiving the ticket (in this case an admission ticket, or the like) and the position SP2 near the gate have been set within the virtual space. FIG. 2B illustrates the user avatars m1 that are associated with two separate users.

The two users have decided to receive specific education in the virtual reality and to enter into the virtual space, each through the user avatar m1. Then, the two users, each through the user avatar m1, obtain the ticket (see arrow R11) at the position SP1, proceed (see arrow R12) to the position SP2, and then, pass through (see arrow R13) the gate and arrive at a first position SP11. A specific first content is provided at the first position SP11. Next, the two users, each through the user avatar m1, arrive at (see arrow R14) a second position SP12, receive provision of a specific second content, then arrive at (see arrow R15) a third position SP13, and receive provision of a specific third content, the same following thereafter. A learning effect of the specific second content is enhanced by being provided after receipt of the specific first content, and a learning effect of the specific third content is enhanced by being provided after receipt of the second specific content.

For example, in the case of software that uses certain 3D modeling, the education may be a condition where a first content includes an install link image, or the like, for the software: a second content includes an install link movie, or the like, for an add on; a third content includes an initial settings movie; and a fourth content includes a basic operations movie.

In the example illustrated in FIG. 2B, each user (teachers for example), by moving, in order, through the user avatar m1 from the first position SP11 to an eighth position SP18 to receive the provision of various types of content in order, are able to receive specific education by a mode through which a high learning effect can be obtained. Or, the various types of content may be tasks on a quiz, or the like, in which case, in the example illustrated in FIG. 2B, a game such as Sugoroku or an escape game can be offered.

FIG. 2C is an explanatory drawing of a virtual reality relating to a lesson, and a conceptual drawing of a virtual space when viewed in a plane. In this case too, the position SP1 for purchasing and receiving the ticket (in this case an admission ticket, or the like) and the position SP2 near the gate have been set within the virtual space. FIG. 2C illustrates the user avatars m1 that are associated with the two separate users.

The two users decide to receive a specific lesson in the virtual reality and to enter into the virtual space, each through the user avatar m1. Then, the two users, each through the user avatar m1, obtain the ticket (see arrow R21) at the position SP1, arrive at (see arrow R22) the position SP2, and then, pass through (see arrow R23) the gate and arrive at a position SP20. The position SP20 corresponds to each position within a free space that excludes positions SP21, SP22, SP23, or the like, said positions corresponding to each stage, in an area surrounded by, for example, a round peripheral wall W2. When the users, each through the user avatar m1, arrive at (see arrow R24) a first position SP21 corresponding to a first stage, the users receive provision of a first content for the lesson at the first position SP21. Furthermore, when the users, each through the user avatar m1 in same way, arrive at (see arrow R25) a second position SP22 corresponding to a second stage, the users receive provision of a second content for the lesson at the second position SP22, and, when the users arrive at (see arrow R26) a third position SP23 corresponding to a third stage, the users receive provision of a third content for the lesson at the third position SP23.

For example, in a case where the lesson is a golf lesson, the first content for the lesson may be a video describing points for improving the users' golf swings, the second content for the lesson may be to practice a sample swing by the staff user who is a professional golfer, and the third content for the lesson may be advice from the staff user who is a professional golfer on practice of the users' swings. Note that the practice of the sample swing by the staff user is realized by the staff avatar m2, and that the practice of the users' swings is realized by the user avatar m1. For example, when the staff user actually performs a movement of a swing, that movement is reflected in the movement of the staff avatar m2 based on data (e.g., gesture input data) of the movement. The advice from the staff user may be realized using a chart, or the like. Thus, each of the users, can receive each various types of lessons, for example together at home, or the like, with a friend, from a teacher (in this case, a professional golfer) in the virtual reality at an adequate pace and in adequate depth.

Thus, in the present embodiment, as is illustrated in FIG. 2A through FIG. 2C, a user can receive provision of useful content in a virtual reality at a designated position through the user avatar m1, at a time required by, and in a viewing format of, each user.

By the way, just as in reality, a mechanism is required for ensuring that only a user who has satisfied certain conditions can receive provision of content in the virtual reality as well. For example, in reality, for a person to arrive at a position where it is possible to receive provision of a given content (e.g., of an experience in an amusement park), the person must sometimes pay a price for the content and obtain a ticket. In this case, for example, in a case of a parent with a child, the parent buys a ticket for the child and enters a venue to a position (e.g., inside a facility, or the like) where the provision of the given content can be received together with the child.

In the case of the virtual reality as well, just as in reality, when a plurality of users is to receive the provision of content together in the virtual reality, convenience is enhanced when one user is able to obtain a movement authority, such as a ticket, for companion users so that all users can enter to a position (e.g., within a facility, or the like) where the provision of relevant content can be received.

However, in the case of the virtual reality, unlike reality, a plurality of users scheduled to accompany one another need not, in reality, be near each other, and are typically unable to make physical contact.

Thus, in the present embodiment, the virtual reality generating system 1 realizes a mechanism or a function (hereinafter, a "ticket transferring function") in the virtual reality that enables the transfer of movement authority information that indicates this type of movement authority between users safely and with a reduced operational load. This ticket transferring function is described in detail below.

Although the server device 10 that relates to the ticket transferring function realizes an example of an information processing system in the following, as is described later, each element (see FIG. 1) of one specific terminal device 20 may realize an example of an information processing system, and a plurality of terminal devices 20, operating jointly, may realize an example of an information processing system. Furthermore, one server device 10 and one or more terminal devices 20 may, operating jointly, realize an example of an information processing system.

Detailed Description of the Ticket Transferring Function

Figure 4:
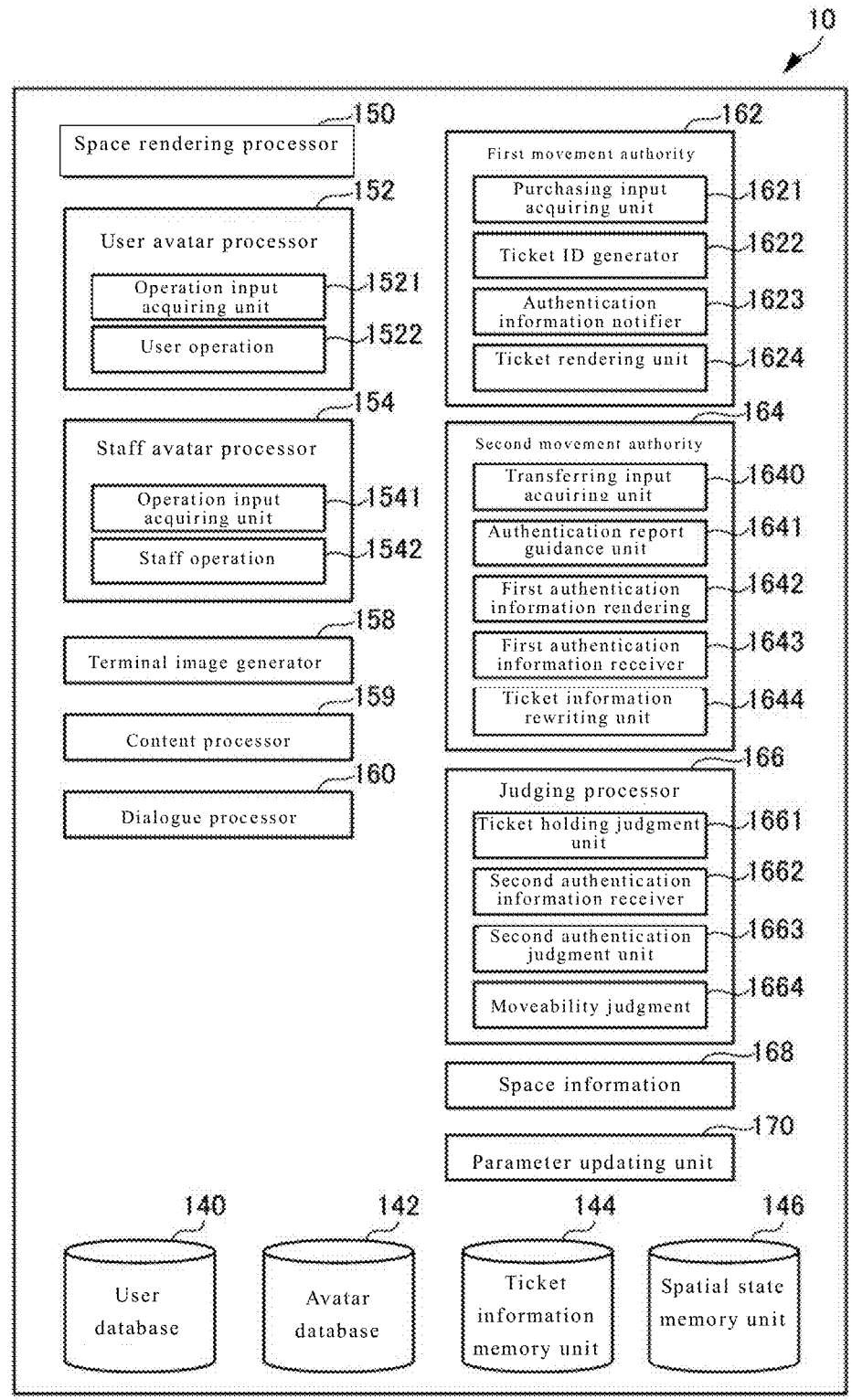
FIG. 4 is an example of a functional block diagram of a server device related to a ticket transferring function.
Figure 5:
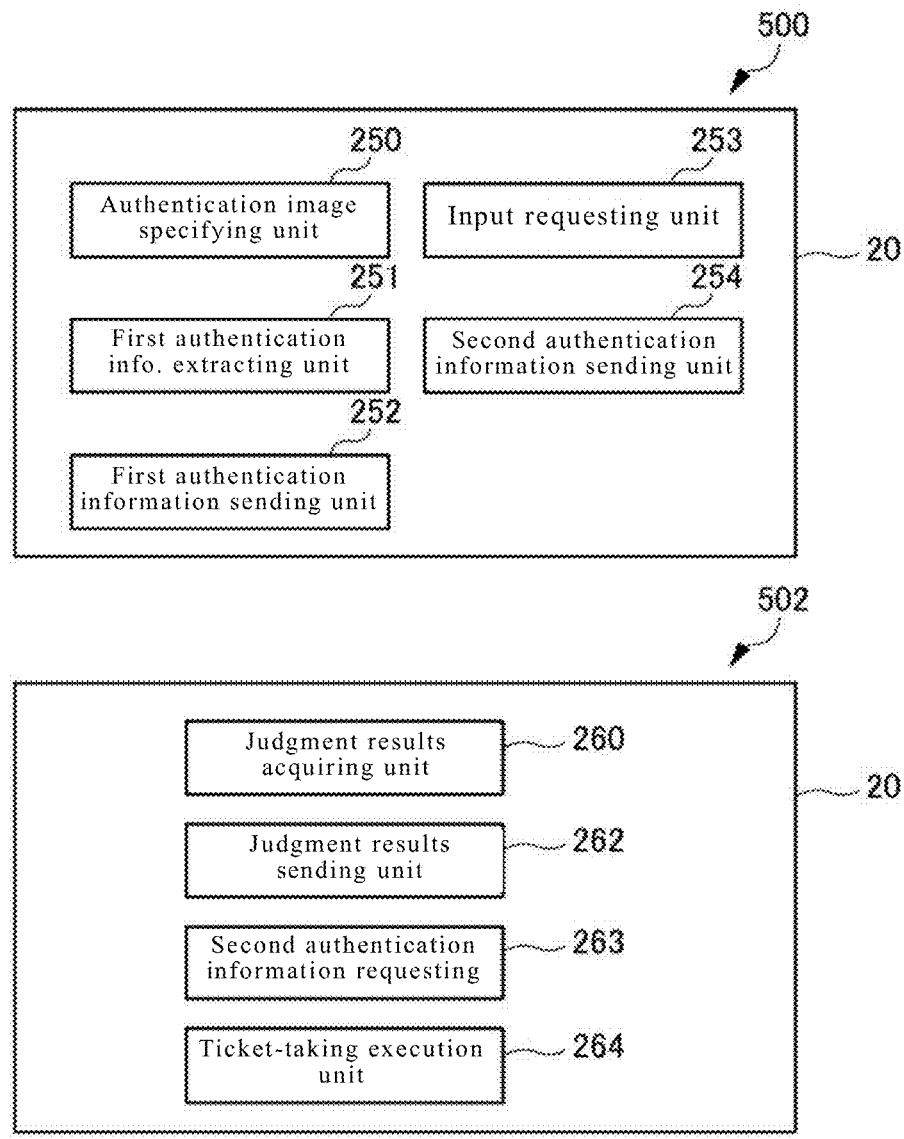
FIG. 5 is an example of a functional block diagram of a terminal device (a terminal device on a transfer receiving side) related to a ticket transferring function.
Figure 6:
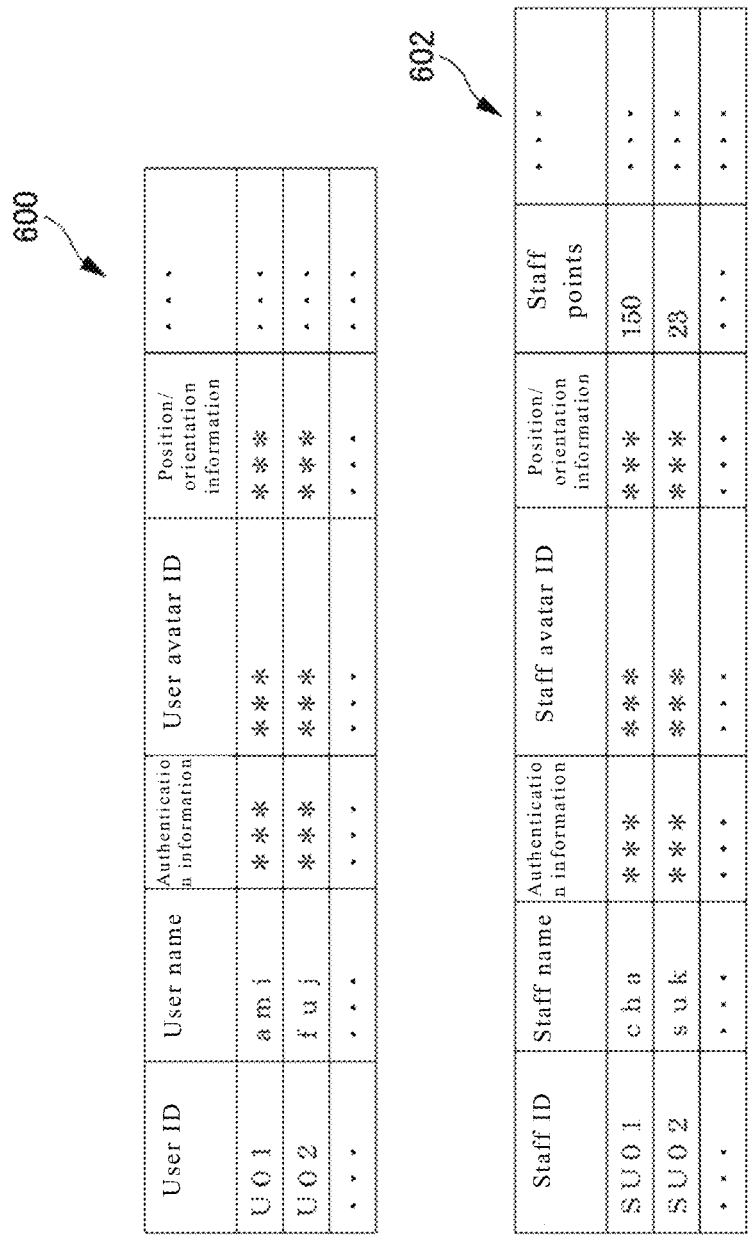
FIG. 6 is a diagram for describing data in a user database.
Figure 7:
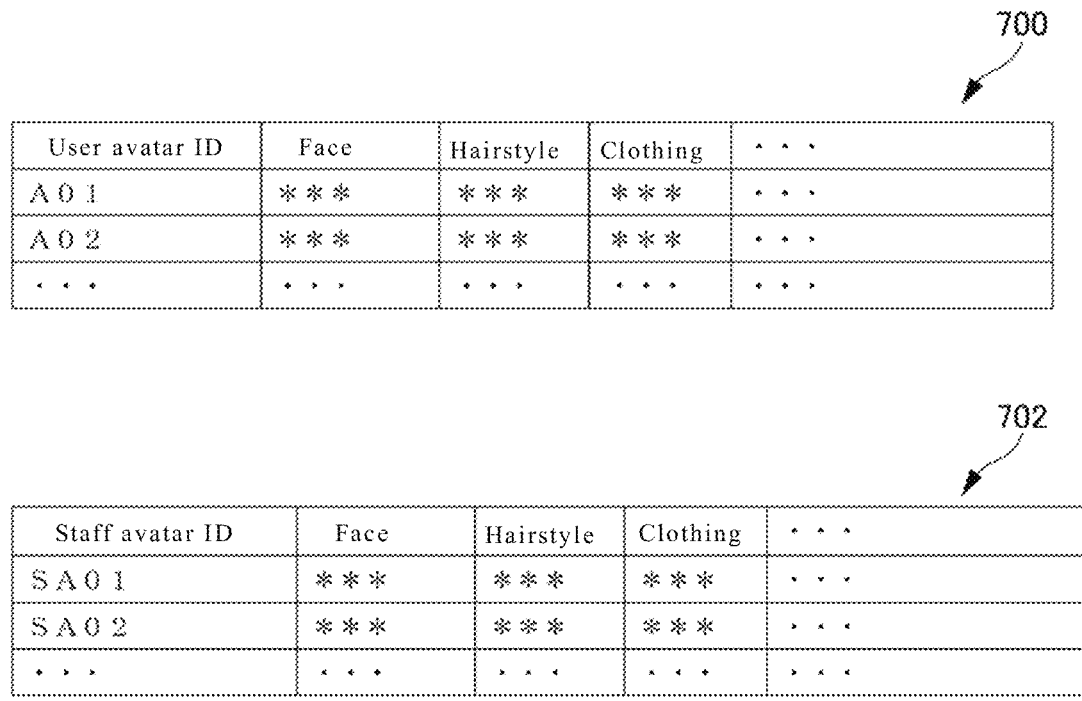
FIG. 7 is a diagram for describing data in an avatar database.

FIG. 4 is an example of a functional block diagram of the server device 10 related to the ticket transferring function. FIG. 5 is an example of a functional block diagram of the terminal device 20 (the terminal device 20 on a transfer receiving side) related to a ticket transferring function. FIG. 6 is a diagram for describing data in a user database 140. FIG. 7 is a diagram for describing data in an avatar database 142. FIG. 8 is a diagram for describing data in a ticket information memory unit 144. FIG. 9 is a diagram for describing data in a spatial state memory unit 146. Note that, in FIG. 6 through FIG. 9, "***" indicates a state in which some sort of information is stored, that "−" indicates a state in which no information is stored, and that " . . . " indicates repetition of the same.

As is illustrated in FIG. 4, the server device 10 includes the user database 140, the avatar database 142, the ticket information memory unit 144, the spatial state memory unit 146, a space rendering processor 150, a user avatar processor 152, a staff avatar processor 154, a terminal image generator 158 (an example of the medium rendering processor), a content processor 159, a dialogue processor 160, a first movement authority processor 162, a second movement authority processor 164, a judging processor 166, a space information generator 168, and a parameter updating unit 170. As discussed above, each sub-component of server device 10 and each processor may include, be encompassed by or be a component of control circuitry and/or processing circuitry.

Note that some or all of the functions of the server device 10 described below may be realized by the terminal device 20 when appropriate. Note further that the demarcation of the spatial state memory unit 146 from the user database 140 and the demarcation of the parameter updating unit 170 from the space rendering processor 150 is for the convenience of description, and that some functional units may realize the functions of other functional units. For example, the functions of the space rendering processor 150, the user avatar processor 152, the terminal image generator 158, the content processor 159, the dialogue processor 160, and the space information generator 168 may be realized by the terminal device 20. Furthermore, some or all of the data in the user database 140 may be integrated with the data in the avatar database 142, and stored in a different database.

Note that the spatial state memory unit 146 can be realized from the user database 140 by the server memory unit 12 illustrated in FIG. 1, and that the parameter updating unit 170 can be realized from the space rendering processor 150 by the server controller 13 illustrated in FIG. 1. Note further that part (a functional unit that communicates with the terminal device 20) of the parameter updating unit 170 can be realized from the space rendering processor 150 by the server controller 13 and the server communication unit 11 illustrated in FIG. 1.

User information is stored in the user database 140. In the example illustrated in FIG. 6, the user information includes user information 600 relating to a general user, and staff information 602 relating to a staff user.

The user information 600 associates a user name, authentication information, a user avatar ID, and position/orientation information, and the like, to each user ID. The user name is any name registered personally by the general user. The authentication information is information for showing that the general user is a legitimate general user, and may include, for example, a password, email address, date of birth, watchword, biometric, or the like. The user avatar ID is an ID for specifying a user avatar. The position/orientation information includes the position information and orientation information of the user avatar m1. The orientation information may be information that indicates an orientation of a face of the user avatar m1. Note that the position/orientation information is information that can change dynamically based on operational input from the general user, and may include, in addition to the position/orientation information, information indicating a movement of a hand or leg, or the like, or an expression, or the like, of a face of the user avatar m1.

The staff information 602 associates a staff name, authentication information, a staff avatar ID, position/orientation information, staff points, and the like, to each staff ID. The staff name is any name registered personally by the staff user. The authentication information is information for showing that the staff user is a legitimate staff user, and may include, for example, a password, email address, date of birth, watchword, biometric, or the like. The staff avatar ID is an ID for specifying a staff avatar. The position/orientation information includes the position information and orientation information of the staff avatar m2. The orientation information may be information that indicates an orientation of a face of the staff avatar m2. Note that the position/orientation information is information that can change dynamically based on operational input from the staff user, and may include, in addition to the position/orientation information, information indicating a movement of a hand or leg, or the like, or an expression, or the like, of a face of the staff avatar m2.

The staff points may be a parameter that increases with each fulfillment of the staff avatar role (staff job) in a virtual reality. That is, the staff points may be a parameter for indicating how the staff user moves in the virtual reality. For example, the staff points relating to one of the staff users may be increased each time this staff user assists the general user in the virtual reality through the corresponding staff avatar m2. Or, the staff points relating to one of the staff users may be increased corresponding to a time during which this staff user is able to assist (that is, in an operating state) the general user in the virtual reality through the corresponding staff avatar m2.

Avatar information relating to the user avatar m1 and the staff avatar m2 is stored in the avatar database 142. In the example illustrated in FIG. 7, the avatar information includes user avatar information 700 relating to the general user, and staff avatar information 702 relating to the staff user.

The user avatar information 700 associates a face, a hairstyle, clothing, and the like, with each of the user avatar IDs. Information relating to the appearance of the face, hairstyle, clothing, and the like, is a parameter that assigns characteristics to the user avatar, and is set by the general user. For example, the information relating to the appearance of the face, hairstyle, clothing, and the like, relating to an avatar may be granted an ID according to the type thereof. Furthermore, with respect to the face, a part ID may be prepared for each type of face shape, eye, mouth, nose, and the like, and information relating to the face may be managed by means of a combination of an ID for each part configuring the face. In this case, information relating to the appearance of the face, hairstyle, clothing, and the like, can function as avatar rendering information. That is, each of the user avatars m1 can be rendered on both the server device 10 side and the terminal device 20 side based on each ID relating to an appearance linked to each of the user avatar IDs.

The staff avatar information 702 associates a face, a hairstyle, clothing, and the like, with each of the staff avatar IDs. Information relating to the appearance of the face, hairstyle, clothing, and the like, is a parameter that assigns characteristics to the staff avatar, and is set by the staff user. The information relating to the appearance of the face, hairstyle, and the like, just as in the case of the user avatar information 700, may be managed by means of a combination of each part ID, and can function as the avatar rendering information. Note that the staff avatar m2 may have a common characteristic that makes distinction thereof from the user avatar m1 easy. For example, having each of the staff avatars m2 wear common clothing (uniforms) makes distinction thereof from the user avatars m1 easy.

Thus, in the present embodiment, in basic terms, one of the user IDs is associated with one of the general users, and one of the user IDs is associated with the user avatar ID. Accordingly, a state where certain information is associated with one of the general users, a state where the information is associated with the relevant one of the user IDs, and a state where the information is associated with the user avatar ID associated with the relevant one of the user IDs, are synonymous. This applies to the staff user in the same way. Accordingly, for example, unlike the example illustrated in FIG. 6, the position/orientation information on the user avatar m1 may be stored associated with the user avatar ID relating to the user avatar m1, and, in the same way, the position/orientation information on the staff avatar m2 may be stored associated with the staff avatar ID relating to the staff avatar m2. In the description below, the general user and the user avatar m1 associated with the general user, are in a relationship in which each can be read as the other; and the staff user and the staff avatar m2 associated with the staff user, are also in a relationship in which each can be read as the other.

Ticket information relating to a ticket is stored in the ticket information memory unit 144. The ticket is a virtual reality medium indicating a movement authority of the user avatar m1 to move to a designated position within a virtual space. As one example in the present embodiment, the ticket is a form that can be torn according to a ticket-taking operation input by the staff user. Here, the acts of "ticket-taking" and "taking a ticket," basically indicate that staff receive at ticket from a general user, who is a customer, at an entrance, or the like, of an event venue, or the like, and then tear off a stub from the ticket. The ticket being torn off enables the general user to gain admission to the event venue. Note that, in a modified example, in place of ticket-taking, the ticket may be a form where a stamp, mark, or the like, indicating the ticket has "been used" is applied thereupon.

In the example shown in FIG. 8, the ticket information associates a designated position, an owner ID, purchase information, transfer authentication information, ticket-taking authentication information, transfer information, validity flag, a ticket-taker ID, ticket-taking information, and the like, to a ticket ID.

The ticket ID is a unique ID assigned to each ticket.

The designated position indicates a position that can be positioned within the virtual space based on a movement authority relating to a ticket. The designated position includes a position at which the provision of a specific content can be received. The designated position may be defined by a coordinate value of one point, but is typically defined by a plurality of coordinate values forming a group of regions or spaces. Furthermore, the designated position may be a position on a flat surface or a position in space (that is, a position represented by a 3D coordinate system that includes a height direction). Typically, the designated position may be set for each specific content according to a position for providing, or an attribute of, the specific content. For example, in the examples illustrated in FIG. 2A through FIG. 2C, the designated position is a position within the virtual space that can be entered through each gate. The designated position may be defined by a specific Uniform Resource Locator (URL). In this case, the general user, or the like, can move the user avatar m1, or the like, to the designated position by accessing a specific URL. In this case, the general user can access the specific URL to receive provision of the specific content using a browser on the terminal device 20.

Note that it is preferable that the ticket information shown in FIG. 8 be prepared with a plurality of types of designated positions such as, for example, the designated position inside a gate like that illustrated in FIG. 2A or the designated position inside a gate like that illustrated in FIG. 2B. In cases where there is only one type of designated position, the designated position in the ticket information may be omitted.

The owner ID corresponds to the user ID relating to the general user holding the ticket at the present time. Since, as described above, the ticket is transferable, the owner ID can be changed after the fact.

The purchase information shows purchaser ID, purchase date and time, purchase method, seller ID, and the like. Note that the purchaser ID is the user ID associated with a user who has made a purchasing input. The seller ID is the staff ID of the staff user who sold the ticket. Note that in a case where the ticket is not sold face-to-face by the staff user within the virtual space (e.g., when the ticket is sold in advance), the seller ID may be omitted.

The transfer authentication information is authentication information required for transfer, and that differs by ticket ID.

The ticket-taking authentication information is authentication information for authenticating that the ticket is legitimate, and that differs by ticket ID. Although the ticket-taking authentication information may take any form, an example in the present embodiment, the form thereof is a four-digit code consisting of numbers and/or symbols. Note that the ticket-taking authentication information may take the form a pre-issued unique identifier. Furthermore, the ticket-taking authentication information may be set by the user who purchased the ticket.

The transfer information indicates the presence or absence of one or more transfers, and may also indicate transfer date, time, and the like. Note that "–" as shown in FIG. 8 indicates that no transfer has taken place.

The validity flag is flag information indicating the validity of the ticket. As one example in the present embodiment, the ticket is valid when the validity flag is "1," and invalid when the validity flag is "0." A state where the ticket is valid corresponds to a state where the user avatar m1 associated with the ticket can move to the designated position associated with the ticket (and to an accompanying state where the user can receive provision of a specific content at the designated position).

The validity of the ticket may be set according each ticket attribute. For example, a ticket with a certain attribute may be invalidated when taken (or when arriving at the designated position immediately thereafter). Furthermore, a ticket with a different attribute may be invalidated once a designated period of time has passed since the ticket was taken. Furthermore, a ticket with a different attribute may be invalidated once separated from the designated position after being taken. Or a mechanism that enables re-admission using the same ticket may also be realized. In this case, the validity of the ticket may be maintained until the designated period of time has passed since the ticket was taken. Or, the ticket may be invalidated when a number of movements (admissions) to the designated position equal to, or exceeding, a designated number are detected.

The ticket-taker ID is the staff avatar ID associated with the staff user who took the ticket. In the present embodiment, the ticket may be taken without the direct involvement of the staff user. In this case, information indicating that the ticket was taken automatically may be stored as the ticket-taker ID.

The ticket-taking information indicates whether or not the ticket was taken, and may also indicate the date, time, and the like, the ticket was taken. Note that "–" as shown in FIG. 8 indicates the ticket was not taken.

Spatial state information relating to a state within a space relating to the designated position in the virtual space is stored in the spatial state memory unit 146. Note that, in the following, the space relating to the designated position in the virtual space is defined as a room that can be defined by the general user with a URL. A user accessing the same room is managed as a session linked to the same room. An avatar entering the space relating to the room may be expressed as entry to the room. Although the number of users that can gain access to one room at a time may be limited by processing capacity, processing that creates a plurality of rooms with the same settings to disperse the processing load is permitted. Furthermore, entry to the room may be managed based on access authority, or the like, and processes that confirm possession of, or require consumption of, a valid ticket are permitted. In the example illustrated in FIG. 9, the spatial state information includes user state information 900 relating to a general user, and staff state information 902 relating to a staff user.

The user state information 900 associates the ticket ID and information on content to be provided, and the like, with an entering user. The entering user is the general user relating to the user avatar m1 positioned in the designated position, and information on the entering user may be any information (the user ID, the user avatar ID, or the like) that can be used to specify the general user. Note that the entering user is the general user relating to the user avatar m1 positioned in the designated position, and that the position information of the user avatar m1 corresponds to the designated position (one of a plurality of coordinate values when this position is defined by said plurality of coordinate values). In other words, in a case where the position information of one user avatar m1 does not correspond to the designated position, the general user relating to the one user avatar m1 is excluded from being the entering user. The ticket ID of the user state information 900 represents the ticket ID associated with the ticket used when the entering user enters the room. The information on content to be provided may include information on whether the provision of a specific content has been received, or information on whether the provision of the specific content is being received. Furthermore, the information on content to be provided relating to a virtual space where a plurality of specific content can be provided may include historical information showing which provided specific content has been received or information on which specific content is being received. The user state information 900 may include information such as "Validated_At" (date and time it was confirmed that the ticket was valid) or "Expired_On" (date and time the ticket expired), and the like.

The staff state information 902 includes information on operation staff. The operation staff is the staff user relating to the staff avatar m2 positioned in the designated position, and the information on operation staff may be any information (the staff ID, the staff avatar ID, or the like) that can be used to specify the staff user.

The space rendering processor 150 renders the virtual space based on the virtual space rendering information. Note that, despite being generated in advance, the virtual space rendering information may be updated, or the like, either after the fact or dynamically. Each position within the virtual space may be defined using a spatial coordinate system. Note that although any method for rendering the virtual space is acceptable, rendering may be realized by, for example, mapping a field object, or a background object, on an appropriate flat surface, curved surface, or the like.

The user avatar processor 152 executes various types of processes relating to the user avatar m1. The user avatar processor 152 includes an operation input acquiring unit 1521 and a user operation processor 1522.

The operation input acquiring unit 1521 acquires operation input information from the general user. Note that the operation input information from the general user is generated through the input unit 24 of the terminal device 20 described above.

The user operation processor 1522 determines the position and orientation of the user avatar m1 in the virtual space based on the operation input information acquired by the operation input acquiring unit 1521. The position/orientation information on the user avatar m1 determined by the user operation processor 1522 may be stored associated with, for example, the user ID (see FIG. 6). The user operation processor 1522 may also determine various types of movement of a hand, a foot, or the like, of the user avatar m1 based on the operation input information. In this case, information on such movement may also be stored together with the position/orientation information on the user avatar m1.

Here, the function of the user operation processor 1522, as described above, may be realized by the terminal device 20 instead of the server device 10. For example, movement within the virtual space may be realized by a mode in which acceleration, collision, and the like, are expressed. In this case, although each user can make the user avatar m1 jump by pointing to (indicating) a position, a decision with respect to a restriction relating to a wall surface or a movement may be realized by the terminal controller 25 (the user operation processor 1522). In this case, the terminal controller 25 (user operation processor 1522) processes this decision based on restriction information provided in advance. Note that, in this case, the position information may be shared with a required other user through the server device 10 by means of real time communication based on a WebSocket, or the like.

The staff avatar processor 154 executes various types of processes relating to the staff avatar m2. The staff avatar processor 154 includes an operation input acquiring unit 1541 and a staff operation processor 1542.

The operation input acquiring unit 1541 acquires operation input information from the staff user. Note that the operation input information from the staff user is generated through the input unit 24 of the terminal device 20 described above.

The staff operation processor 1542 determines the position and orientation of the staff avatar m2 in the virtual space based on the operation input information acquired by the operation input acquiring unit 1541. The position/orientation information on the staff avatar m2, the position and orientation of which have been determined by the staff operation processor 1542, may be stored associated with, for example, the staff ID (see FIG. 6). The staff operation processor 1542 may also determine various types of movement of a hand, a foot, or the like, of the staff avatar m2 based on the operation input information. In this case, information on such movement may also be stored together with the position/orientation information on the staff avatar m2.

The terminal image generator 158 renders each of the virtual reality media (e.g., the user avatar m1 and the staff avatar m2) that are able to move within the virtual space.

Specifically, the terminal image generator 158 generates an image relating to each user displayed by means of the terminal device 20 based on the avatar rendering information (see FIG. 7), the position/orientation information on each of the user avatars m1, and the position/orientation information on the staff avatar m2.

For example, the terminal image generator 158 generates, for each of the user avatars m1, an image (hereinafter referred to as a "general user terminal image" when distinguished from a staff user terminal image to be described later) displayed by means of the terminal device 20 relating to a general user associated with one of the user avatars m1, based on the position/orientation information on this one of the user avatars m1. Specifically, the terminal image generator 158 generates an image (an image with part of the virtual space cut out) of the virtual space as seen from a virtual camera having a position and orientation corresponding to position/orientation information based on the position/orientation information of one of the user avatars m1 as a terminal image. In this case, when the virtual camera is positioned and oriented corresponding to the position/orientation information, a field of view of the virtual camera substantially matches a field of view of the user avatar m1. However, in this case, the user avatar m1 is not reflected in the field of view from the virtual camera. Accordingly, when the terminal image in which the user avatar m1 is reflected is generated, a position of the virtual camera may be set behind the user avatar m1. Or, the position of the virtual camera may be adjusted in any way by the corresponding general user. Note that, when the terminal image is generated, the terminal image generator 158 may execute various types of processes (e.g., a process that bends a field object, or the like) to provide a sense of depth, and the like. Furthermore, in a case where a terminal image in which the user avatar m1 is reflected is generated, the user avatar m1 may be rendered by a relatively simple mode (e.g., in the form of a 2D sprite) in order to reduce a rendering process load.

Furthermore, in the same way, the terminal image generator 158 generates an image (hereinafter referred to as a "staff user terminal image" when distinguished from the general user terminal image described above) displayed by means of the terminal device 20 relating to a staff user associated with one of the staff avatars m2, based on the position/orientation information on this one of the staff avatars m2.

In a case where another of the user avatars m1 or staff avatars m2 is positioned with the field of view from the virtual camera, the terminal image generator 158 generates a terminal image that includes the other user avatar m1 or staff avatar m2. However, in this case, the other user avatar m1 or staff avatar m2 may be rendered by means of a relatively simple mode (e.g., in the form of a 2D sprite) in order to reduce the rendering process load.

Here, the function of the terminal image generator 158, as described above, may be realized by the terminal device 20 instead of the server device 10. For example, in this case, the terminal image generator 158 receives the position/orientation information generated by the staff avatar processor 154 of the server device 10, information (e.g., the user avatar ID or the staff avatar ID) that can be used to identify an avatar to be rendered, and the avatar rendering information (see FIG. 7) relating to the avatar to be rendered from the server device 10, and renders an image of each avatar based on the received information. In this case, the terminal device 20 may store part information for rendering each part of the avatar in the terminal memory unit 22, and then render the appearance of each avatar based on the part information and avatar rendering information (ID of each part) to be rendered acquired from the server device 10.

It is preferable that the terminal image generator 158 render the general user terminal image and the staff user terminal image by different modes. In this case, the general user terminal image and the staff user terminal image are rendered by different modes even when the position/orientation information on the user avatar m1 and the position/orientation information on the staff avatar m2 match perfectly. For example, the terminal image generator 158 may superimpose information that is not normally visible (e.g., information on the ticket validity flag), which is information useful for fulfilling various types of roles granted to the staff user, onto the staff user terminal image. Furthermore, the terminal image generator 158 may render the user avatar m1 associated with, and the user avatar m1 not associated with, the owner ID by different modes based on the ticket information (see FIG. 8) in the staff user terminal image. In this case, the staff user can easily distinguish between the user avatar m1 associated with, and the user avatar m1 not associated with, the owner ID.

The content processor 159 provides specific content to the general user at each designated position. The content processor 159 may output the specific content on the terminal device 20 through, for example, a browser. Or, the content processor 159 may output the specific content on the terminal device 20 through a virtual reality application installed on the terminal device 20.

The dialogue processor 160 enables dialogue among the general users through the network 3 based on input from a plurality of the general users. The dialogue among the general users may be realized in text and/or voice chat format through each general user's own user avatar m1. This enables general users to dialogue with one another. Note that text is output to the display 23 of the terminal device 20. Note that text may be output separate from the image relating to the virtual space, or may be output superimposed on the image relating to the virtual space. dialogue by text output to the display 23 of the terminal device 20 may be realized in a format that is open to an unspecified number of users, or in a format open only among specific general users. This also applies to voice chat.

The dialogue processor 160 enables dialogue between the general user and the staff user through the network 3 based on input from the general user and input from the staff user. The dialogue may be realized in text and/or voice chat format through the corresponding user avatar m1 and staff avatar m2. This enables the general user to receive assistance from the staff user in real time.

The first movement authority processor 162 generates the ticket (designated movement authority information) based on the purchasing input (an example of the first input), and then associates the ticket with the user avatar m1 associated with the general user.

The purchasing input includes various types of input for purchasing the ticket. The purchasing input typically corresponds to the consumption of money or a virtual reality medium having monetary value. The virtual reality medium having monetary value may include a virtual reality medium, or the like, that can be obtained in conjunction with the consumption of money. Note that the consumption of the virtual reality medium refers to the removal of an association between the user ID and the virtual reality medium, and may be realized by reducing, or the like, the volume or number of the virtual reality medium that had been associated with the user ID.

When the ticket is issued, the first movement authority processor 162 generates a new ticket ID (see FIG. 8) and updates the data in the ticket information memory unit 144. In this case, the designated position, the owner ID, and the like, are associated with the new ticket ID (see FIG. 8). In this case, the owner ID becomes the user ID relating to the user who made the purchasing input described above.

Specifically, the first movement authority processor 162 includes a purchasing input acquiring unit 1621, a ticket ID generator 1622, an authentication information notifier 1623, and a ticket rendering unit 1624.

The purchasing input acquiring unit 1621 acquires the purchasing input from the general user described above from the terminal device 20 through the network 3.

In a case where the user avatar m1 is in an entrance vicinity relating to the designated position, the purchasing input can be input by the general user associated with the user avatar m1. Although it is not necessary to clearly stipulate the entrance relating to the designated position in the virtual space, the entrance may be associated with a position corresponding to an entrance in the virtual space by rendering characters spelling entry or gate. For example, in the examples illustrated in FIG. 2A through FIG. 2C, the position SP1 relating to a ticket purchasing area, the position SP2 relating to an entrance area, and a vicinity of these correspond to an entrance vicinity.

In this case, the general user who has purchased the ticket can move their own user avatar m1 to the entrance vicinity and make the purchasing input through dialogue with the staff avatar m2 arranged in association with the position SP1.

Or, the purchasing input by the general user may be made possible in advance (before the user avatar m1 is positioned in the entrance vicinity relating to the designated position). In this case, the general user who has purchased the ticket in advance can move their own user avatar m1 to the entrance vicinity and activate the advance purchasing input through dialogue with the staff avatar m2 arranged in association with the position SP1. Note that the advance purchasing input may be activated automatically (that is, without requiring any additional input) when the general user who has purchased the ticket in advance moves their own user avatar m1 to the entrance vicinity (by searching for the input using the user ID and the ticket ID linked therewith).

As described above, the ticket ID generator 1622 generates a new ticket ID (see FIG. 8) and updates the data in the ticket information memory unit 144 based on the purchasing input. For example, when the general user, wishing to purchase the ticket, makes the purchasing input in a state where their own user avatar m1 has been positioned in the entrance vicinity, the ticket ID generator 1622 immediately generates the new ticket ID. In this case, an initial value of the validity flag associated with the ticket ID may be set to "1." Furthermore, when the general user who has purchased the ticket in advance performs an activating input in a state where their own user avatar m1 has been positioned in the entrance vicinity, the ticket ID generator 1622 may update the value of the validity flag already associated with the ticket ID from "0" to "1."

Based on the purchasing input, the authentication information notifier 1623 reports the ticket-taking authentication information (see FIG. 8) associated with the purchased ticket to the general user who purchased the ticket. Note that, as described above, as an example in the present embodiment, the form of the ticket-taking authentication information is a four-digit code consisting of numbers and/or symbols. For example, the authentication information notifier 1623 sends the ticket-taking authentication information through the network 3 to the terminal device 20 relating to the general user who purchased the ticket. At this time, the ticket-taking authentication information may be reported using automated audio, or the like, by email or telephone. Or, as described above, the ticket-taking authentication information may be set by the general user when making the purchasing input. In this case, the authentication information notifier 1623 may be omitted.

The ticket rendering unit 1624 renders a ticket (virtual reality medium) for each ticket ID based on the purchasing input. For example, the ticket rendering unit 1624 may render the ticket in association with a hand of the user avatar m1 relating to the owner ID in the terminal image that includes the user avatar m1 relating to the owner ID. In this way, a state where the user avatar m1 holds (owns) the ticket can be realized in the virtual reality. Note that, in a case where a plurality of ticket IDs are associated with the same owner ID, the user avatar m1 relating to the owner ID may be rendered in a state that indicates the plurality of tickets are being held.

The second movement authority processor 164 switches an association to the ticket associated with the user ID relating a specific general user by the first movement authority processor 162 to the user ID relating to a different general user based on a transferring input (an example of the second input) from the specific general user. That is, the second movement authority processor 164 changes the owner ID (see FIG. 8) associated with the ticket from the user ID associated with the purchaser ID to the user ID relating to a different transferee general user. In this way, the second movement authority processor 164 switches the ticket associated with the specific general user (purchaser ID) by the first movement authority processor 162 to a general user (transferee general user) who is different from the specific general user based on the transferring input. As a result, the ticket changes from a state of being associated with the user avatar m1 (an example of the first mobile medium) relating to the general user on a transferring side to a state of being associated with the user avatar m1 (an example of the second mobile medium) relating to the general user on a transfer receiving side based on the transferring input.

Specifically, the second movement authority processor 164 includes a transferring input acquiring unit 1640, an authentication report guidance unit 1641, a first authentication information rendering unit 1642, a first authentication information receiver 1643, and a ticket information rewriting unit 1644.

The transferring input acquiring unit 1640 acquires the transferring input from the general user on the transferring side described above from the terminal device 20 through the network 3. The transferring input includes the ticket ID relating to the ticket to be transferred. Note that the general user who is able to make the transferring input is the general user who owns the ticket, and the general user who holds the user ID relating to the owner ID in the ticket information (see FIG. 8).

In a case where the user avatar m1 on the transferring side is in an entrance vicinity relating to the designated position, the transferring input can be input by the general user associated with the user avatar m1. The entrance vicinity relating to the designated position is as described above in relation to the purchasing input described above. For example, in the examples illustrated in FIG. 2A through FIG. 2C, the position SP1 corresponds to the entrance vicinity. Note that although the entrance vicinity relating to the designated position where the transferring input can be input and the entrance vicinity relating to the designated position where the purchasing input can be input are the same in these examples, they may also be different.

Or, the transferring input can be input by the general user together with the purchasing input. This is because, for example, in most cases where the ticket is purchased by a parent with a child, the parent purchases the ticket with the intent of transferring the ticket to their child.

In response to the transferring input described above, the authentication report guidance unit 1641 guides the general user on the transferring side to report the ticket-taking authentication information to the general user on the transfer receiving side. Note that this guidance may be realized either at the time of the purchasing input or at some other time. Furthermore, in a case where this fact is reported to all general users during use of the virtual reality generating system 1, the authentication report guidance unit 1641 may be omitted. Upon receiving this guidance, the general user on the transferring side reports the ticket-taking authentication information to the general user on the transferring side by chat, email, Short Message Service (SMS), or the like. Note that in a case where the general user on the transferring side and the general user on the transfer receiving side are in a relationship where the same ticket-taking authentication information is used many times, like a relationship between a parent and a child, it may not be necessary to report the ticket-taking authentication information itself. Furthermore, in a case where the general user on the transferring side and the general user on the transfer receiving side are, in fact, near one another, the ticket-taking authentication information may be reported directly face-to-face.

The first authentication information rendering unit 1642 renders first authentication information corresponding to the transfer authentication information in response to the transferring input described above. Specifically, the first authentication information rendering unit 1642 detects the transfer authentication information (see FIG. 8) associated with the ticket ID based on the ticket ID relating to the ticket to be transferred. Then, the first authentication information rendering unit 1642 renders the first authentication information corresponding to the detected transfer authentication information. A method for rendering the first authentication information may be any method so long as the transfer authentication information and the rendered first authentication information match, but it is preferable that the first authentication information be rendered using a form with image recognition capability.

As one example in the present embodiment, the first authentication information rendering unit 1642 renders the first authentication information in the position associated with the user avatar m1 on the transferring side using a form of coded information such as a 2D code. For example, the first authentication information rendering unit 1642 renders the first authentication information in a state where said information is superimposed onto part of the user avatar m1 in the terminal image that includes the user avatar m1 on the transferring side. Or, the first authentication information rendering unit 1642 may render the first authentication information associated with a held item (e.g., the ticket) rendered associated with the user avatar m1 on the transferring side. In this way, the rendered first authentication information can be recognized via image recognition by the terminal device 20 relating to a different general user. For example, in a case where the first authentication information is included the terminal image supplied to a certain terminal device 20, the first authentication information can be recognized via image recognition in the certain terminal device 20. This image recognition processing will be described in detail later with reference to FIG. 5.

Note that the coded information relating to the first authentication information may be a 2D image code that includes the following information.

(1) A URL of an authentication server
(2) The user ID on the transferring side
(3) The ticket ID
(4) A current time
(5) A URL of the current virtual space
(6) Current coordinates
(7) Personal Identification Number (PIN)
(8) The user ID on the transfer receiving side In this case, the (7) PIN may be used as the ticket-taking authentication information. Also, in this case, a user on the transferring side can complete a second authenticating judgment (describe later) by accessing the URL of the authentication server and inputting a PIN code.

Note that, as described above, the function of the first authentication information rendering unit 1642 may be realized on the terminal device 20 side. In this case, the terminal device 20 may, for example, include a Graphics Processing Unit (GPU), and the GPU may generate an image code relating to the first authentication information.

Furthermore, the coded information relating to the first authentication information need not be visible to the user. Accordingly, the coded information relating to the first authentication information may include, for example, a code that fluctuates at ultra-high-speed using time information, a high-resolution code, a code of a hard-to-see color, a code that confuses using a pattern of clothing worn by the user avatar m1, or the like.

The first authentication information receiver 1643 receives first authentication information image recognition results from the terminal device 20 through the network 3. The first authentication information image recognition results include the user ID, and the like, associated with the sending terminal device 20.

When the first authentication information receiver 1643 receives image recognition results, the ticket information rewriting unit 1644 rewrites the owner ID of the ticket information based on the image recognition results. Specifically, when the first authentication information receiver 1643 receives the image recognition results from the terminal device 20 associated with a certain general user, the ticket information rewriting unit 1644 specifies the transfer authentication information corresponding to the first authentication information based on the first authentication information of the image recognition results. Furthermore, the ticket information rewriting unit 1644 associates the user ID included in the image recognition results with the owner ID associated with the ticket ID relating to the specified transfer authentication information. At this time, in a state where the user ID relating to the user who made the transferring input is associated with the owner ID, a fact of the transfer may be added to the transfer information (see FIG. 8) of the ticket information.

When the owner ID relating to one ticket ID is changed based on the image recognition results in this way, the ticket information rewriting unit 1644 may instruct the ticket rendering unit 1624 to reflect the change. In this case, the ticket rendering unit 1624 renders the ticket in association with the user avatar m1 relating to the new owner ID. For example, the general user can recognize a state in which the ticket is being held in the terminal image for the user displayed on their own terminal device 20 by confirming a state wherein the ticket is rendered in association with their own user avatar m1.

The judging processor 166 can judge whether the user avatar m1 can move to the designated position based on the ticket information and the ticket-taking authentication information.

Specifically, the judging processor 166 includes a ticket holding judgment unit 1661, a second authentication information receiver 1662, a second authenticating judgment unit 1663, and a movability judgment unit 1664.

The ticket holding judgment unit 1661, when judging whether a given user avatar m1 can move toward the designated position, first judges whether the user avatar m1 is holding a ticket that can move to the designated position. This type of judging process is also referred to as a "ticket holding judgment" below.

The ticket holding judgment can be realized based on the ticket information shown in FIG. 8. In this case, the general user (or the user avatar m1 thereof) for which the user ID is the owner ID can be judged as holding a ticket with the ticket ID to which the owner ID is associated. Furthermore, in a case where the validity flag "1" is associated with the ticket ID of the ticket, the ticket can be judged to be a ticket that can move to the designated position.

The ticket holding judgment is preferably executed with respect to the user avatar m1 positioned at the entrance area relating to the designated position based on the position information (see FIG. 6) of the user avatar m1. The entrance area relating to the designated position may be, for example, the position SP2 in the examples illustrated in FIG. 2A through FIG. 2C, or in the vicinity thereof. The entrance area relating to the designated position is the area in which the user avatar m1 to be moved to the designated position is to be positioned, and thus positioning the user avatar m1 in the entrance area may be used to display an intention of the general user to move the user avatar m1 to the designated position. Or, in addition to positioning the user avatar m1 in the entrance area, a ticket presenting operation, or the like, may be handled to display the intention of the general user to move the user avatar m1 to the designated position.

In the present embodiment, the ticket holding judgment unit 1661 may judge whether the ticket (the ticket relating to the designated position) is associated with one of the user avatars m1 based on input from the staff user relating to the staff avatar m2 arranged in the entrance area relating to the designated position. For example, the staff user relating to the staff avatar m2 positioned in the entrance area relating to the designated position may execute part of the ticket holding judgement, and then send judgement results to the server device 10 through the network 3. In this case, whether the ticket is associated with one of the user avatars m1 can be judged based on input from the staff user.

The second authentication information receiver 1662 requests that the user avatar m1 positioned in the entrance area relating to the designated position present (input) the ticket-taking authentication information (an example of second authentication information). Note that the request to present the ticket-taking authentication information may be accompanied by a request that the user avatar m1 present the ticket, or may be executed only with respect to a user avatar m1 that has presented the ticket. For example, in a case where the user avatar m1 is detected in the entrance area relating to the designated position based on the position information (see FIG. 6) of the user avatar m1, the second authentication information receiver 1662 requests that the terminal device 20 relating to the general user of the user avatar m1 send the ticket-taking authentication information. In this case, the ticket-taking authentication information from the staff avatar m2 may be accompanied by a required animation in the general user terminal image relating to the user avatar m1. Having received this request, the general user inputs the ticket-taking authentication information, which is sent to the server device 10. In this way, the second authentication information receiver 1662 receives (acquires) the ticket-taking authentication information from the user avatar m1 positioned in the entrance area relating to the designated position.

In the present embodiment, the second authentication information receiver 1662 may receive (acquire) the ticket-taking authentication information from the user avatar m1 positioned in the entrance area relating to the designated position based on the input from the staff user relating to the staff avatar m2 arranged in the entrance area relating to the designated position. In this case, the ticket-taking authentication information input by the general user may be rendered in the staff user terminal image associated with the input user avatar m1 relating to the general user. The staff user may send the rendered ticket-taking authentication information to the server device 10 together with information that specifies the corresponding user avatar m1.

The second authenticating judgment unit 1663 judges whether the authentication was successful based on the ticket-taking authentication information. This type of judging process is also referred to as the "second authenticating judgment." In this way, the ticket holding judgment and the second authenticating judgment are both performed in the present embodiment when the judging processor 166 judges whether a given user avatar m1 can be moved to the designated position.

The second authenticating judgment is realized based on the ticket-taking authentication information of the ticket information shown in FIG. 8. Specifically, the second authenticating judgment can be realized by judging whether the ticket-taking authentication information input by the general user on the transfer receiving side matches the ticket-taking authentication information relating to the ticket owned by the user avatar m1 of the general user. In this case, authentication based on the ticket-taking authentication information is deemed successful when both of these sets of ticket-taking authentication information match.

Here, as described above, the ticket-taking authentication information is reported to the general user on the transfer receiving side by the general user on the transferring side in advance. Since the general user on the transferring side can set ticket-taking authentication information that only the general user on the transfer receiving side can understand or report the ticket-taking authentication information in a way that only the general user on the transfer receiving side can understand, there is virtually no possibility that the ticket-taking authentication information will be reported to a different, unintended, general user. Accordingly, using this type of ticket-taking authentication information can enhance the safety of the second authenticating judgment.

In the present embodiment, the second authenticating judgment unit 1663 may judge whether the authentication was successful based on the ticket-taking authentication information-based input from the staff user relating to the staff avatar m2 arranged in the entrance area relating to the designated position. In this case, for example, the staff user relating to the staff avatar m2 positioned in the entrance area relating to the designated position may execute part of the second authenticating judgment, and then send judgement results to the server device 10 through the network 3. At this time, the staff user may acquire, from the server device 10, the ticket-taking authentication information associated with the ticket held by the user avatar m1 to be authenticated. In this case, the second authenticating judgment unit 1663 can judge whether the authentication based on the ticket-taking authentication information was successful based on the input from the staff user.

In a case where the ticket holding judgment unit 1661 has judged that the given user avatar m1 owns a ticket that can move to the designated position and the second authenticating judgment unit 1663 has judged that the authentication was successful based on the ticket-taking authentication information, the movability judgment unit 1664 permits the given user avatar m1 to move to the designated position. Conversely, in a case where the ticket holding judgment unit 1661 has judged that the given user avatar m1 does not own a ticket that can move to the designated position, or the second authenticating judgment unit 1663 has judged that the authentication was unsuccessful based on the ticket-taking authentication information, the movability judgment unit 1664 prohibits the given user avatar m1 from moving to the designated position.

The movability judgment unit 1664 executes a ticket-taking process that takes the ticket associated with the user avatar m1 whose movement to the designated position has been permitted. The ticket-taking process authentication information may be accompanied by an animation of part of the ticket being cut off by the staff avatar m2 in the general user terminal image relating to the user avatar m1 for whom the ticket is to be taken.

In the present embodiment, the movability judgment unit 1664 may execute the ticket-taking process based on the input (ticket-taking input described later) from the staff user relating to the staff avatar m2 arranged in the entrance area relating to the designated position.

When the movability judgment unit 1664 executes the ticket-taking process, the unit updates the ticket-taking information (see FIG. 8) associated with the ticket ID relating to the corresponding ticket, and sets the validity flag (see FIG. 8) associated with the ticket ID to "0." Note that, as described above, the validity flag may be set to "0" at a different time according to the attributes of the ticket. Furthermore, in a case where the ticket-taking process is executed based on the input (the ticket-taking input described later) from the staff user relating to the staff avatar m2 arranged in the entrance area relating to the designated position, the movability judgment unit 1664 stores the staff ID (that is, the staff ID relating to the staff user who performed the ticket-taking input described later) corresponding to the ticket-taker ID (see FIG. 8) associated with the ticket ID relating to the corresponding ticket.

The space information generator 168 generates the spatial state information (the information representing the state of the space relating to the designated position), and then updates the data in the spatial state memory unit 146.

The parameter updating unit 170 updates the staff points (see FIG. 6) described above. For example, the parameter updating unit 170 may update the staff points according to a number of tickets taken based on the ticket-taker ID shown in FIG. 8 for the staff user who takes the ticket. The parameter updating unit 170 may also update the staff points according to a number of tickets sold based on the seller ID for the staff user who sold the ticket. Furthermore, the parameter updating unit 170 may update the staff points according to an operating status of each staff user based on the spatial state information shown in FIG. 9. For example, the parameter updating unit 170 may update the staff points by means of a mode whereby more of the staff points are granted the longer an operating time lasts. The parameter updating unit 170 may also update the staff points based on a number of times the general user was supported, or the like (speaking volume, speaking frequency, number of times attended to, number of complaints, or the like), via chat, or the like. Furthermore, the parameter updating unit 170, in a case where a product or a service is sold in the virtual reality, may update the staff points based on the status (e.g., sales proceeds) of the sale of the product or service by the staff user. Or, the parameter updating unit 170 may update the staff points based on information on a level of satisfaction in the staff user that can be input by the general user. Note that the staff points update may be appropriately executed, for example, periodically, and in batch based on log information.

A product or service sold by the staff user may be a product or service that is usable in reality, or a product or service that can be used in the virtual reality. The product or service sold by the staff user may be related to the content provided at the designated position, and the content may, for example, include an item, or the like, that can increase an experience relating to the content. For example, in a case where the content is related to the travel described above, the item may be a telescope, or the like, that makes it possible to see a long distance away, or may be feed, or the like, that can be given to an animal, or the like. Furthermore, in a case where the content is related to sports or a concert, the item may be a right to take a commemorative photo, or have a conversation, or the like, with a player or an artist.

Furthermore, the staff points relating to the staff user who does things like produce, maintain, manage, or the like, the specific content provided at the designated position may be updated by a mode that increases the point based on how many of the general users received the specific content.

FIG. 5 shows both a function 500 that is realized using the terminal device 20 relating to the general user, and a function 502 that is realized using the terminal device 20 relating to the staff user. Note that FIG. 5 only shows functions relating to the ticket transferring function of the various types of functions realized using the virtual reality application downloaded, or the like, to the terminal device 20. Note that, the virtual reality application makes it possible to load a user application for executing the function 500 and a staff application for executing the function 502 separately, or to switch between the function 500 and the function 502 within one application through a user operation.

The terminal device 20 relating to the general user includes an authentication image specifying unit 250, a first authentication information extracting unit 251, a first authentication information sending unit 252, an input requesting unit 253, and a second authentication information sending unit 254.

The authentication image specifying unit 250 executes image processing on the terminal image sent from the server device 10 as described above, and specifies an image part (e.g., a form of coded information like the 2D code) of the first authentication information.

Note that the authentication image specifying unit 250 may execute the image processing to specify the image part of the first authentication information for each frame of the terminal image, the unit may also execute the image processing to specify the image part of the first authentication information within a given period only using a mode that responds to input from the general user.

The first authentication information extracting unit 251 extracts the first authentication information by performing image recognition processing on the image part of the first authentication information.

The first authentication information sending unit 252 sends the image recognition results that include the first authentication information extracted by the first authentication information extracting unit 251 to the server device 10 through the network 3.

The input requesting unit 253, in response to a request from the second authentication information receiver 1662 of the server device 10 described above, or in response to a request from the terminal device 20 relating to the staff user (a second authentication information requesting unit 263) to be described later, and requests the input of the ticket-taking authentication information relating to the ticket to be presented. For example, the input requesting unit 253 may output a screen for inputting the ticket-taking authentication information to the display 23.

The second authentication information sending unit 254 sends the ticket-taking authentication information input by the general user to the server device 10 through the network 3 based on the request from the input requesting unit 253.

In this way, the general user can automatically associate the ticket to their own user avatar m1 by the terminal device 20 performing image recognition on the first authentication information in the terminal image. In other words, the general user can automatically associate the ticket with their own user avatar m1 by acquiring the terminal image that includes the first authentication information rendered in association with the user avatar m1 on the transferring side. Furthermore, the general user on the transfer receiving side can have their own user avatar m1 moved to the designated position by presenting legitimate ticket-taking authentication information.

Thus, the general user on the transfer receiving side can, merely by turning their own user avatar m1 toward the user avatar m1 on the transferring side, acquire the terminal image that includes the first authentication information rendered in association with the user avatar m1 on the transferring side. Since acquiring the image in this way is an activity at a position where the user avatar m1 on the transfer receiving side and the user avatar m1 on the transferring side are close, the image can be acquired easily (e.g. as part of a natural movement). This thus can mitigate cumbersome work (input) relating to transferring the ticket, and improve convenience.

The terminal device 20 relating to the staff user includes a judgement results acquiring unit 260, a judgment results sending unit 262, the a second authentication information requesting unit 263, and a ticket-taking execution unit 264. Note that the judgement results acquiring unit 260, the second authentication information requesting unit 263, and the ticket-taking execution unit 264 are realized by the server device 10 when the staff user is absent, or the like.

The judgement results acquiring unit 260 acquires the various types of judgement results that can be input by the staff user. For example, the staff user relating to the user avatar m1 arranged in the entrance vicinity of the designated position can judge whether or not any user avatar m1 that arrives at the entrance vicinity is holding the ticket associated with the designated position. For example, the staff user may, based on the terminal image displayed on the display 23 of their own terminal device 20, judge whether or not the ticket is being held based on the state, or the like, of the user avatar m1 in the terminal image. As described above, the terminal image generator 158 of the server device 10 may render the user avatar m1 associated with, and the user avatar m1 not associated with, the owner ID by means of different modes based on the ticket information (see FIG. 8) in the staff user terminal image. In this case, the staff user may distinguish between the user avatar m1 associated with, and the user avatar m1 not associated with, the owner ID, and input the judgement results through the input unit 24.

The judgment results sending unit 262 sends the various types of judgement results from the judgement results acquiring unit 260 to the server device 10 through the network 3.

The second authentication information requesting unit 263, in response to request input from the staff user, requests that the user avatar m1 included in a terminal screen for the staff user input the ticket-taking authentication information. The request input from the staff user may include information that allows the user avatar m1 that is the subject of the request to be specified. For example, when a plurality of the user avatars m1 are included in the terminal screen for the staff user, the request input from the staff user may include information that allows one or more of the user avatars m1, out of the plurality of user avatars m1, to be specified. Note that the request to input the ticket-taking authentication information corresponding to the general user may be accompanied by a request to present the ticket. Note that such communication between the terminal device 20 relating to the staff user and the terminal device 20 relating to the general user may be realized through the server device 10 (e.g., the second authentication information receiver 1662 described above), or may be realized without going through the server device 10. In the case of the latter, the staff user may transmit the acquired ticket-taking authentication information to the server device 10, and may, after executing the function of the second authenticating judgment unit 1663, send the judgement results to the server device 10.

The ticket-taking execution unit 264 acquires the ticket-taking input that was input by the staff user, and sends the acquired ticket-taking input to the server device 10. The ticket-taking input may include information that allows the ticket (or, the user avatar m1 holding the ticket) subject to the ticket-taking to be specified.

An operation example relating to the ticket transferring function described above will be described next with reference to FIG. 10 and beyond. Note that although the following operation example is a relatively specific operation example, an operation relating to the ticket transferring function described above may be, as is described above, realized using various functions.

Figure 10:
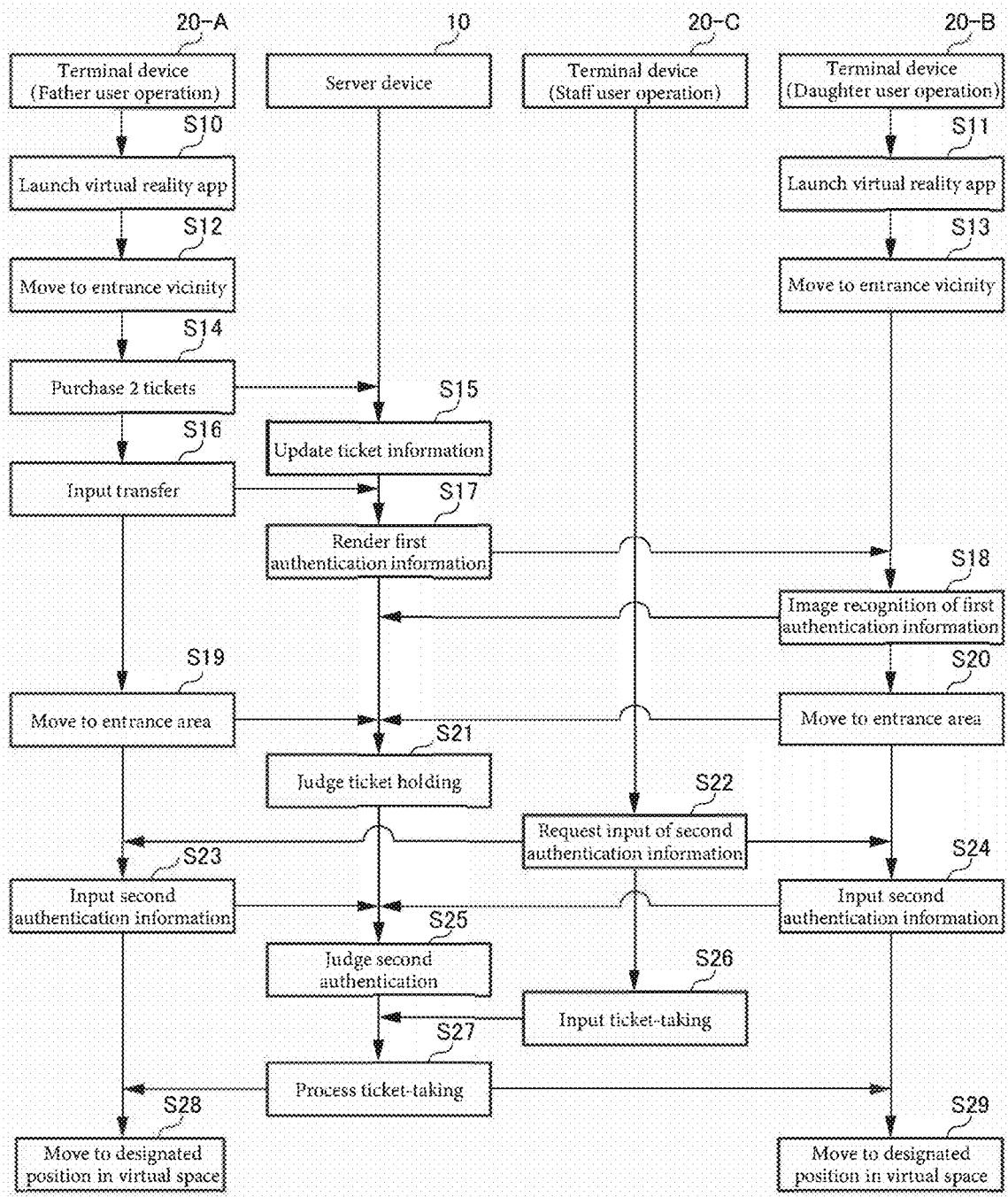
FIG. 10 is a timing chart illustrating an operation example related to a ticket transferring function.

FIG. 10 is a timing chart illustrating an operation example related to the ticket transferring function described above. In FIG. 10, for purposes of differentiation, the symbol "20-A" is assigned to a given terminal device 20 relating to the general user, the symbol "20-B" is assigned to a terminal device 20 relating to a different general user, and the symbol "20-C" is assigned to the terminal device 20 relating to the staff user. Thus, although transfer of the ticket from one general user to another general user is described here, the same can be applied to the transfer of the ticket from one general user to a plurality of other general users. In the following, the general user relating to a terminal device 20-A is given the user name "ami," the general user relating to a terminal device 20-B is given the user name "fuj," and both are a parent and child (e.g. the user name "ami" is a father and the user name "fuj" is a daughter) pair. Also in the following, the general user relating to the user name "ami" refers to a father user, and the general user relating to the user name "fuj" is a daughter user.

FIG. 11 through FIG. 16 are explanatory drawings of the operation example illustrated in FIG. 10, and are drawings illustrating one example of the terminal screen in each scene.

Here, the father user and the daughter user have decided to receive provision of a specific content in the virtual reality together, and thus an operation is described that moves each of their user avatars m1 to the designated position where provision of the specific content is to be received. Input of each user described below is deemed to have been realized through the input unit 24 of their own terminal device 20.

First, in step S10, the father user launches the virtual reality application in the terminal device 20-A, and the daughter user, in step S11, launches the virtual reality application in the terminal device 20-B. Note that the virtual reality application can be launched in the terminal devices 20-A and 20-B, respectively, and that the application may be launched with a time lag at any time.

Figure 11:
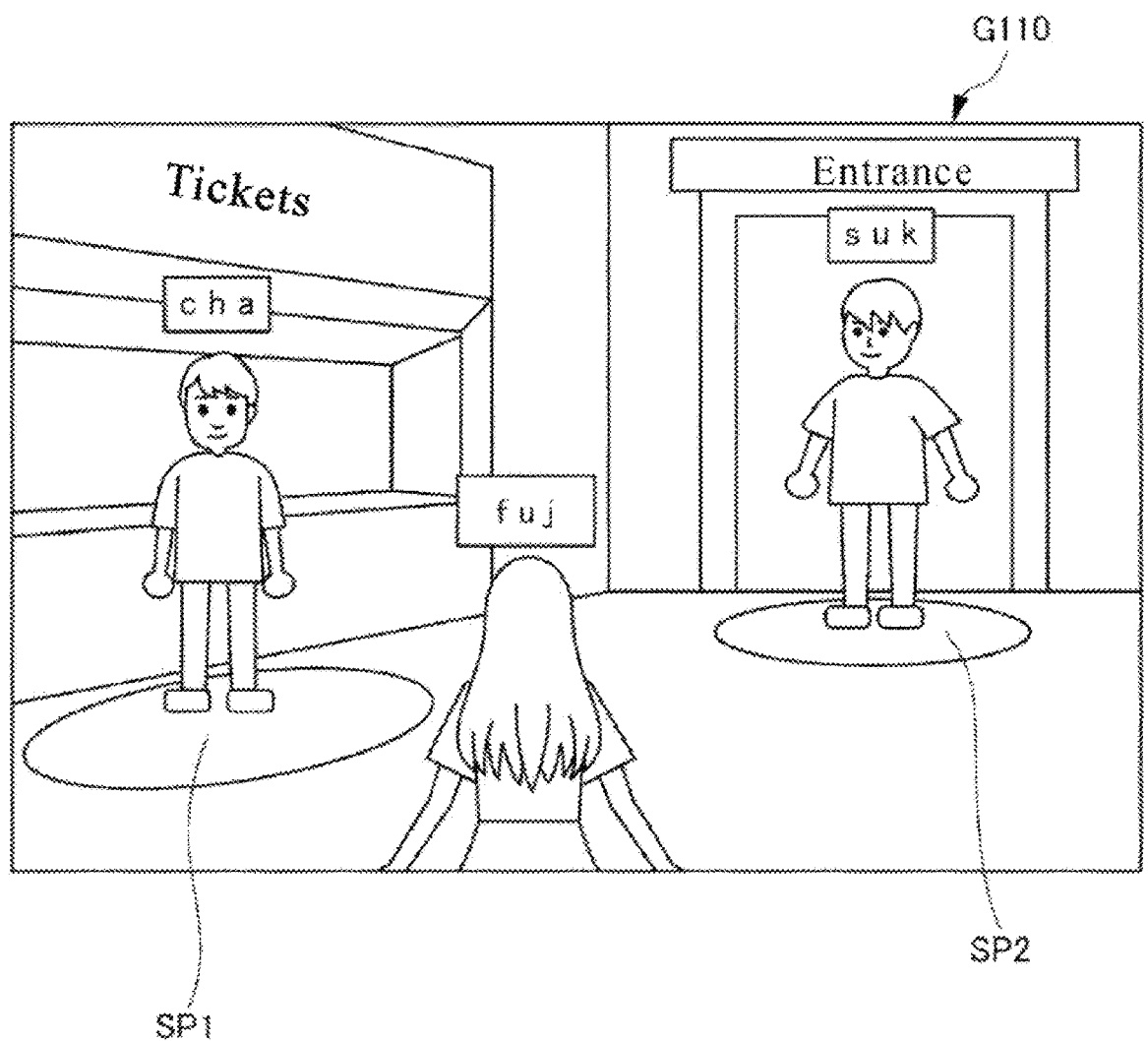
FIG. 11 is a drawing illustrating an example of one scene on a terminal screen.

Next, in step S12, the father user moves its own user avatar m1 within the virtual space to the entrance vicinity relating to the designated position. In the same way, in step S13, the daughter user moves its own user avatar m1 within the virtual space to the entrance vicinity relating to the designated position. FIG. 11 illustrates a terminal image G110 for the daughter user when the user avatar m1 of the daughter user is positioned at the entrance vicinity relating to the designated position. Note that, in the state illustrated in FIG. 11, the user avatar m1 of the father user is deemed to be behind the user avatar m1 of the daughter user. As is illustrated in FIG. 11, from terminal image G110 for the daughter user, it can be understood that the staff avatar m2 associated with a staff name "cha" is arranged in association with the ticket purchasing area, and that the staff avatar m2 associated with a staff name "suk" is arranged in association with the entrance area.

Next, in step S14, the father user moves its own user avatar m1 to inside the ticket purchasing area (the position SP1) within the virtual space and purchases two of the tickets, one for itself and one for the daughter user. That is, in a state where its own user avatar m1 is positioned in the ticket purchasing area, the father user inputs or activates the purchasing input in order to purchase two of the tickets, one for itself and one for the daughter user.

In this case, in step S15, the server device 10 issues two new ticket IDs based on the purchasing input from the father user, and then updates the data (see FIG. 8) in the ticket information memory unit 144.

Next, in step S16, the father user performs the transferring input for one of the two purchased tickets.

Figure 12:
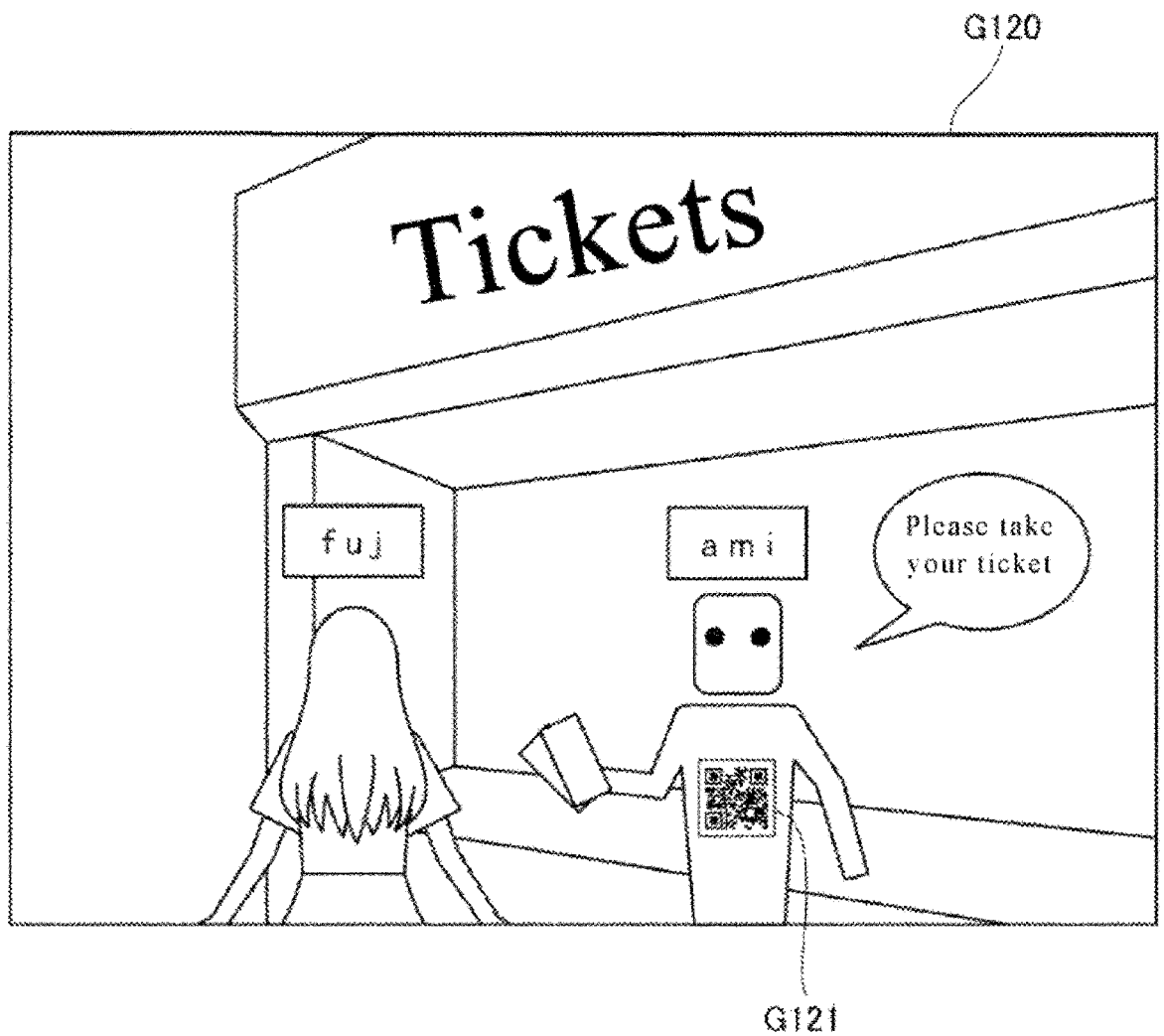
FIG. 12 is a drawing illustrating an example of another scene on a terminal screen.

In this case, in step S17, the server device 10 detects the transfer authentication information (see FIG. 8) associated with the ticket ID of the ticket to be transferred based on the transferring input from the father user. Then, the first authentication information rendering unit 1642 renders the first authentication information corresponding to the detected transfer authentication information, and associates the information with the user avatar m1 of the father user. FIG. 12 illustrates a terminal image G120 for the daughter user at the time the transferring input was performed. Note that FIG. 12 illustrates chat text saying "Please take your ticket" based on the input of the father user. Note that this sort of chatting may be generated automatically based on the transferring input.

In the example illustrated in FIG. 12, an image part G121 in which the first authentication information has been rendered has been associated with the user avatar m1 (user name) of the father user. The terminal image G120 is generated as illustrated in FIG. 12 when the father user faces its own user avatar m1 in the direction of the user avatar m1 of the daughter user, and the daughter user faces its own user avatar m1 in the direction of the user avatar m1 of the father user. In this case, in step S18, the terminal device 20-B of the daughter user performs image recognition on the first authentication information from the image part G121 and sends recognition results from the first authentication information to the server device 10. Note that the terminal device 20-B of the daughter user, after performing image recognition on the first authentication information from the image part G121, may notify the daughter user of this. In the same way, the server device 10, having received the recognition results from the first authentication information from the terminal device 20-B of the daughter user, may send, to the terminal device 20-A of the father user, information showing that the user avatar m1 of the daughter user has been associated with the ticket ID of the ticket to be transferred.

Figure 13:
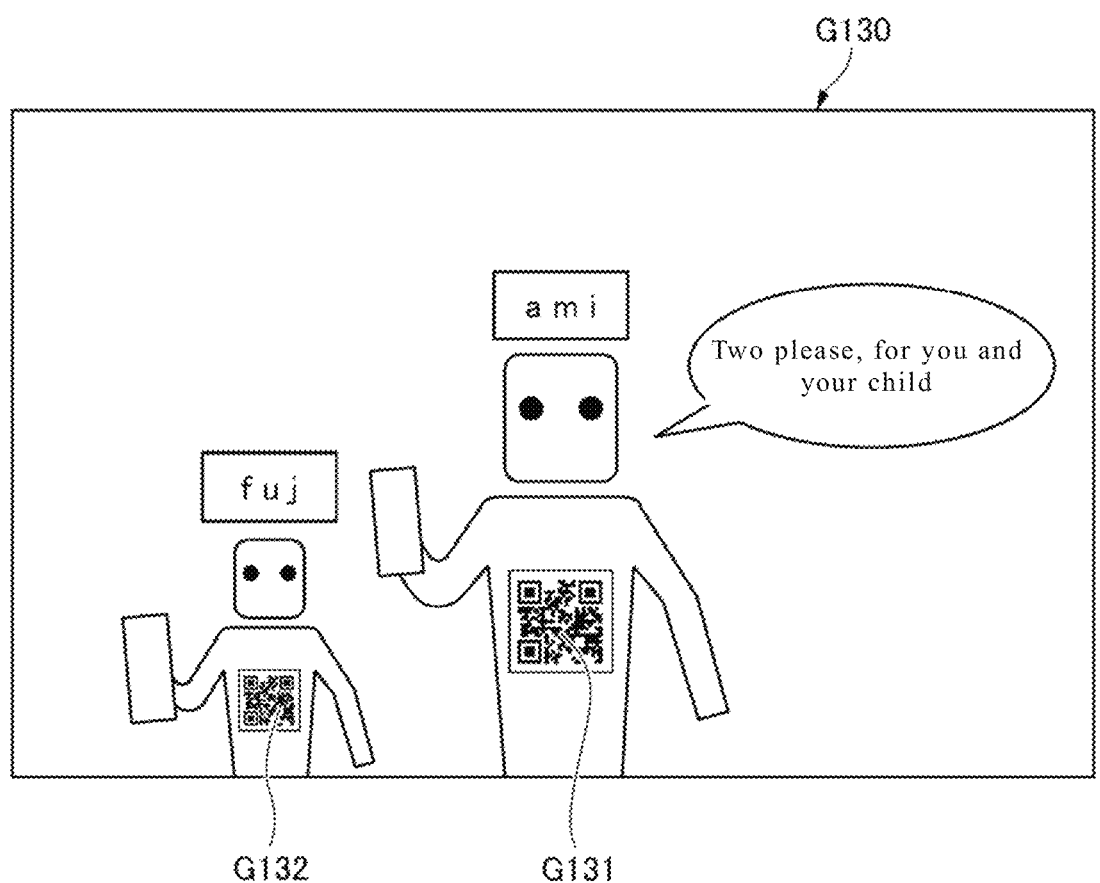
FIG. 13 is a drawing illustrating an example of yet another scene on a terminal screen.

Next, in step S19, the father user, within the virtual space, moves its own user avatar m1 into the entrance area, and then, in step S20, the daughter user, within the virtual space, moves its own user avatar m1 into the entrance area. FIG. 13 illustrates a staff user terminal image G130 of the user avatar m1 of the father user and the user avatar m1 of the daughter user (user name "fuj") positioned in the entrance area. The terminal image G130 is displayed on the terminal device 20-C of the staff user relating to the staff avatar m2 (staff name "suk") arranged in the entrance area. Note that FIG. 13 illustrates chat text saying "Two please, for you and your child" based on the input of the father user.

In this case, in step S21, the server device 10 performs the ticket holding judgment described above with respect to the user avatar m1 of the father user and the user avatar m1 of the daughter user. In this case, the user avatar m1 of the father user and the user avatar m1 of the daughter user are holding a ticket that allows movement to the designated position. Accordingly, in FIG. 13, image parts G131 and G132 showing that the ticket that allows movement to the designated position is held are rendered on the user avatar m1 of the father user and the user avatar m1 of the daughter user, respectively. Image parts like G131 and G132 are only rendered in the staff user terminal image. Thus, the staff user can easily discern that the user avatar m1 of the father user and the user avatar m1 of the daughter user are holding the ticket that allows movement to the designated position.

Figure 14:
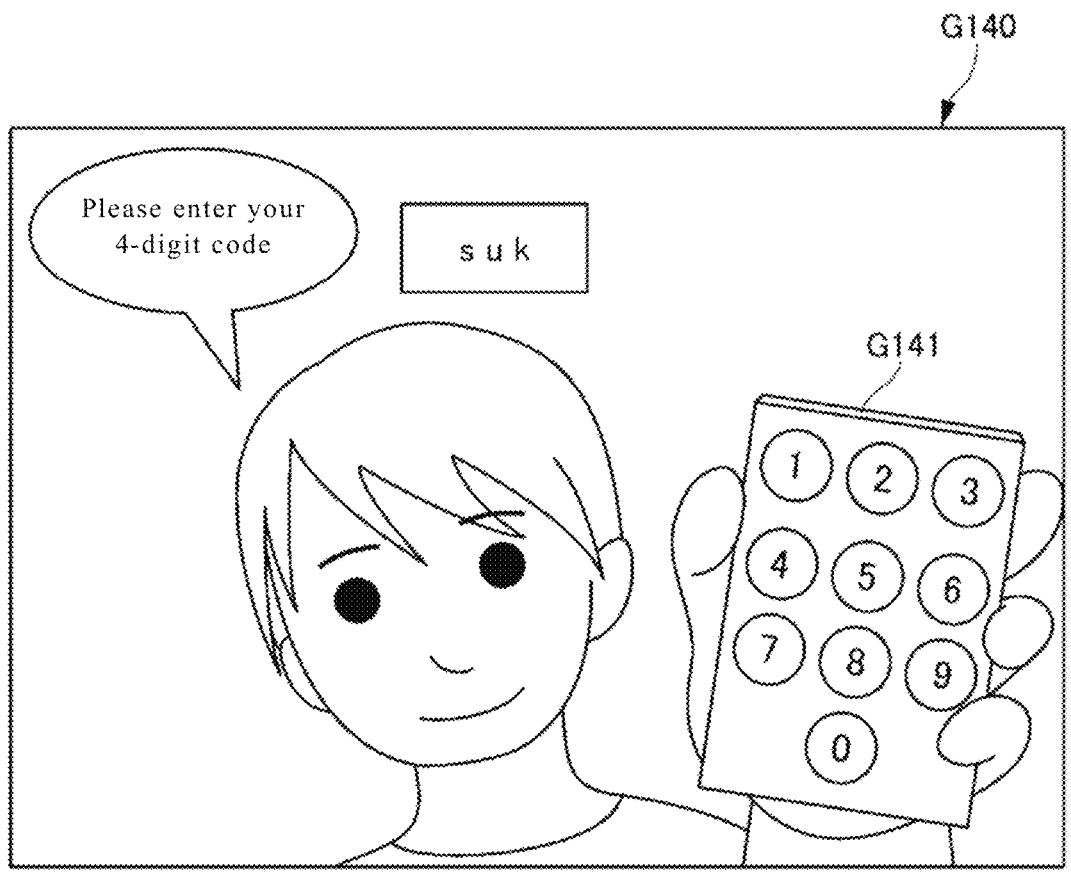
FIG. 14 is a drawing illustrating an example of yet another scene on a terminal screen.

Next, in step S22, the staff user relating to the staff avatar m2 (staff name "suk"), after confirming that the user avatar m1 of the father user and the user avatar m1 of the daughter user are holding the ticket that allows movement to the designated position, based, for example, on the image parts G131 and G132, requests that the user avatar m1 of the father user and the user avatar m1 of the daughter user input the second authentication information. FIG. 14 illustrates a terminal image G140 for the daughter user at the time the input of the second authentication information was requested. Note that a terminal image for the father user at the time the input of the second authentication information was requested may be the same as the terminal image G140 for the daughter user. The terminal image G140, as is illustrated in FIG. 14, may include a 10-key image part G141, or text of a chat saying "Please enter your 4-digit code" based on the input of the staff user relating to the staff avatar m2 (staff name "suk"). Furthermore, the URL of the authentication server may also be displayed instead of the 10-key image part G141.

Note that it is acceptable to not always require presentation of the ticket to the staff avatar m2. In cases where the ticket is not presented, the staff user can judge the validity of each ticket by having information relating to the validity of the ticket linked to the user avatar m1 of the father user and the user avatar m1 of the daughter user displayed on the terminal screen for the staff.

Next, in step S23, the father user inputs the second authentication information associated with his own ticket, and, in step S24, the daughter user inputs the second authentication information reported from the father user.

Figure 15:
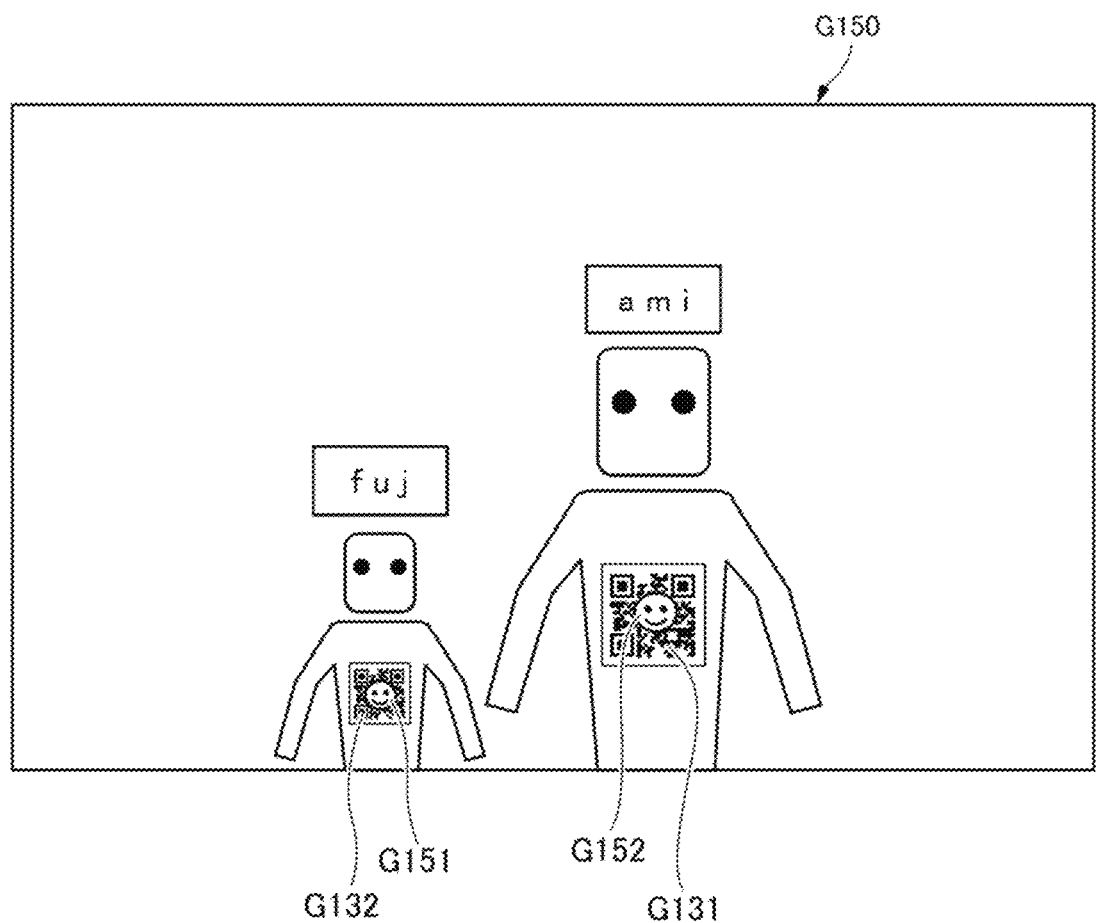
FIG. 15 is a drawing illustrating an example of yet another scene on a terminal screen.

In this case, in step S25, the server device 10 performs the second authenticating judgment described above with respect to the ticket associated with the user avatars m1 of the father user and the daughter user, respectively, based on the input of the second authentication information input by the father user and the daughter user, respectively. In this case, since legitimate second authentication information can be input for the user avatar m1 of the father user and the user avatar m1 of the daughter user, the second authenticating judgment described above resulted in a successful authentication. FIG. 15 illustrates a staff user terminal image G150 relating to the staff avatar m2 (staff name "suk") after the second authenticating judgment. In FIG. 15, image parts G151 and G152 showing that the ticket that allows movement to the designated position is held and that the result of the second authenticating judgment was a successful authentication are rendered on the user avatar m1 of the father user and the user avatar m1 of the daughter user, respectively. Image parts like G151 and G152 are only rendered in the staff user terminal image. Thus, the staff user can easily discern that the second authenticating judgment relating to both the user avatar m1 of the father user and the user avatar m1 of the daughter user resulted in a successful authentication. Note that the image parts G151 and G152 may be rendered in the staff user terminal image after the movement to the designated position. Thus, the staff user positioned at the designated position can easily tell a user avatar m1 that has entered a room from a user avatar m1 that has not based on a valid ticket.

Next, in step S26, the staff user relating to the staff avatar m2 (staff name "suk"), after confirming that the user avatar m1 of the father user and the user avatar m1 of the daughter user are each holding the ticket that allows movement to the designated position and that the second authenticating judgment resulted in a successful authentication, based, for example, on the image parts G151 and G152, performs the ticket-taking input.

Figure 16:
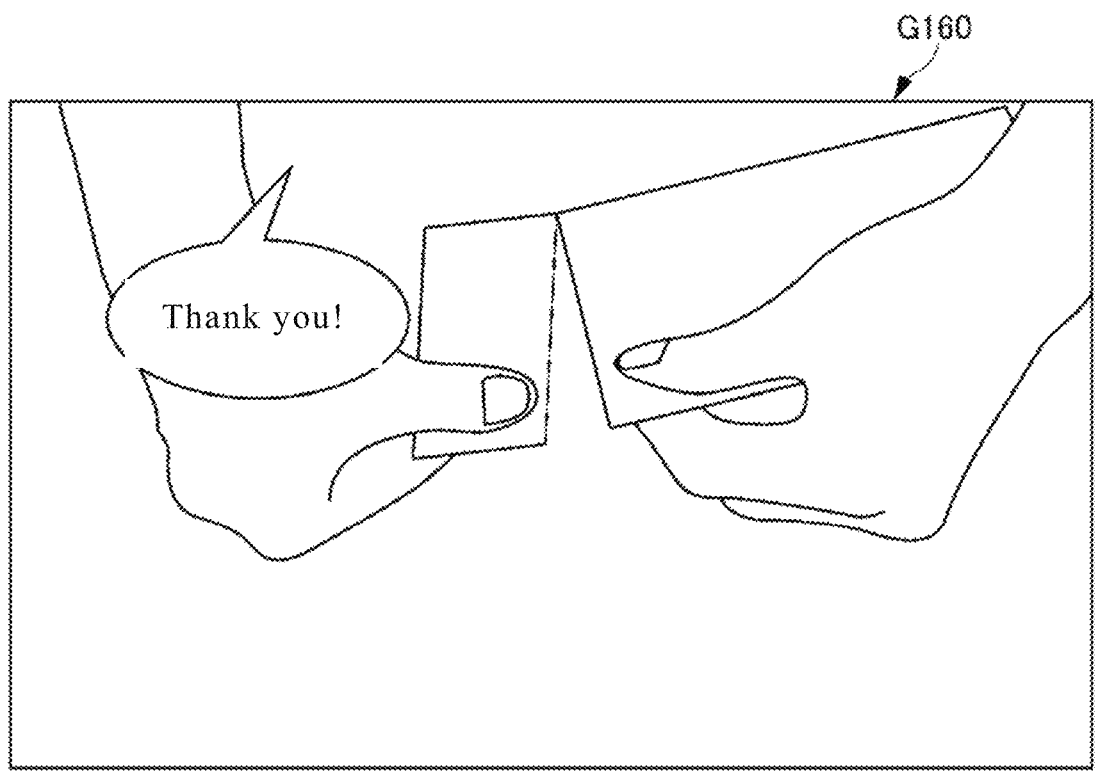
FIG. 16 is a drawing illustrating an example of yet another scene on a terminal screen.

In this case, in step S27, the server device 10 executes the ticket-taking process described above with respect to the ticket held by the user avatar m1 of the father user and by the user avatar m1 of the daughter user, respectively, based on the ticket-taking input by the staff user. FIG. 16 illustrates a terminal image G160 for the daughter user at the time of the ticket-taking process described above. Note that a terminal image for the father user at the time of the ticket-taking process may be the same as the terminal image G160 for the daughter user. The terminal image G160, as is illustrated in FIG. 16, may be accompanied by an animation of the hands of the staff avatar m2 (staff name "suk") tearing off part of the ticket. When the ticket-taking process is executed, the image parts G151 and G152 may be erased from the staff user terminal image and replaced with a different image part (e.g., an image part showing that the ticket is in a state of having been taken).

Next, in step S28, the father user, after confirming that the ticket has been taken, moves its own user avatar m1 to the designated position in the virtual space, and, in step S29, the daughter user, after confirming that the ticket has been taken, moves its own user avatar m1 to the designated position in the virtual space. Note that the move to the designated position may be realized by accessing a specific URL displayed in the terminal image, or the like. Or, the move to the designated position may be realized by the specific URL being accessed automatically following (linked with) the ticket-taking process described above. Thus, the father user and the daughter user may enjoy receiving the provision of the specific content at the designated position in the virtual space together. Note that, depending on the attributes of the specific content, a different general user may also receive provision of the specific content at the designated position in the virtual space at the same time. In this case, the father user and the daughter user may enjoy the specific content while interacting with the different general user.

Thus, according to the present embodiment, when a plurality of users attempt to receive provision of the specific content at the designated position, a mechanism whereby some of the users can purchase tickets that allow movement to the designated position, a portion of which can be transferred to different users, can be achieved by means of a simple and safe mode.

According to the present embodiment, convenience is particularly enhanced because neither the general user on the transferring side nor the general user on the transfer receiving side have to perform any special work, such as a user login, or the like, at the time of transfer.

By the way, because, in the present embodiment, image recognition can, as is described above, be performed on the first authentication information described above using the terminal device 20, the general user on the transferring side can perform image recognition even using the terminal device 20 relating to a general user who is not the intended general user. However, since this unintended general user does not know about the second authentication information, said user cannot breach the second authenticating judgment. That is, it is possible to reduce the possibility that the ticket will be used by the user avatar m1 of an unintended general user in the vicinity of the user avatar m1 relating to the general user on the transferring side. Thus, according to the present embodiment, it is possible to both realize simple transfer and ensure transfer safety.

Also according to the present embodiment, since everything from ticket purchase to transfer and movement to the designated position and be realized within the same virtual space, the general user can experience the virtual reality in a way that is closer to reality. Furthermore, as is described above, the general user can also experience the virtual reality in a way that is closer to reality through the ticket-taking process, and the like.

The present embodiment also allows the sharing and transfer of tickets among users linked through actual relationships, such as family, friends, and the like, without the virtual reality generating system 1 side acquiring any personal information. Moreover, a two-stage authentication (authentication using the first authentication information and authentication using the second authentication information) can be realized in the virtual space. Furthermore, in cases where authentication fails (unlike traditional passwords and encryption keys), this has the advantage of being easily understood among users, and of leading to a plurality of flexible solutions, including responses by people, such as staff, and the like.

This concludes the detailed description of Embodiment 1 with reference to the drawings, however, the specific configuration of the present invention is not limited to Embodiment 1, and thus includes designs, and the like, within a range that does not deviate from the gist thereof.

For example, in Embodiment 1 as described above, the staff avatar m2 was operated by the staff user (a person), but may be operated based on a program, such as a bot program.

Embodiment 2

Problem to be Solved by the Invention According to Embodiment 2

Technologies where a plurality of areas (each area being a collection of a plurality of positions) are set in a virtual space, and a user who does not meet entry criteria is denied access even if an area to which access is wanted is presented to the user as an adjacent area.

With a conventional technology like that described above, it is difficult for the user to receive provision of a plurality of content smoothly while moving to each position sequentially in a virtual reality.

Thus, an object is to make it possible for the user to receive provision of a plurality of content smoothly on one side surface while moving to each position sequentially in the virtual reality.

(An Overview of a Virtual Reality Generating System)

A block diagram of the virtual reality generating system 1 according to the present embodiment may be the same as that presented before in FIG. 1.

In the present embodiment, the user includes a general user (an example of the first user) that acts in a virtual space through the user avatar m1 (an example of the first mobile medium according to an appendix) to be described later, and a staff user (an example of the second user) that acts in the virtual space through the staff avatar m2 (an example of the second mobile medium according to the appendix) to be described later. The general user is a user who is not involved in operating the virtual reality generating system 1, and the staff user is a user who is involved in operating the virtual reality generating system 1. The staff user takes the role (of agent) of supporting the general user within the virtual reality. Below, unless otherwise stated, the user refers to both the general user and the staff user.

Furthermore, the user may also include a guest user. The guest user may be an artist or influencer, or the like, who operates a guest avatar that functions as content (content provided by a server device 10A) to be describe later. Note that there may be cases where some of the staff users become the guest users, and there may be cases where not all user attributes are clear.

Content (content provide in virtual reality) provided by the server device 10A can come in any variety and in any volume, however, as an example in the present embodiment, the content provided by the server device 10A may include digital content such as various types of video. The video may be video in real time, or video not in real time. Furthermore, the video may be video based on actual images or video based on Computer Graphics (CG). The video may be video for providing information. In such cases, the video may be related to a specific genre of information providing services (information providing services related to travel, living, food, fashion, health, beauty, or the like), broadcasting services (e.g., YouTube (registered trademark)) by a specific user, or the like.

Furthermore, as an example in the present embodiment, the content provided by the server device 10A may include guidance, advice, or the like, to be described later, from the staff user. For example, the content may include guidance, advice, or the like, from a dance teacher as content provided by means of a virtual reality relating to a dance lesson. In such a case, the dance teacher becomes the staff user, a student thereof becomes the general user, and the student is able to receive individual guidance from the teacher in the virtual reality.

Furthermore, in another embodiment, the content provided by the server device 10A may be various types of performances, talk shows, meetings, gatherings, or the like, by one or more of the staff users or the guest users through a staff avatar m2 or a guest avatar, respectively.

A mode for providing content in the virtual reality may be any mode, and, for example, if the content is video, the video is rendered on a display of a display device (virtual reality medium) within the virtual space. Note that the display device in the virtual space may be of any form, such as a screen set within the virtual space, a large screen display set within the virtual space, a display, or the like, of a mobile terminal to be carried within the virtual space.

(Configuration of the Server Device)

A specific description of the server device 10A is provided next. The server device 10A is configured of a server computer. The server device 10A may be realized through joint operation of a plurality of server computers. For example, the server device 10A may be realized through joint operation of a server computer that provides various types of content, a server computer that realizes various types of authentication servers, and the like. The server device 10A may also include a web server. In such a case, some of the functions of a terminal device 20A to be described later may be executed by a browser processing an HTML document, or various types of similar programs (Javascript), received from the web server.

The server device 10A, in the same way as described before for FIG. 1, includes the server communication unit 11, the server memory unit 12, and the server controller 13.

The server communication unit 11 includes an interface that sends and receives information by communicating wirelessly or by wire with an external device. The server communication unit 11 may include, for example, a wireless Local Area Network (LAN) communication module, a wired LAN communication module, or the like. The server communication unit 11 is able to transmit and receive information to and from the terminal device 20A through the network 3.

The server memory unit 12 is, for example, a memory device that stores various information and programs necessary for various types of processes relating to a virtual reality. For example, the server memory unit 12 stores a virtual reality application.

The server memory unit 12 also stores data for rendering a virtual space, for example, an image, or the like, of an indoor space such as a building or an outdoor space. Note that a plurality of types of data for rendering a virtual space may be prepared and properly used for each virtual space.

The server memory unit 12 also stores various images (texture images) for projecting (texture mapping) on various objects arranged within a 3D virtual space.

For example, the server memory unit 12 stores rendering information of a user avatar m1 as a virtual reality medium associated with each user. The user avatar m1 is rendered in the virtual space based on the rendering information of the user avatar m1.

The server memory unit 12 also stores rendering information for the staff avatar m2 as a virtual reality medium associated with each of the staff users. The staff avatar m2 is rendered in the virtual space based on the rendering information of the staff avatar m2.

The server memory unit 12 also stores rendering information relating to various types of objects that are different from the user avatar m1 and the staff avatar m2, such as, for example, a building, a wall, a tree, a shrub, or a Non-Player Character (NPC), or the like. These various types of objects are rendered within the virtual space based on relevant rendering information.

Below, an object corresponding to any virtual medium (e.g., a building, a wall, a tree, a shrub, or an NPC, or the like) that is different from the user avatar m1 and the staff avatar m2, and that is rendered within the virtual space, is referred to as a second object m3. Note that, in the present embodiment, the second object may include an object fixed within the virtual space, a mobile object within the virtual space, or the like. The second object may also include an object that is always arranged within the virtual space, an object that is arranged therein only in a case where designated conditions have been met, or the like.

The server controller 13 may include a dedicated microprocessor, a Central Processing Unit (CPU) that executes a specific function by reading a specific program, a Graphics Processing Unit (GPU), or the like. For example, the server controller 13, operating jointly with the terminal device 20A, executes the virtual reality application corresponding to a user operation with respect to a display 23 of the terminal device 20A. The server controller 13 also executes various processes relating to the virtual reality.

For example, the server controller 13 renders the user avatar m1, the staff avatar m2, and the like, together with the virtual space (image), which are then displayed on the display 23. The server controller 13 also moves the user avatar m1 and the staff avatar m2 within the virtual space corresponding to a designated user operation. The specific processes of the server controller 13 will be described in detail later.

(Configuration of the Terminal Device)

The configuration of the terminal device 20A will be described. In the same way as described before for FIG. 1, the terminal device 20A includes the terminal communication unit 21, the terminal memory unit 22, the display 23, the input unit 24, and the terminal controller 25.

The terminal communication unit 21 includes an interface that sends and receives information by communicating wirelessly or by wire with an external device. The terminal communication unit 21 may include a wireless communication module, a wireless LAN communication module, a wired LAN communication module, or the like, that supports a mobile communication standard such as, for example, Long Term Evolution (LTE) (registered trademark), LTE-Advanced (LTE-A), a fifth-generation mobile communication system, Ultra Mobile Broadband (UMB), or the like. The terminal communication unit 21 is able to transmit and receive information to and from the server device 10A through the network 3.

The terminal memory unit 22 includes, for example, a primary memory device and a secondary memory device. For example, the terminal memory unit 22 may include semiconductor memory, magnetic memory, optical memory, or the like. The terminal memory unit 22 stores various information and programs that are received from the server device 10A and used in processing a virtual reality. The information and programs used in processing the virtual reality are acquired from the external device through the terminal communication unit 21. For example, a virtual reality application program may be acquired from a designated application distribution server. Below, the application program is also referred to simply as the application. Furthermore, part or all of, for example, information relating to a user, information relating to a virtual reality medium of a different user, or the like, as described above, may be acquired from the server device 10A.

The display 23 includes a display device such as, for example, a liquid crystal display, an organic Electro-Luminescence (EL) display, or the like. The display 23 is able to display various images. The display 23 is configured of, for example, a touch panel that functions as an interface that detects various user operations. Note that the display 23 may be in the form of a head mounted display.

The input unit 24 includes, for example, an input interface that includes the touch panel provided integrally with the display 23. The input unit 24 is able to accept user input for the terminal device 20A. The input unit 24 may also include a physical key, as well as any input interface, including a pointing device such as a mouse, or the like. Furthermore, the input unit 24 may be capable of accepting contactless user input such as audio input or gesture input. Note that the gesture input may use a sensor (image sensor, acceleration sensor, distance sensor, dedicated motion capture with integrated sensor technology and camera, controller such as a joypad, or the like) for detecting a physical movement of a user.

The terminal controller 25 includes at least one processor. The terminal controller 25 controls the overall movement of the terminal device 20A.

The terminal controller 25 sends and receives information through the terminal communication unit 21. For example, the terminal controller 25 receives various information and programs used in various types of processes relating to a virtual reality from, at least, either the server device 10A or a different external server. The terminal controller 25 stores the received information and programs in the terminal memory unit 22. For example, a browser (Internet browser) for connecting to a web server may be stored in the terminal memory unit 22.

The terminal controller 25 starts the virtual reality application based on a user operation. The terminal controller 25, operating jointly with the server device 10A, executes various types of processes relating to the virtual reality. For example, the terminal controller 25 displays an image of a virtual space on the display 23. For example, a Graphic User Interface (GUI) that detects a user operation may be displayed on a screen. The terminal controller 25 is able to detect the user operation with respect to the screen through the input unit 24. For example, the terminal controller 25 is able to detect a user tap operation, long tap operation, flick operation, swipe operation, and the like. The tap operation involves the user touching the display 23 with a finger and then lifting the finger off therefrom. The terminal controller 25 sends operation information to the server device 10A.

Examples of a Virtual Reality

The server controller 13, operating jointly with the terminal device 20A, displays an image of a virtual space on the display 23, and then updates the image of the virtual space based on progress of a virtual reality and a user operation. In the present embodiment, the server controller 13, operating jointly with the terminal device 20A, renders an object arranged in a 3D virtual space expressed as seen from a virtual camera arranged in the virtual space.

Note that although the rendering process described below is realized by the server controller 13, in another embodiment, all or part of the rendering process described below may be realized by the server controller 13. For example, in the description below, at least part of the image of the virtual space displayed on the terminal device 20A may be a web display displayed on the terminal device 20A based on data generated by the server device 10A, and at least part of a screen may be a native display displayed through a native application installed on the terminal device 20A.

Figure 17A:
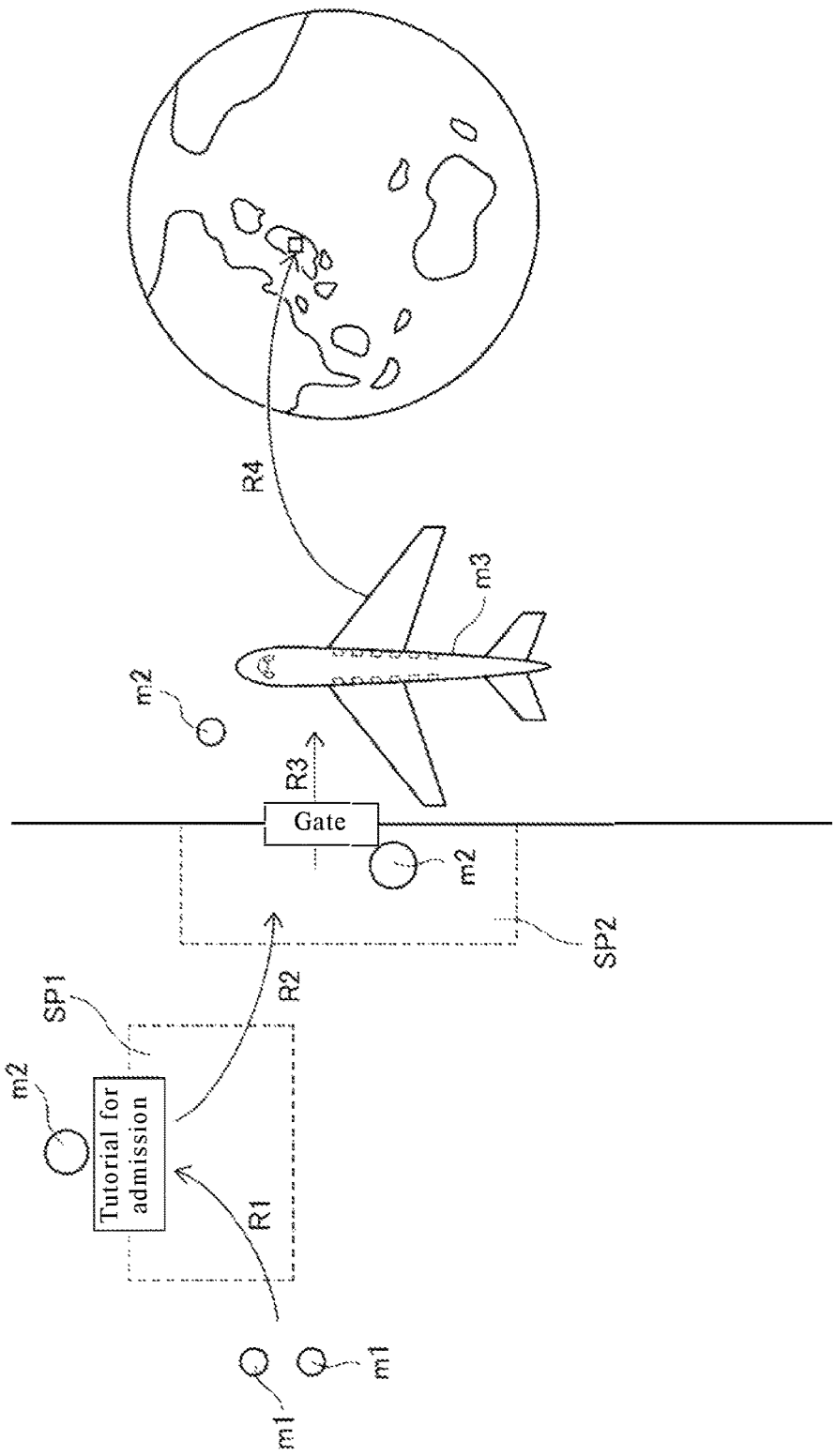
FIG. 17A is an explanatory drawing of an example of a virtual reality that can be generated by the virtual reality generating system.
Figure 17B:
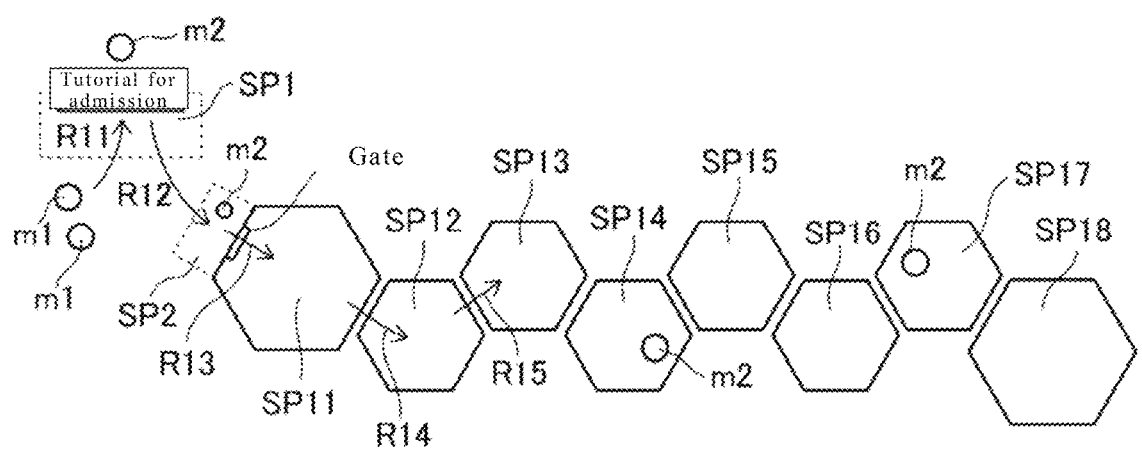
FIG. 17B is an explanatory drawing of another example of a virtual reality that can be generated by the virtual reality generating system.
Figure 17C:
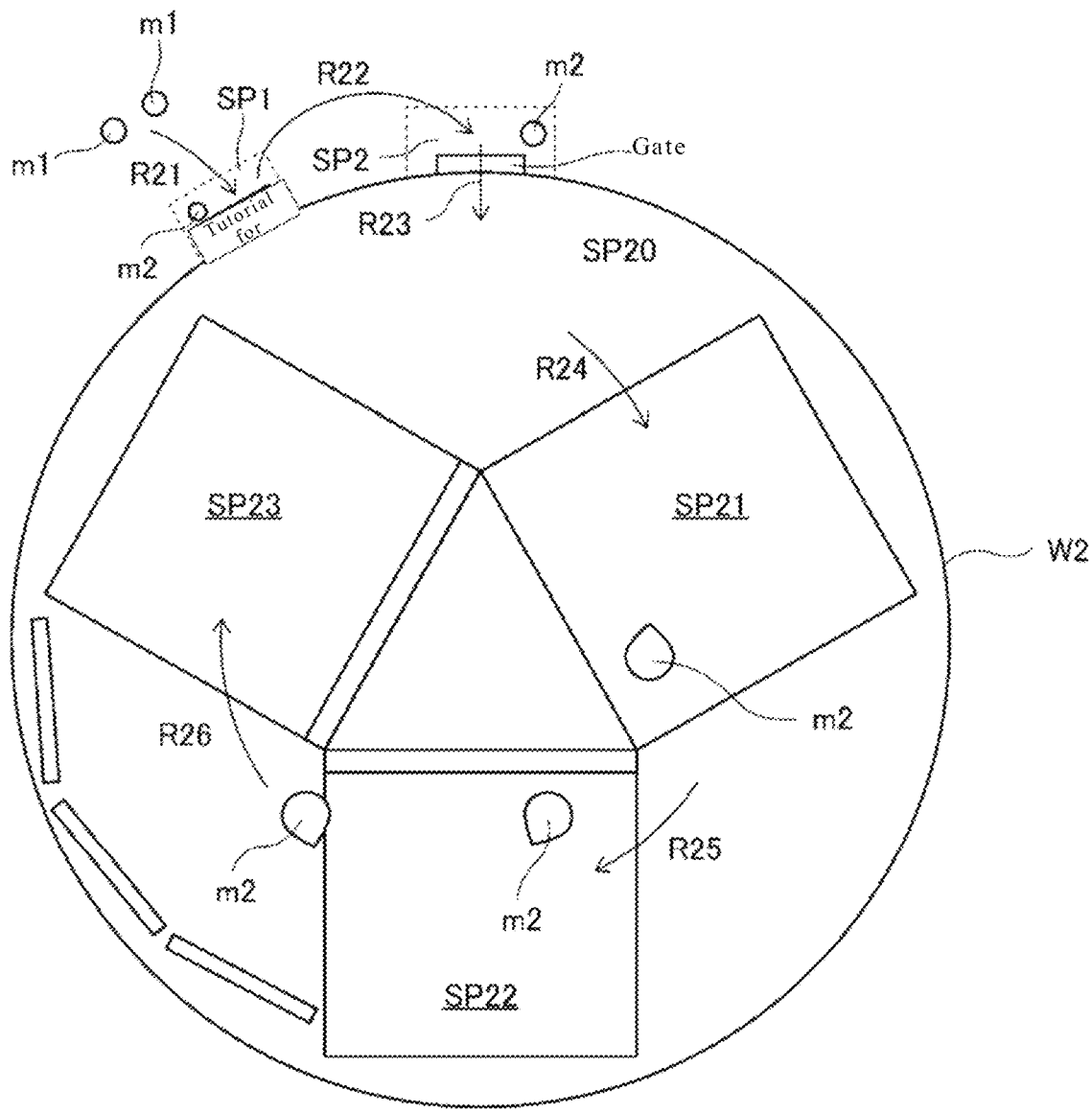
FIG. 17C is an explanatory drawing of yet another example of a virtual reality that can be generated by the virtual reality generating system.

FIG. 17A through FIG. 17C are explanatory drawings of several examples of a virtual reality that can be generated by the virtual reality generating system 1.

FIG. 17A is an explanatory drawing of a virtual reality relating to travel, and a conceptual drawing of a virtual space when viewed in a plane. In this case, a position SP1 for viewing content of a tutorial for admission and a position SP2 near a gate have been set within the virtual space. FIG. 17A illustrates the user avatar m1 that is associated with two separate users. FIG. 17A (the same applying to FIG. 17B and beyond) also illustrates the staff avatar m2.

Figure 18:
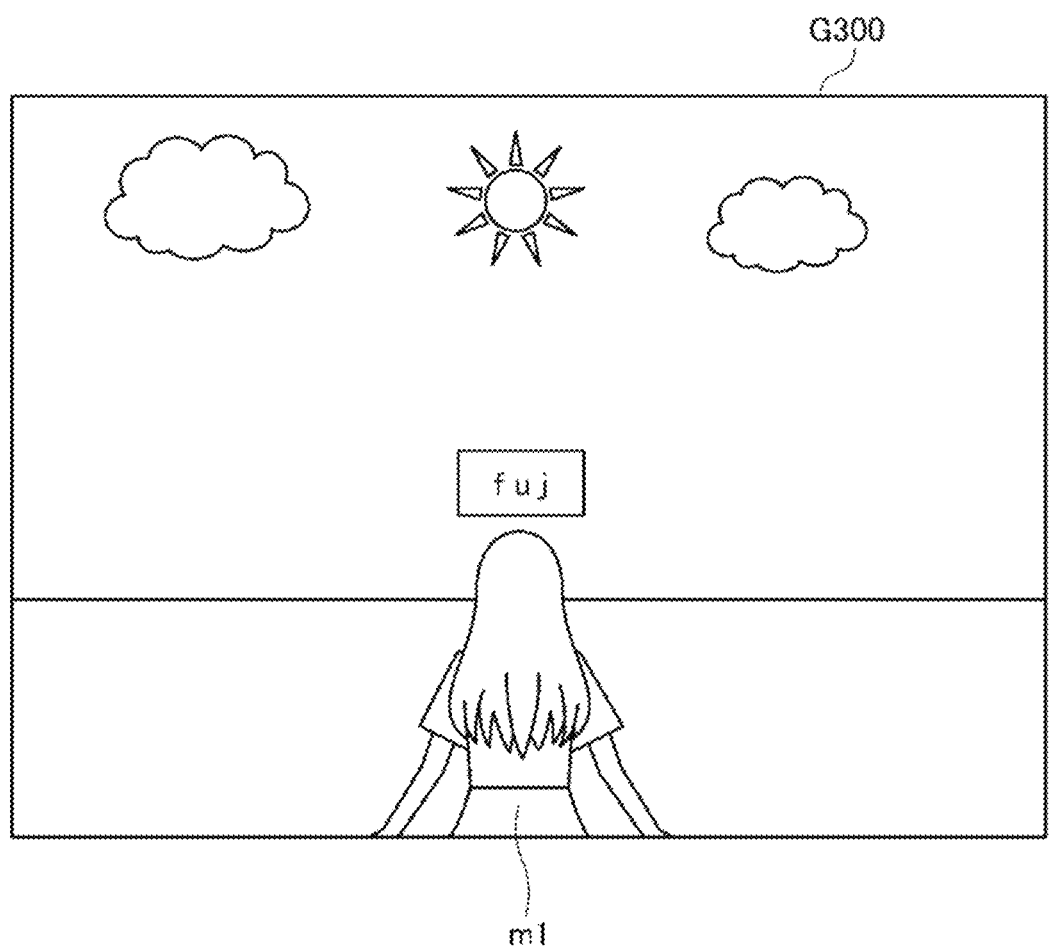
FIG. 18 is an explanatory drawing of an image of a user avatar positioned within a virtual space.

The two users have decided to travel together in the virtual reality and to enter into the virtual space, each through the user avatar m1. Then, the two users, each through the user avatar m1, view the content of the tutorial for admission (see arrow R1) at the position SP1, arrive at (see arrow R2) the position SP2, and then, pass through (see arrow R3) the gate and board an airplane (the second object m3). Note that the content of the tutorial for admission may include a precaution, or the like, on an entrance method and on use of the virtual space. Then, the airplane takes off and arrives at a desired destination (see arrow R4). During this time, the two users experience the virtual reality, each through the terminal device 20A and the display 23. For example, the image G300 of the user avatar m1 positioned within a virtual space relating to the desired destination is illustrated in FIG. 18. Thus, the image G300 may be displayed on the terminal device 20A of the user relating to the user avatar m1. In this case, the user can move and engage in sightseeing, or the like, within the virtual space through the user avatar m1 (to which the user name "fuj" has been assigned).

FIG. 17B is an explanatory drawing of a virtual reality relating to education, and a conceptual drawing of a virtual space when viewed in a plane. In this case too, the position SP1 for viewing the content of the tutorial for admission and the position SP2 near the gate have been set within the virtual space. FIG. 17B illustrates the user avatar m1 that is associated with two separate users.

The two users have decided to receive specific education in the virtual reality and to enter into the virtual space, each through the user avatar m1. Then, the two users, each through the user avatar m1, view the content of the tutorial for admission (see arrow R11) at the position SP1, arrive at (see arrow R12) the position SP2, and then, pass through (see arrow R13) the gate and arrive at the first position SP11. A specific first content is provided at the first position SP11. Next, the two users, each through the user avatar m1, arrive at (see arrow R14) a second position SP12, receive provision of a specific second content, then arrive at (see arrow R15) a third position SP13, and receive provision of a specific third content, the same following thereafter. A learning effect of the specific second content is enhanced by being provided after receipt of the specific first content, and a learning effect of the specific third content is enhanced by being provided after receipt of the second specific content.

For example, in the case of software that uses certain 3D modeling, the education may be a condition where a first content includes an install link image, or the like, for the software; a second content includes an install link movie, or the like, for an add on; a third content includes an initial settings movie; and a fourth content includes a basic operations movie. Furthermore, in a case where there are a plurality of users in the same room, the same movie content may be played back (a play back time code sent to both clients) at the same time. It is also possible to have a different movie seek state for each user without synchronized play back. Each user is able to send a face image in real time using a camera connected to a terminal. Each user is also able to display a desktop of their own computer and to mutually broadcast a screen of a different application (able to get side-by-side help with learning the application).

In the example illustrated in FIG. 17B, each user (students for example), by moving, in order, through the user avatar m1 from the first position SP11 to the eight position SP18 to receive the provision of various types of content in order, are able to receive specific education by means of a mode through which a high learning effect can be obtained. Or, the various types of content may be tasks on a quiz, or the like, in which case, in the example illustrated in FIG. 17B, a game such as Sugoroku or an escape game can be offered.

FIG. 17C is an explanatory drawing of a virtual reality relating to a lesson, and a conceptual drawing of a virtual space when viewed in a plane. In this case too, the position SP1 for viewing the content of the tutorial for admission and the position SP2 near the gate have been set within the virtual space. FIG. 17C illustrates the user avatar m1 that is associated with two separate users.

The two users have decided to receive a specific lesson in the virtual reality and to enter into the virtual space, each through the user avatar m1. Then, the two users, each through the user avatar m1, view the content of the tutorial for admission (see arrow R21) at the position SP1, arrive at (see arrow R22) the position SP2, and then, pass through (see arrow R23) the gate and arrive at a position SP20. The position SP20 corresponds to each position within a free space that excludes positions SP21, SP22, SP23, or the like, said positions corresponding to each stage, in an area surrounded by, for example, a round peripheral wall W2. When the users, each through the user avatar m1, arrive at (see arrow R24) at a first position SP21 corresponding to a first stage, the users receive provision of a first content for the lesson at the first position SP21. Furthermore, when the users, each through the user avatar m1 in same way, arrive at (see arrow R25) a second position SP22 corresponding to a second stage, the users receive provision of a second content for the lesson at the second position SP22, and, when the users arrive at (see arrow R26) a third position SP23 corresponding to a third stage, the users receive provision of a third content for the lesson at the third position SP23.

For example, in a case where the lesson is a golf lesson, the first content for the lesson may be a video describing points for improving the users' golf swings, the second content for the lesson may be to practice a sample swing by the staff user who is a professional golfer, and the third content for the lesson may be advice from the staff user who is a professional golfer on practice of the users' swings. Note that the practice of the sample swing by the staff user is realized by the staff avatar m2, and that the practice of the users' swings is realized by the user avatar m1. For example, when the staff user actually performs a movement of a swing, that movement is reflected in the movement of the staff avatar m2 based on data (e.g., gesture input data) of the movement. The advice from the staff user may be realized using a chart, or the like. Thus, each of the users, can receive, for example, various types of lessons together at home, or the like, with a friend, from a teacher (in this case, a professional golfer) in the virtual reality at an adequate pace and in adequate depth.

Thus, in the present embodiment, as is illustrated in FIG. 17A through FIG. 17C, a user, upon arriving at each content provision position can receive provision of each content associated with each content provision position in the virtual reality through the user avatar m1, at a time required by, and in a viewing format of, each user.

By the way, in the virtual reality, unlike actual reality, the virtual space can be set with relative freedom. For example, in the virtual reality, the user can design a virtual space where the provision of a plurality of content can be received while moving to each position sequentially. Thus, the virtual space is much more convenient for the user than actual reality because a distance between each position can be shortened, and because the user avatar m1 makes movement between each position is made highly efficient. For example, while things like arranging a test venue adjacent to a noisy concert venue, or the like, is difficult in actual reality due to various types of constraints, doing so is possible in the virtual reality.

Accordingly, the virtual space where the provision of a plurality of content can be received while moving to each position sequentially, can realize various concepts, such as enhancing the results of learning through a plurality of content, and realizing the provision of a plurality of content with a game-like feel, with relatively few constraints.

However, it is useful, from the perspective of enhancing an experience effect for the user through the plurality of content, to appropriately regulate an order for receiving the provision of the plurality of content in the virtual space where the provision of a plurality of content can be received while moving to each position sequentially. For example, with an education program, a condition where only general users who are users who have viewed, for example, basic content for applied learning are able to view content for applied learning in order to level-up in stages.

On the other hand, regulating movement between a plurality of positions can impair user convenience. For example, if a user who fails to meet certain provision conditions and is thus unable to move to a given content provision position cannot understand why said move cannot be realized, the user may give up and leave the virtual space. On the other hand, providing an area for a tutorial that describes the certain provision conditions or attaching the second object or a link to various types of precautions, or the like, in order to avoid generating large numbers of such users can make being inside the virtual space cumbersome, and, conversely, impair convenience.

Furthermore, diversifying what can be realized in the virtual space or complicating a structure (layout, or the like, of each position for receiving provision of the plurality of content) within the virtual space, rather than successfully enhancing the allure of the virtual space, has a tendency to make rules more complex. In such cases, there will be a strong tendency that, having struggled to become accustomed to the rules, or failing to become accustomed thereto and thus failing to do so, the user may become fed up.

With respect to this point, although attaching a tutorial on the rules, or the like, within the virtual space can be expected to, at least to some degree, enable the user to act smoothly within the virtual space, as the number of tutorials increases in conjunction with a diversification of things, and the like, that can be realized in the virtual space, this could, on the contrary, impair convenience.

Thus, in the present embodiment, the virtual reality generating system 1 includes a support function that provides various types of support through the staff avatar m2 to the general user requiring advice, or the like, while appropriately regulating the sequence for receiving the provision of the plurality of content from the perspective of enhancing the experience effect (e.g., learning, or the like) for the user through the plurality of content. Following is a detailed description of the support function (hereinafter, "user support function") provided through the staff avatar m2 (the staff user).

Although the server device 10A that relates to the user support function realizes an example of an information processing system in the following, as is described later, each element (see the terminal communication unit 21 through the terminal controller 25 in FIG. 1) of one specific terminal device 20A may realize an example of an information processing system, and a plurality of terminal devices 20A, operating jointly, may realize an example of an information processing system. Furthermore, one server device 10A and one or more terminal devices 20A may, operating jointly, realize an example of an information processing system.

Detailed Description of the User Support Function

Figure 19:
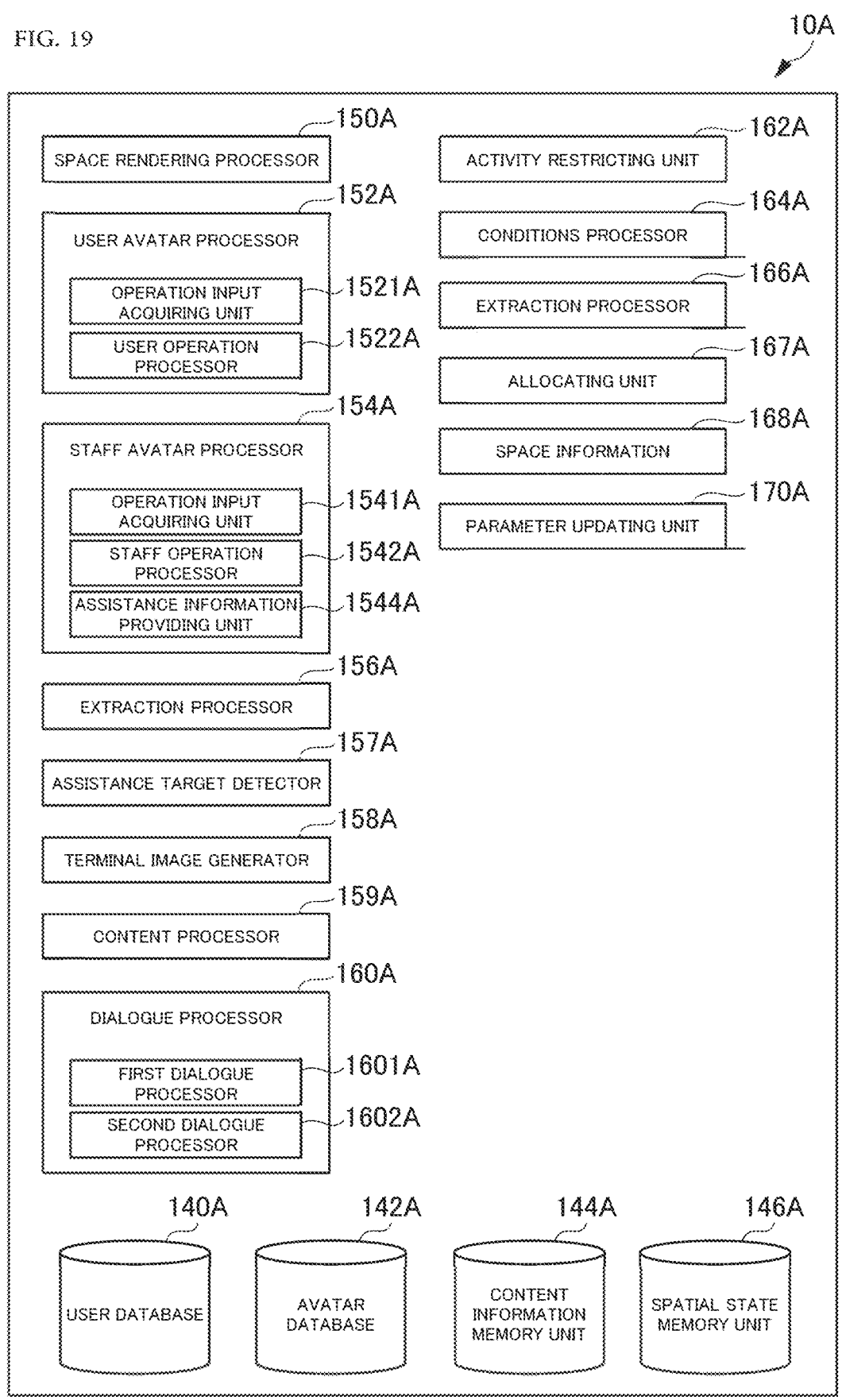
FIG. 19 is an example of a functional block diagram of a server device related to a user support function.
Figure 20:
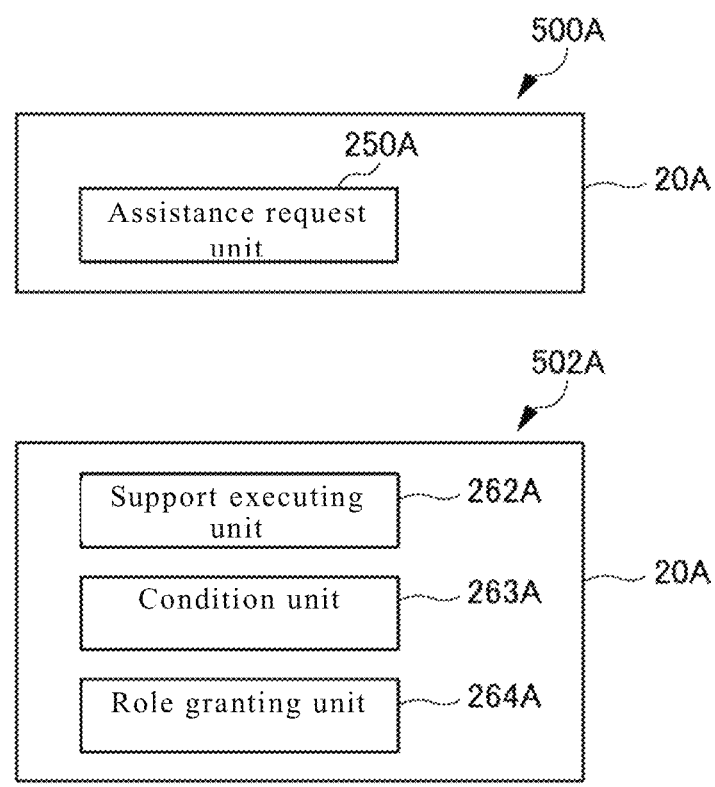
FIG. 20 is an example of a functional block diagram of a terminal device (a terminal device on a transfer receiving side) related to a user support function.
Figure 21:
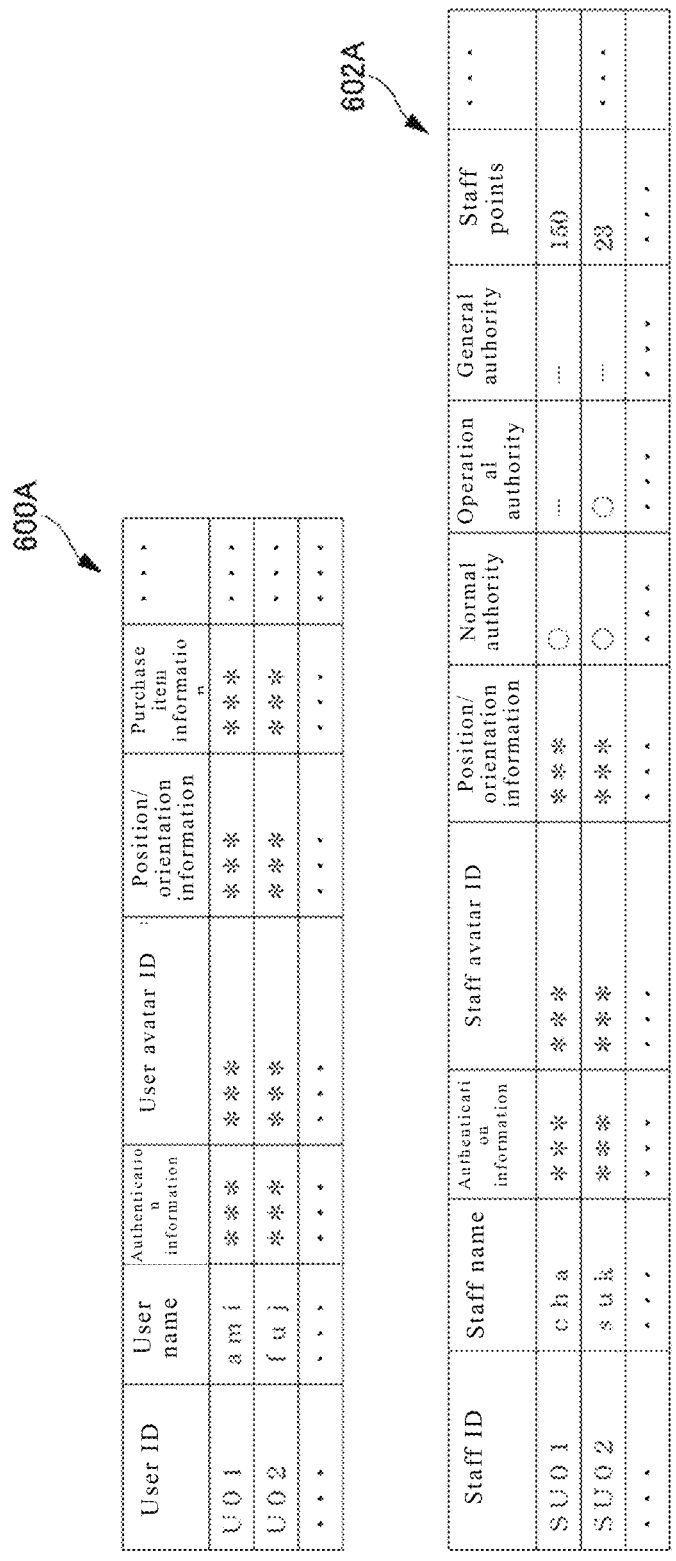
FIG. 21 is a diagram for describing data in a user database.
Figure 22:
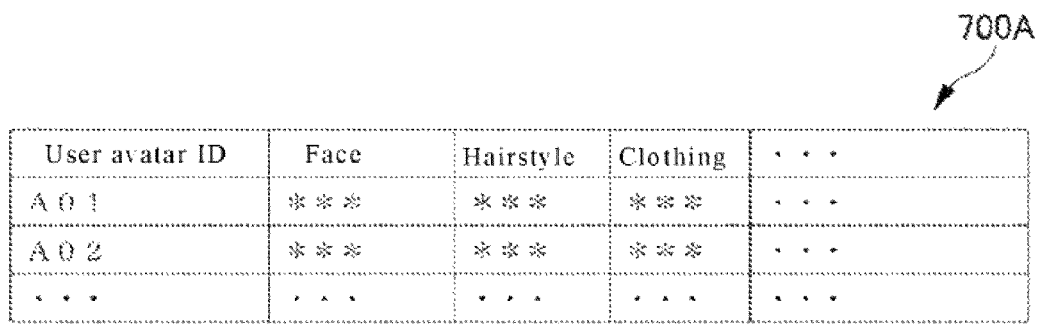
FIG. 22 is a diagram for describing data in an avatar database.
Figure 23:
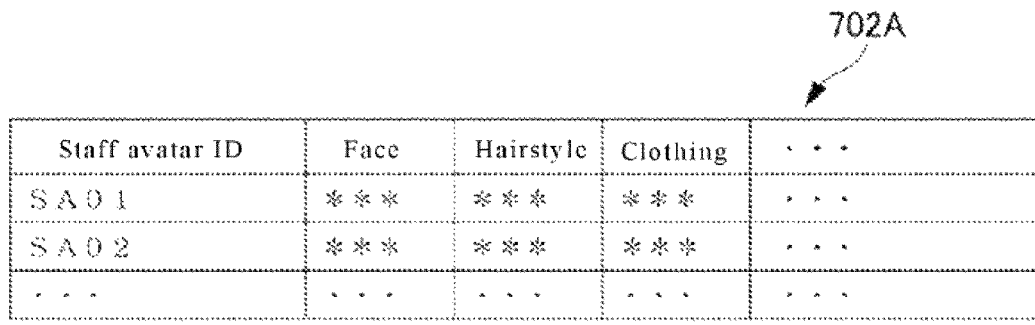
FIG. 23 is a diagram for describing data in a content information memory unit.
Figure 24:
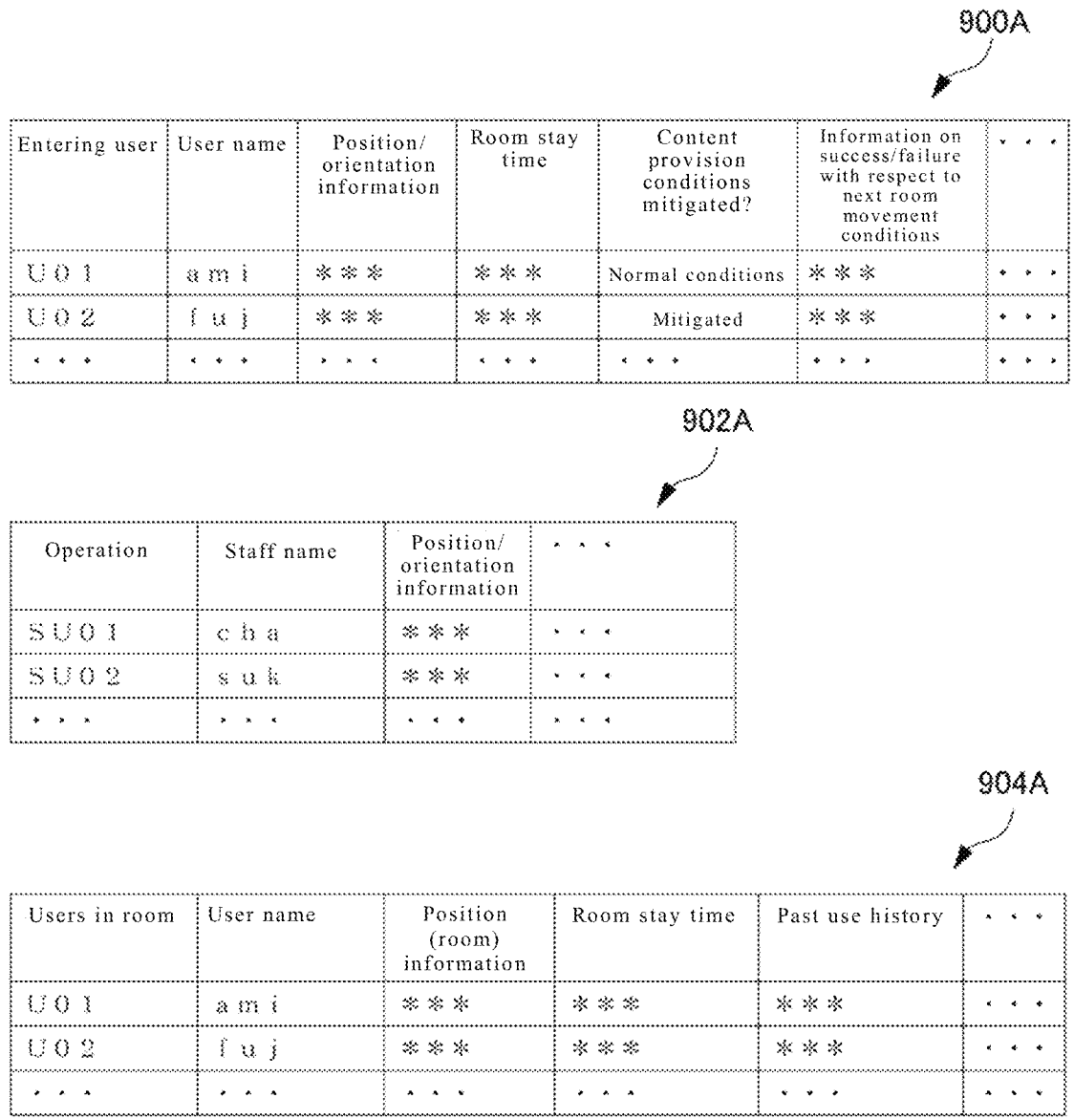
FIG. 24 is a diagram for describing data in a spatial state memory unit.

FIG. 19 is an example of a functional block diagram of the server device 10A related to a user support function. FIG. 20 is an example of a functional block diagram of the terminal device 20A (the terminal device 20A on the transfer receiving side) related to a user support function. FIG. 21 is a diagram for describing data in a user database 140A. FIG. 22 is a diagram for describing data in an avatar database 142A. FIG. 23 is a diagram for describing data in a content information memory unit 144A. FIG. 24 is a diagram for describing data in a spatial state memory unit 146A. Note that, in FIG. 21 through FIG. 24, "***" indicates a state in which some sort of information is stored, that "–" indicates a state in which no information is stored, and that " . . . " indicates repetition of the same.

As is illustrated in FIG. 19, the server device 10A includes the user database 140A, the avatar database 142A, the content information memory unit 144A, the spatial state memory unit 146A, a space rendering processor 150A, a user avatar processor 152A, a staff avatar processor 154A, a position/orientation information specifying unit 156A, an assistance target detector 157A, a terminal image generator 158A, a content processor 159A, a dialogue processor 160A, an activity restricting unit 162A, a conditions processor 164A, a extraction processor 166A, a role allocating unit 167A, a space information generator 168A, and a parameter updating unit 170A. Note that some or all of the functions of the server device 10A described below may be realized by the terminal device 20A when appropriate. Note further that the demarcation of the spatial state memory unit 146A from the user database 140A and the demarcation of the parameter updating unit 170A from the space rendering processor 150A is for the convenience of description, and that some functional units may realize the functions of other functional units. For example, the functions of the space rendering processor 150A, the user avatar processor 152A, the terminal image generator 158A, position/orientation information specifying unit 156A, the content processor 159A, the dialogue processor 160A, and the space information generator 168A may be realized by the terminal device 20A. Furthermore, some or all of the data in the user database 140A may be integrated with the data in the avatar database 142A, and stored in a different database.

Note that the spatial state memory unit 146A can be realized from the user database 140A by the server memory unit 12 illustrated in FIG. 1, and that the parameter updating unit 170A can be realized from the space rendering processor 150A by the server controller 13 illustrated in FIG. 1. Note further that part (functional unit that communicates with the terminal device 20A) of the parameter updating unit 170A can be realized from the space rendering processor 150A by the server controller 13 and the server communication unit 11 illustrated in FIG. 1.

User information is stored in the user database 140A. In the example illustrated in FIG. 21, the user information includes user information 600A relating to a general user, and staff information 602A relating to a staff user.

The user information 600A associates a user name, authentication information, a user avatar ID, and position/orientation information, purchase item information, and the like, to each user ID. The user name is any name registered personally by the general user. The authentication information is information for showing that the general user is a legitimate general user, and may include, for example, a password, email address, date of birth, watchword, biometric, or the like. The user avatar ID is an ID for specifying a user avatar. The position/orientation information includes the position information and orientation information of the user avatar m1. The orientation information may be information that indicates an orientation of a face of the user avatar m1. Note that the position/orientation information is information that can change dynamically based on operational input from the general user. In addition to position/orientation information, this may include information that represents a movement of a hand, foot, or the like, a facial expression (e.g., mouth movement), a face or head orientation or line-of-sight direction (e.g., eye orientation) of the user avatar m1, or that represents an object, or the like, that shows orientation or coordinates within the space, such as a laser pointer. The purchase item information may be information that shows what products or services, of the products and services being sold within the virtual space, the general user has purchased.

The staff information 602A associates a staff name, authentication information, a staff avatar ID, position/orientation information, staff points, and the like, to each staff ID. The staff name is any name registered personally by the staff user. The authentication information is information for showing that the staff user is a legitimate staff user, and may include, for example, a password, email address, date of birth, watchword, biometric, or the like. The staff avatar ID is an ID for specifying a staff avatar. The position/orientation information includes the position information and orientation information of the staff avatar m2. The orientation information may be information that indicates an orientation of a face of the staff avatar m2. Note that the position/orientation information is information that can change dynamically based on operational input from the staff user. In addition to position/orientation information, this may include information that represents a movement of a hand, foot, or the like, a facial expression (e.g., mouth movement), a face or head orientation or line-of-sight direction (e.g., eye orientation) of the staff avatar m2, or that represents an object, or the like, that shows orientation or coordinates within the space, such as a laser pointer.

The staff points may be a parameter that increases with each fulfillment of the staff avatar role (staff job) in a virtual reality. That is, the staff points may be a parameter for indicating how the staff user moves in the virtual reality. For example, the staff points relating to one of the staff users may be increased each time this staff user assists the general user in the virtual reality through the corresponding staff avatar m2. Or, the staff points relating to one of the staff users may be increased corresponding to a time during which this staff user is able to assist (that is, in an operating state) the general user in the virtual reality through the corresponding staff avatar m2.

The staff information 602A preferably also includes authority information granted to the staff user. Authority information represents authority relating to a role granted the staff avatar m2 for supporting the user avatar m1 acting within the virtual space. Authority may come in a plurality of types, and, in the example shown in FIG. 21, there are three types of authority: normal authority, operational authority, and general authority. Note that, in a modified example, there may be one type of authority, and that, in such a case, the authority information may not be necessary.

The normal authority is an authority granted to a normal staff user, and may be, for example, an authority that allows performance of various types of operations for supporting the user avatar m1 acting within the virtual space.

The operational authority is an authority granted to a senior staff user with more experience than the normal staff user, or to a dedicated staff user, or the like, who has been trained in a specific education program, or the like, and is, for example, an authority that allows performance of various types of operation relating to content provided within the virtual space. For example, in a case where various types of performances (e.g., an appearance of a specific second object m3 or an acoustic performance, or the like, at an appropriate time) using a script, or the like, in content provided within the virtual space, the operational authority may be an authority to perform various types of operations for the performances. Or, in a case where the sale of a product or service is executed within the virtual space, the operational authority may be an authority to perform various types of operations of a register (the second object m3) relating to the product or service.

The general authority is an authority granted to a general staff user of a higher rank than the senior staff user, and may, for example, be an authority for organizing staff users within the virtual space, such as managing (e.g., changing the authority of, or the like) all of the staff users to whom the normal authority and operational authority described above have been granted. Staff users with the general authority may include, for example, users referred to as so-called game masters. Note that the general authority may include an authority to arrange various types of second objects m3 in: an authority to select content to be provided in; and an authority to respond to a claim from the general user in the virtual space, or the like. Note that a staff user with the general authority may also have other authority (the normal authority or operational authority).

In the example shown in FIG. 21, a "○" indicates a staff user to whom the relevant authority has been granted. In this case, the staff user relating to the staff ID "SU01" has been granted the normal authority, and the staff user relating to the staff ID "SU02" has been granted the normal authority and the operational authority.

Avatar information relating to the user avatar m1 and the staff avatar m2 is stored in the avatar database 142A. In the example illustrated in FIG. 22, the avatar information includes user avatar information 700A relating to the general user, and staff avatar information 702A relating to the staff user.

The user avatar information 700A associates a face, hairstyle, clothing, and the like, with each of the user avatar IDs. Information relating to the appearance of the face, hairstyle, clothing, and the like, is a parameter that assigns characteristics to the user avatar, and is set by the general user. For example, the information relating to the appearance of the face, hairstyle, clothing, and the like, relating to an avatar may be granted an ID according to the type thereof. Furthermore, with respect to the face, a part ID may be prepared for each type of face shape, eye, mouth, nose, and the like, and information relating to the face may be managed by means of a combination of an ID for each part configuring the face. In this case, information relating to the appearance of the face, hairstyle, clothing, and the like, can function as avatar rendering information. That is, each of the user avatars m1 can be rendered on both the server device 10A side and the terminal device 20A side based on each ID relating to an appearance linked to each of the user avatar IDs.

The staff avatar information 702A associates a face, hairstyle, clothing, and the like, with each of the staff avatar IDs. Information relating to the appearance of the face, hairstyle, clothing, and the like, is a parameter that assigns characteristics to the staff avatar, and is set by the staff user. The information relating to the appearance of the face, hairstyle, and the like, just as in the case of the user avatar information 700A, may be managed by means of a combination of each part ID, and can function as the avatar rendering information. Note that the staff avatar m2 may have a common characteristic that makes distinction thereof from the user avatar m1 easy. For example, having each of the staff avatars m2 wear common clothing (uniforms) makes distinction thereof from the user avatars m1 easy.

Thus, in the present embodiment, in basic terms, one of the user IDs is associated with one of the general users, and one of the user IDs is associated with the user avatar ID. According, a state where certain information is associated with one of the general users, a state where the information is associated with the relevant one of the user IDs, and a state where the information is associated with the user avatar ID associated with the relevant one of the user IDs, are synonymous. This applies to the staff user in the same way. Accordingly, for example, unlike the example illustrated in FIG. 21, the position/orientation information on the user avatar m1 may be stored associated with the user avatar ID relating to the user avatar m1, and, in the same way, the position/orientation information on the staff avatar m2 may be stored associated with the staff avatar ID relating to the staff avatar m2. In the following description, the general user and the user avatar m1 associated with the general user are deemed to be in a relationship wherein each can be read in place of the other.

The content information memory unit 144A stores various types of information relating to the specific content that can be provided within the virtual space. For example, the unit stores a description, or the like, such as the content provision position, which is the position for providing each specific content.

In the example illustrated in FIG. 23, a content provision position (labelled "provision position" in FIG. 23) and a content description (labelled "description" in FIG. 23), and the like, are associated with each content ID.

The content provision position is a position within the virtual space, and includes a position at which the general user can receive provision of content through the content processor 159A. That is, the content provision position includes a position at which the provision of the specific content can be received. The content provision position may be defined by a coordinate value of one point, but is typically defined by a plurality of coordinate values forming a group of regions or spaces. Furthermore, the content provision position may be a position on a flat surface or a position in space (that is, a position represented by a 3D coordinate system that includes a height direction). Note that a unit of the specific content associated with the content provision position is deemed to be one specific content (one unit of the specific content). Accordingly, even in a case where two types of movies may be viewed at a certain content provision position, the two types of movie are, as a whole, one specific content.

Typically, the content provision position may be set according to an attribute of the corresponding specific content. For example, in the example illustrated in FIG. 17A, the content provision position is a position within the virtual space that can be entered through each gate. In the example illustrated in FIG. 17B, the content provision position is the first position SP11 to the eight position SP18, respectively, within the virtual space that can be entered through each gate. In the example illustrated in FIG. 17C, the content provision position is positions SP21, SP22, and SP23, respectively, within the virtual space that can be entered through each gate. The content provision position may be defined by a specific Uniform Resource Locator (URL). In this case, the general user, or the like, can move the user avatar m1, or the like, to the content provision position by accessing the specific URL. In this case, the general user can access the specific URL to receive provision of the specific content using a browser on the terminal device 20A.

The content description may include information, such as a content name, an overview, an author, and the like.

Furthermore, information representing conditions (hereinafter, "content provision conditions") that should be met in order to receive provision of the specific content for each content provision position, respectively, may be stored in the content information memory unit 144A. The content provision conditions may be set for each content ID. As is illustrated in FIG. 17B and FIG. 17C, it is preferable that the content provision conditions be set through a series of content provision positions in a virtual space that enables the receipt of a plurality of specific content that is meaningful as a whole. The content provision conditions may be any conditions, and may be set appropriately by a management side based on properties, and the like, of the specific content to be provided. Furthermore, the staff user with the general authority described above may be allowed to set and change the content provision conditions. For example, the content provision conditions relating to a certain content provision position may include that provision of the specific content is received at one or more other specific content provision positions. Since a provision sequence of a series of specific content can be regulated (controlled) in this case, the efficiency of the experience effect (e.g., education learning results) for the general user through the receipt of the provision of the series of specific content can be enhanced. Furthermore, the content provision conditions relating to a certain content provision position may include that provision of the specific content is received at one or more other specific content provision positions, and that tasks set at the one or more other specific content provision positions be cleared. In this case, the tasks set at the one or more other specific content provision positions may be tasks relating to the specific content provided at the one or more other specific content provision positions. For example, in the case of content for learning, tasks (e.g., a percentage of correct answers to a simple test or quiz) for confirming effectiveness may be set.

Two or more types of content provision conditions may be set. For example, in the example shown in FIG. 23, only normal conditions are set for content ID "CT01," while normal conditions and mitigated conditions are set for content ID "CT02." In this case, either the normal conditions or the mitigated conditions can be selectively applied to the specific content corresponding to the content ID "CT02." The mitigated conditions are easier to meet than the normal conditions. For example, under the normal conditions, a task must be cleared within a designated period of time AT1, while, under the mitigated conditions, the task may be cleared within a designated period of time AT2 that is significantly longer that the designated period of time AT1. Or, the task to be cleared under the mitigated conditions is less difficult than one to be cleared under the normal conditions. Note that a content ID to which two or more types of content provision conditions have been allocated may be set and changed by the staff user with the general authority described above.

It is assumed below, as one example in the present embodiment, that, when N is an integer of 3 or more, N number of content provision positions (N pieces of specific content) have been set in one virtual space. Furthermore, the N pieces of specific content that can be provided at the N number of content provision positions are deemed to content that can be provided in order from a first content to an Nth content. Accordingly, it is deemed that the general user cannot receive provision to a N-2nd specific content until after receiving provision of an entire N-1st specific content.

The spatial state information in the virtual space is stored in the spatial state memory unit 146A. The spatial state information represents a state relating to each activity of the user avatar m1 within the virtual space, or a state, and the like, relating to each activity (activities relating to a role) of the staff avatar m2 within the virtual space.

The spatial state information in the virtual space includes spatial state information relating to a state within a space relating to the content provision position, and spatial state information relating to a state within a space relating to a designated support position.

The content provision position is as described above. The designated support position is a position in the virtual space other than the content provision position, and a position at which the general user is likely to require assistance from the staff user. For example, the designated support position may include an entrance vicinity, or the like, relating to the content provision position. For example, in the examples illustrated in FIG. 17A through FIG. 17C, the designated support position is at the positions SP1 and SP2, and the position SP20 (see FIG. 17C).

In the following, unless otherwise stated, the spatial state information means the spatial state information relating to the state within the space relating to the content provision position. Also in the following, the space relating to each of the content provision positions in the virtual space is defined as each room that can be defined by the general user with a URL. A user accessing the same room is managed as a session linked to the same room. An avatar entering the space relating to the room may be expressed as entry to the room. Note that, although the number of users that can gain access to one room at a time may be limited by processing capacity, processing that creates a plurality of rooms with the same settings to disperse the processing load is permitted. Note that a whole connected by each room is also referred to as a world.

In the examples shown in FIG. 24, the spatial state information is managed for each content provision position (room) and the entire virtual space (the world). Specifically, the spatial state information includes user state information 900A relating to the general user, staff state information 902A relating to the staff user, and virtual space information 904A relating to the virtual space. Spatial state information relating to a certain content provision position is shown for the user state information 900A and the staff state information 902A, however, unless specified otherwise, the same may apply to spatial state information relating to the designated support position.

The user state information 900A is set for each content provision position (room), and the user state information 900A shown in FIG. 24 is related to one content provision position. For example, in the example illustrated in FIG. 17B, the staff state information 902A is set at the first position SP11 through the eight position SP18, respectively. In the same way, in the example illustrated in FIG. 17C, the information is set at the positions SP21, SP22, and SP23, respectively.

The user state information 900A associates a user name, position/orientation information, room stay time, mitigation or presence/absence of content provision conditions, information on success/failure with respect to next room movement conditions, and the like, to an entering user. The entering user is the general user relating to the user avatar m1 positioned in the content provision position, and information on the entering user may be any information (the user ID, the user avatar ID, or the like) that can be used to specify the general user. The user name is one that is based on the user information described above. Note that the user name, being information linked to the entering user, may be omitted from the user state information 900A. The position/orientation information is the position/orientation information on the user avatar m1. Note that because the entering user is the general user relating to the user avatar m1 positioned in the content provision position, the position information of the user avatar m1 corresponds to the content provision position (one of a plurality of coordinate values when this position is defined by said plurality of coordinate values). In other words, in a case where the position information of one user avatar m1 does not correspond to the content provision position, the general user relating to the one user avatar m1 is excluded from being the entering user. The position information of the user avatar m1 becomes particularly useful in a case where one content provision position is defined by a plurality of coordinate values (that is, in a case where the content provision position is a relatively large area or an entire space). In this case, the position information can represent where to position in each relatively large space.

The room stay time corresponds to a stay time spent positioned in the content provision position. The room stay time may be used in judging, and the like, the next room movement conditions.

The mitigation or presence/absence of content provision conditions is information showing which, out of the normal conditions and mitigated conditions, of the content provision conditions within the content information memory unit 144A described above with reference to FIG. 23 have been applied. Which, out of the normal conditions and the mitigated conditions, is to be applied may be set automatically in accordance with a designated rule, or there may be a case where this is mitigated by the conditions processor 164A described below. For example, in a case where a general user is relatively young (e.g., in elementary school, or the like) or, in a case where the room stay time of a general user is relatively long, the mitigated conditions may set automatically with respect to such general users from the start. Furthermore, the conditions relating to the room stay time may be removed with respect to a specific general user as part of the mitigated conditions. For example, it is acceptable to not set, or to ignore, with respect to the specific general user, an event timer that can be set for each general user.

The information on success/failure with respect to next room movement conditions represents whether or not conditions (next room movement conditions) that should be met when the entering user moves to a next content provision position. The next room movement conditions may be set arbitrarily based on the content provision conditions described above. In the present embodiment, the next room movement conditions are the same as the content provision conditions set at the content provision position relating to a next room. Accordingly, when the content provision conditions to be set at a content provision position relating to the next room with respect to a general user (the entering user) are met, the next room movement conditions are deemed to have been met. Note that the information on success/failure with respect to next room movement conditions relating to the designated support position may also represent whether or not the conditions (next room movement conditions) that should be met when moving to a next content provision position (e.g., a first content provision position) have been met.

Note that the next room movement conditions are applied to the general user (user avatar m1), and are not applied to the staff user (staff avatar m2). Accordingly, the staff avatar m2 can, in principle, move to any room freely.

The staff state information 902A may either be set for each virtual space, or for each entire room (hereinafter, "virtual space part for content provision") relating to a content provision position or a group. For example, in the example illustrated in FIG. 17B, the staff state information 902A relates to each entire space (virtual space part for content provision) relating to the first position SP11 through the eight position SP18, respectively. In the same way, in the example illustrated in FIG. 17C, the staff state information 902A relates to each entire space (virtual space part for content provision) relating to the positions SP21, SP22, and SP23, respectively.

The staff state information 902A associates the staff name and position/orientation information to operation staff. The operation staff is the staff user relating to the staff avatar m2 positioned in the content provision position, and the information on operation staff may be any information (the staff ID, the staff avatar ID, or the like) that can be used to specify the staff user.

The virtual space information 904A, in the same way as for the staff state information 902A, may either be set for each virtual space, or for each virtual space part for content provision. Specifically, in a case where a plurality of independent virtual spaces part for content provision are prepared, the virtual space information 904A may be set for each of the plurality of independent virtual space parts for content provision. Furthermore, in a case where the virtual reality generating system 1 handles the virtual space illustrated in FIG. 17B and the virtual space illustrated in FIG. 17C simultaneously, both virtual space information 904A for the virtual space illustrated in FIG. 17B and virtual space information 904A for the space illustrated in FIG. 17C may be set.

The virtual space information 904A associates the user name, position information, a space stay time, a past use history, and the like, to a user in a space. Note that, as was described above, the user name may be omitted.

The user in a space is the general user relating to the user avatar m1 positioned in one of the content provision positions within the virtual space part for content provision, and may be generated based on information on the entering user in the user state information 900A.

The position information shows at which content provision position (room) the user is positioned within the virtual space part for content provision, and may be rougher than the position/orientation information in the user state information 900A.

The space stay time is a time calculated while the user is positioned within the virtual space part for content provision, and may be generated based on the room stay time in the user state information 900A. The space stay time, in the same way as with the room stay time in the user state information 900A, may be used to judge, or the like, the next room movement conditions. The space stay time, in the same way as with the room stay time in the user state information 900A, may be used to produce a certificate of completion, or the like, showing activity results achieved within the virtual space.

The past use history is a past use history relating to the virtual space part for content provision. The past use history may include information that shows date/time, and progress status indicating to which content provision position the user has progressed within the virtual space part for content provision. The past use history may, as is described below, may be used when a role relating to the general user or to the staff user is granted. Or, the past use history may be used so that a general user who can re-enter after an interruption, or the like, can start continuation from the previous midway point.

The space rendering processor 150A renders the virtual space based on the virtual space rendering information. Note that, despite being generated in advance, the virtual space rendering information may be updated, or the like, either after the fact or dynamically. Each position within the virtual space may be defined using a spatial coordinate system. Note that although any method for rendering the virtual space is acceptable, rendering may be realized by, for example, mapping a field object, or a background object, on an appropriate flat surface, curved surface, or the like.

The user avatar processor 152A executes various types of processes relating to the user avatar m1. The user avatar processor 152A includes an operation input acquiring unit 1521A and a user operation processor 1522A.

The operation input acquiring unit 1521A acquires operation input information from the general user. Note that the operation input information from the general user is generated through the input unit 24 of the terminal device 20A described above.

The user operation processor 1522A determines the position and orientation of the user avatar m1 in the virtual space based on the operation input information acquired by the operation input acquiring unit 1521A. The position/orientation information on the user avatar m1 expresses a position and orientation determined by the user operation processor 1522A, and may be stored associated with, for example, the user ID (see the user information 600A in FIG. 21). The user operation processor 1522A may also determine various types of movement of a hand, a foot, or the like, of the user avatar m1 based on the operation input information. In this case, information on such movement may also be stored together with the position/orientation information on the user avatar m1.

In the present embodiment, the user operation processor 1522A moves each user avatar m1 in the virtual space according to restrictions from the activity restricting unit 162A described below. That is, the user operation processor 1522A determines the position of the user avatar m1 according to the restrictions from the activity restricting unit 162A described below. Accordingly, for example, in a case where the movement of a user avatar m1 toward a content provision position is restricted by the activity restricting unit 162A, the user operation processor 1522A determines the position of the user avatar m1 by a mode where the movement of the user avatar m1 toward the content provision position cannot be realized.

Furthermore, the user operation processor 1522A moves each user avatar m1 within the virtual space according to designated laws that correspond to physical laws in an actual space. For example, when the second object m3 is present corresponding to a wall in the actual space, the user avatar m1 may be prevented from passing through the wall. Furthermore, gravity corresponding to weight may be applied to the user avatar m1 from the field object, to prevent the avatar from floating in space for long periods of time unless clothed in special equipment (e.g., equipment that generates lift).

Here, the function of the user operation processor 1522A, as described above, may be realized by the terminal device 20A instead of the server device 10A. For example, movement within the virtual space may be realized by a mode in which acceleration, collision, and the like, are expressed. In this case, although each user can make the user avatar m1 jump by pointing to (indicating) a position, a decision with respect to a restriction relating to a wall surface or a movement may be realized by the terminal controller 25 (the user operation processor 1522A). In this case, the terminal controller 25 (user operation processor 1522A) processes this decision based on restriction information provided in advance. Note that, in this case, the position information may be shared with a required other user through the server device 10A by means of real time communication based on a WebSocket, or the like.

The staff avatar processor 154A executes various types of processes relating to the staff avatar m2. The staff avatar processor 154A includes an operation input acquiring unit 1541A, and staff operation processor 1542A, and an assistance information providing unit 1544A (an example of an information providing unit).

The operation input acquiring unit 1541A acquires operation input information from the staff user. Note that the operation input information from the staff user is generated through the input unit 24 of the terminal device 20A described above.

The staff operation processor 1542A determines the position and orientation of the staff avatar m2 in the virtual space based on the operation input information acquired by the operation input acquiring unit 1541A. The position/orientation information on the staff avatar m2, the position and orientation of which have been determined by the staff operation processor 1542A, may be stored associated with, for example, the staff ID (see the staff information 602A in FIG. 21). The staff operation processor 1542A may also determine various types of movement of a hand, a foot, or the like, of the staff avatar m2 based on the operation input information. In this case, information on such movement may also be stored together with the position/orientation information on the staff avatar m2.

In the present embodiment, the staff operation processor 1542A, unlike the user operation processor 1522A described above, moves each staff avatar m2 within the virtual space without following the designated laws that correspond to the physical laws in the actual space. For example, even when the second object m3 is present corresponding to a wall in the actual space, the staff avatar m2 may be allowed to pass through the wall. Furthermore, the staff avatar m2 may be allowed to float in space for long periods of time even without being clothed in special equipment. Or, the staff avatar m2 may be capable of instantaneous (warp) movement, or being made giant, or the like.

The staff avatar m2 may also be allowed to realize movements, and the like, that the user avatar m1 cannot. For example, unlike the user avatar m1, the staff avatar m2 may be given the ability to move the second object m3 corresponding to an extremely heavy object (e.g., a statue or a building). Or, the staff avatar m2, unlike the user avatar m1, may be given the ability to transfer or convert a designated item. Or, the staff avatar m2, unlike the user avatar m1, may be given the ability to move to a special space (e.g., a space corresponding to a staff room) within the virtual space in order to hold a meeting, or the like. Or, the staff avatar m2, unlike the user avatar m1, may be given the ability to wear a special item (e.g., a uniform or an armband).

The staff operation processor 1542A may also vary the freedom of movement (moves) for the staff avatar m2 based on the authority information granted the staff user. For example, the staff operation processor 1542A may grant the highest degree of freedom to the staff avatar m2 relating to the staff user with the general authority, and the next highest degree of freedom to the staff avatar m2 relating to the staff user with the operational authority.

The assistance information providing unit 1544A provides designated information to the general user according to designated input from the staff user. The designated information may be any information that may be useful for the general user, and, for example, may include advice/tips for meeting the next room movement conditions, or information, and the like, for resolving dissatisfaction, anxiety, or the like, of the general user. When there is a lot of designated information, the designated input from the staff user may include input that specifies the type of designated information to be provided. The designated information may be output by any mode through, for example, the terminal device 20A of the general user. For example, the designated information may be output using audio, video, or the like, through the terminal device 20A. Note that, in a case where the provision of the designated information is realized through a dialogue between the general user and the staff user, the provision of the designated information is realized through the second dialogue processor 1602A described below.

In the present embodiment, the designated information is assistance information that makes it possible to provide various types of assistance to the general user. Furthermore, the assistance information providing unit 1544A provides assistance information to some, or each of, the general users through the staff avatar m2 based on the user state information 900A (see FIG. 24) associated with each general user.

Because the staff user performs various types of designated input in the present embodiment in this way, various types of assistance information can be provided to the general user by the assistance information providing unit 1544A through the staff avatar m2.

For example, the staff user provides assistance information that includes advice/tips on meeting the next room movement conditions to general users who do not meet the next room movement conditions. For example, the staff user may explain the next room movement conditions, or give advice on meeting the next room movement conditions, to the general user relating to a user avatar m1 that cannot pass through and entrance to the next content provision position. Or, in a case where the entrance to the next content provision position cannot be passed unless a task has been cleared, the staff user may provide a hint, or the like, on how to clear the task.

Furthermore, the assistance information may be a practical skill, sample, or the like, based on a movement of the staff user. For example, in a case where a task is related to the specific content involves a specific physical movement, the staff user may show the general user a practical skill, or the like, for making the specific physical movement through the staff avatar m2. Or, as in the example (in the same way as in the example illustrated in FIG. 34 described below) illustrated in FIG. 17C, in a case where it is useful to receive provision of the specific content in a designated sequence, the staff user may provide advice for advancing in the designated sequence.

In the present embodiment, the assistance information providing unit 1544A may vary a capability of the staff user to provide the assistance information based on the authority information granted to the staff user. For example, the assistance information providing unit 1544A may grant an authority to provide the assistance information to all general users to the staff user with the general authority, and the authority to provide the assistance information only to the general user of the user avatar m1 positioned in a specific space to a staff user with the operational authority. The assistance information providing unit 1544A may also grant an authority to provide only standard assistance information prepared in advance to a staff user with the normal authority, and the authority to provide only assistance information for navigating the user avatar m1 to a specific guidance position, or the like, so that the assistance information can be acquired from the staff avatar m2 relating to a staff user with the general authority or the operational authority.

The position/orientation information specifying unit 156A specifies user avatar m1 position information and staff avatar m2 position information. Note that the position/orientation information specifying unit 156A may specify position information for both the user avatar m1 and the staff avatar m2 based on information from the user operation processor 1522A and staff operation processor 1542A.

The assistance target detector 157A detects the user avatar m1 (hereinafter, "assistance target user avatar m1") relating to a general user with a high likelihood of needing assistance information from among the user avatars m1 acting within the virtual space. In the present embodiment, the assistance target detector 157A may detect the assistance target user avatar m1 based on data in the spatial state memory unit 146A. For example, the assistance target detector 157A may detect an assistance target user avatar m1 based on a user avatar m1 with a relatively long room stay time, a user avatar m1 that does not move very much, a user avatar m1 that is moving as if lost, or the like. Furthermore, when a user avatar m1, for example, sends a signal, such as a raised hand, when in need of the assistance information, the assistance target detector 157A may detect the assistance target user avatar m1 based on the signal.

Note that the assistance target user avatar m1 can also be output (detected) by inputting the data in the spatial state memory unit 146A using artificial intelligence. In the case of artificial intelligence, this can be realized by implementing a convolutional neural network obtained through machine learning. In the machine learning, for example, the data in the spatial state memory unit 146A is used to learn a weight, or the like, in a convolutional neural network to minimize an error relating to detection results for the assistance target user avatar m1 (that is, an error whereby a user avatar m1 that actually does not need the assistance information is detected as the assistance target user avatar m1).

When the assistance target detector 157A detects the assistance target user avatar m1, the detector may output an instruction to the terminal image generator 158A (described below) so that the assistance target user avatar m1 is rendered by a designated rendering mode.

In the present embodiment, the assistance target detector 157A, in a case where the assistance target user avatar m1 has been detected, may generate additional information, such as a need (urgency) to provide the assistance information, or attributes of the assistance information deemed necessary, or the like. For example, the additional information may include information indicating whether the assistance information is needed through a dialogue with the second dialogue processor 1602A described below, or, on the other hand, whether it is enough to provide one-way assistance information.

Furthermore, the assistance target detector 157A may detect, as the assistance target user avatar m1, a user avatar m1 that generates an assistance request based on a direct assistance request (an assistance request from an assistance request unit 250A described below) from the general user.

The terminal image generator 158A renders each of the virtual reality media (e.g., the user avatar m1 and the staff avatar m2) that are able to move within the virtual space. Specifically, the terminal image generator 158A generates an image relating to each user displayed by means of the terminal device 20A based on the avatar rendering information (see FIG. 22), the position/orientation information on each of the user avatars m1, and the position/orientation information on the staff avatar m2.

For example, the terminal image generator 158A generates, for each of the user avatars m1, an image (hereinafter referred to as a "general user terminal image" when distinguished from a staff user terminal image to be described later) displayed by means of the terminal device 20A relating to a general user associated with one of the user avatars m1, based on the position/orientation information on this one of the user avatars m1. Specifically, the terminal image generator 158A generates an image (an image with part of the virtual space cut out) of the virtual space as seen from a virtual camera having a position and orientation corresponding to position/orientation information based on the position/orientation information on one of the user avatars m1 as a terminal image. In this case, when the position and orientation of the camera are matched to the position/orientation information, a field of view of the virtual camera substantially matches a field of view of the user avatar m1. However, in this case, the user avatar m1 is not reflected in the field of view from the virtual camera. Accordingly, when the terminal image in which the user avatar m1 is reflected is generated, a position of the virtual camera may be set behind the user avatar m1. Or, the position of the virtual camera may be adjusted in any way by the corresponding general user. Note that, when the terminal image is generated, the terminal image generator 158A may execute various types of processes (e.g., a process that bends a field object, or the like) to provide a sense of depth, and the like. Furthermore, in a case where a terminal image in which the user avatar m1 is reflected is generated, the user avatar m1 may be rendered by means of a relatively simple mode (e.g., in the form of a 2D sprite) in order to reduce a rendering process load.

Furthermore, in the same way, the terminal image generator 158A generates, for each of the staff avatars m2, an image (hereinafter referred to as a "staff user terminal image" when distinguished from the general user terminal image described above) displayed by means of the terminal device 20A relating to a staff user associated with one of the staff avatars m2, based on the position/orientation information on this one of the staff avatars m2.

In a case where another of the user avatars m1 or staff avatars m2 is positioned with the field of view from the virtual camera, the terminal image generator 158A generates a terminal image that includes the other user avatar m1 or staff avatar m2. However, in this case, the other user avatar m1 or staff avatar m2 may be rendered by means of a relatively simple mode (e.g., in the form of a 2D sprite) in order to reduce the rendering process load.

Furthermore, the terminal image generator 158A may realize a process for making a speaking state easier to understand by reproducing a speaker mouth movement, or emphasizing a size, or the like, of a speaker head. This type of process may be realized in concert with the dialogue processor 160A.

Here, the function of the terminal image generator 158A, as described above, may be realized by the terminal device 20A instead of the server device 10A. For example, in this case, the terminal image generator 158A receives the position/orientation information generated by the staff avatar processor 154A of the server device 10A, information (e.g., the user avatar ID or the staff avatar ID) that can be used to identify an avatar to be rendered, and the avatar rendering information (see FIG. 22) relating to the avatar to be rendered from the server device 10A, and renders an image of each avatar based on the received information. In this case, the terminal device 20A may store part information for rendering each part of the avatar in the terminal memory unit 22, and then render the appearance of each avatar based on the part information and avatar rendering information (ID of each part) to be rendered acquired from the server device 10A.

It is preferable that the terminal image generator 158A render the general user terminal image and the staff user terminal image by means of different modes. In this case, the general user terminal image and the staff user terminal image are rendered by means of different modes even when the position/orientation information on the user avatar m1 and the position/orientation information on the staff avatar m2 match perfectly. For example, the terminal image generator 158A may superimpose information that is not normally visible (e.g., information on success/failure of moving to a next room), which is information useful to the role of the staff user, onto the staff user terminal image. Furthermore, the terminal image generator 158A may render a user avatar m1 that does and a user avatar m1 that does not meet the next room movement conditions in the staff user terminal image based on the information on success/failure of moving to a next room (see FIG. 24). In this case, the staff user can easily distinguish between the user avatar m1 that can, and the user avatar m1 that cannot, move to the next room. As a result, the staff user can efficiently provide the assistance information to the general user relating to the user avatar m1 that cannot move to the next room.

Furthermore, upon generating the staff user terminal image, the terminal image generator 158A may vary a range for disclosing the information that is not normally visible based on the authority information granted to the staff user. For example, terminal image generator 158A may grant the widest disclosure range to the staff avatar m2 relating to the staff user with the general authority, and the next widest disclosure range to the staff avatar m2 relating to the staff user with the operational authority.

In the present embodiment, the terminal image generator 158A, in a case where the assistance target user avatar m1 has been detected by the assistance target detector 157A as described above, renders the assistance target user avatar m1 in the staff user terminal image by the designated rendering mode.

The designated rendering mode may include highlighting (e.g., blinking, a red color, or the like) to make recognition by the staff user easier. In this case, the staff user can easily find the assistance target user avatar m1.

Figure 30:
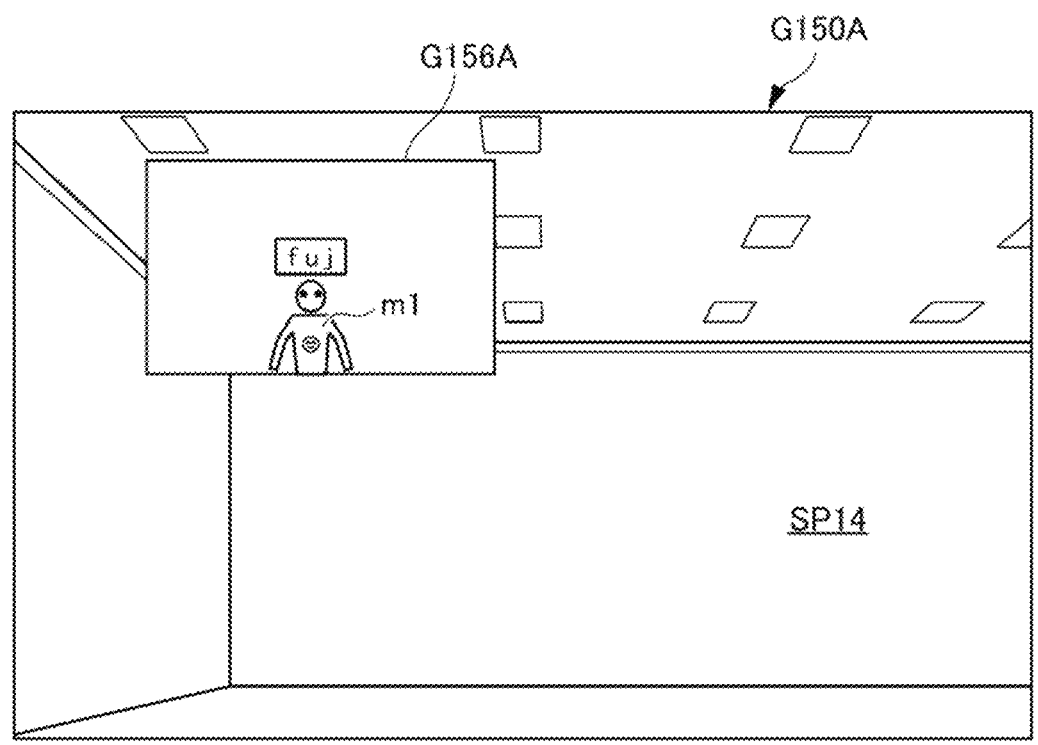
FIG. 30 is a drawing illustrating an example of yet another scene on a terminal screen.

Or, the designated rendering mode may be accompanied by an appearance of a superimposed and displayed sub-image (see sub-image G156A in FIG. 30). In this case, the terminal image generator 158A superimposes and displays a sub-image showing the assistance target user avatar m1 in a specific staff user terminal image. In this case, the specific staff user may be a staff user relating to the staff avatar m2 near the assistance target user avatar m1, or may be a staff user with the authority to provide the assistance information to the assistance target user avatar m1. Note that, in a case where a plurality of the assistance target user avatars m1 are detected by the assistance target detector 157A, a plurality of sub-images may be generated. Furthermore, the sub-images may be displayed by a mode in which a frame, or the like, blinks.

Additionally, the designated rendering mode may vary depending on the attributes of the assistance information deemed necessary. For example, an assistance target user avatar m1 that requires the assistance information because the "receipt of the specific content is not complete," and an assistance target user avatar m1 that requires the assistance information because "the receipt of the specific content is complete, but no tasks have been presented," may be rendered using different designated rendering modes. In this case, by making rules about a relationship between the designated rendering mode and the assistance information deemed necessary, the staff user can easily recognize what type of assistance information is useful to the assistance target user avatar m1 simply by looking at the rendering mode of the assistance target user avatar m1.

Furthermore, the terminal image generator 158A, in a case where the assistance target detector 157A has generated the additional information described above, may determine the staff user (e.g., the specific staff user described above) who should provide the assistance information to the assistance target user avatar m1 based on the additional information. For example, in a case where the attributes (attributes of the assistance information deemed necessary) shown by the additional information include a dialogue generated by a claim response, the terminal image generator 158A may designate the staff user with the general authority as the staff user who should assist. In this case, the terminal image generator 158A may superimpose and display a sub-image showing the assistance target user avatar m1 in a terminal image for the staff user with the general authority.

The content processor 159A provides specific content to the general user at each content provision position. The content processor 159A may output the specific content on the terminal device 20A through, for example, a browser. Or, the content processor 159A may output the specific content on the terminal device 20A through a virtual reality application installed on the terminal device 20A.

Note that, in the present embodiment, as was described above, the specific content provided by the content processor 159A is basically different for each content provision position. For example, the specific content (an example of the first content) provided at one content provision position (an example of the first position) is different than the specific content (an example of the second content) provided at a different content provision position (an example of the second position). However, the same specific content can be provided at a plurality of content provision positions.

The dialogue processor 160A includes the first dialogue processor 1601A and the second dialogue processor 1602A (an example of the information providing unit).

The first dialogue processor 1601A enables dialogue among the general users through the network 3 based on input from a plurality of the general users. The dialogue may be realized in text and/or voice chat format through the corresponding user avatar m1. This enables general users to dialogue with one another. Note that text is output to the display 23 of the terminal device 20A. Note that text may be output separate from the image relating to the virtual space, or may be output superimposed on the image relating to the virtual space. dialogue by means of text output to the display 23 of the terminal device 20A may be realized in a format that is open to an unspecified number of users, or in a format open only among specific general users. This also applied to voice chat.

In the present embodiment, the first dialogue processor 1601A may designate a plurality of general users who are able to dialogue based on the position of each user avatar m1. For example, in a case where a distance between one user avatar m1 and another user avatar m1 is equal to or less than a designated distance d1, the first dialogue processor 1601A may make dialogue possible between the general users relating to the one user avatar m1 and to the other user avatar m1, respectively. The designated distance d1 may be set appropriately, may be fixed, or may be variable according to a size, or the like, of the virtual space or each room. Furthermore, a range corresponding to the designated distance d1 may be expressed in the terminal image through coloring, or the like. For example, this is a mode in which a voice reaches a red area but not a blue area.

Also in the present embodiment, the first dialogue processor 1601A may restrict a dialogue between general users who do not have a designated relationship more than a dialogue between general users who do have a designated relationship. The dialogue restriction may be realized by restricting a time, frequency, and the like, of a dialogue. The dialogue restriction is a concept that also includes prohibiting a dialogue.

The designated relationship may be any relationship, and thus may be a relationship that forms a group, a relationship between a parent and child or with a close relative, a relationship of similar age, or the like. Or, the designated relationship may be a relationship based on having a designated item (e.g., a key, or the like). Furthermore, an object like an arrow indicating a direction to a next room may be displayed along with a sound effect or a signboard. Moreover, an effect, like increasing a restriction area that forcibly prevents running backward (e.g., moving back to a previous room), or collapsing or darkening the ground in an area where movement is not possible, may be added.

In the present embodiment, the designated relationship may be judged based on the data (an example of the state information) in the spatial state memory unit 146A. In this case, the designated relationship may be a relationship of having the same user state information. For example, the first dialogue processor 1601A may enable a dialogue between general users relating to each of the user avatars m1 positioned in a space (room) relating to the same content provision position. Thus, given that, in a case where, for example, a plurality of general users visit the virtual space as a group, dialogue within the group will not be possible when one of the users moves to the next room, the users will be able to enjoy a related change. Or, the users may be motivated to catch up with a friend who has moved to the next room. Furthermore, since this enables control of user behavior through natural guidance, the resulting effect is that it becomes possible to reduce a number of staff users who guide the users. Finally, to show the remaining user he/she is alone, a message saying "We are all waiting for you in the next room," can be displayed on a screen showing how many people are in each room.

The second dialogue processor 1602A enables dialogue between the general user and the staff user through the network 3 based on input from the general user and input from the staff user. The dialogue may be realized in text and/or voice chat format through the corresponding user avatar m1 and staff avatar m2.

Furthermore, as is described above, the second dialogue processor 1602A functions in concert with the assistance information providing unit 1544A of the staff avatar processor 154A, or, in place of the assistance information providing unit 1544A. This enables the general user to receive assistance from the staff user in real time.

Furthermore, the second dialogue processor 1602A may enable dialogue among the staff users through the network 3 based on input from a plurality of the staff users. Dialogue among staff users may be in private, for example, may disclosed only among the staff users. Or, the second dialogue processor 1602A may vary a range in which the staff users may dialogue based on the authority information granted to the staff users. For example, the second dialogue processor 1602A may grant, to the staff avatar m2 relating to the staff user with the general authority, the authority to dialogue with all of the staff users, and may grant, to the staff avatar m2 relating to the staff user with the operational authority, the authority to dialogue with the staff user with the general authority only in certain cases.

In the present embodiment, the second dialogue processor 1602A may designate one of the plurality of general users as a general user who is able to dialogue with the staff user based on the position of each user avatar m1 and the position of the staff avatar m2. For example, in a case where a distance between one staff avatar m2 and one user avatar m1 is equal to or less than a designated distance d2, the first dialogue processor 1601A described above may make dialogue possible between the staff user relating to the one staff avatar m2 and the general user relating to the one user avatar m1. The designated distance d2 may be set appropriately, may be fixed, or may be variable according to a size, or the like, of the virtual space or each room. Furthermore, the designated distance d2 may be longer than the designated distance d1 described above.

Moreover, the second dialogue processor 1602A may vary a dialogue capability based on the authority information granted to the staff users. For example, the second dialogue processor 1602A may apply the longest designated distance d2 to the staff avatar m2 relating to the staff user with the general authority, and the next longest designated distance d2 to the staff avatar m2 relating to the staff user with the operational authority. The second dialogue processor 1602A may also grant a function (a function like a voice from heaven) that enables dialogue with all users to the staff avatar m2 relating to the staff user with the general authority. Or, the second dialogue processor 1602A may make any dialogue possible for the staff avatar m2 of the staff user with the general authority but only dialogue relating to relative their roles for the staff avatars m2 relating to staff users with other authorities.

Furthermore, in the present embodiment, the second dialogue processor 1602A may change the general user who can dialogue with the staff user based on a request (input) from the staff user. For example, the second dialogue processor 1602A, by temporarily increasing the designated distance d2, may extend a range of general users who may dialogue with the staff user. Thus, when, for example, the staff user, on its own, finds, in a position relatively distant from its own staff avatar m2, the user avatar m1 in apparent need of assistance, the staff user can talk to the general user of the user avatar m1 relatively quickly. Note that, in this case, the staff operation processor 1542A may instantly move the staff avatar m2 of the staff user to the vicinity of the relatively distant user avatar m1 (that is, may realize movement that violates the designated laws described above). Thus, since the general user spoken to can immediately recognize, through a terminal image displayed on its own terminal device 20A, the staff avatar m2 who spoke to it, the general user feels more secure and is thus able to receive support through a smooth dialogue.

The activity restricting unit 162A restricts activities relating to the plurality of content provided by the content processor 159A, said activities being those of each user avatar m1 within the virtual space. The activities relating to the content may include receipt of provision of the content itself, as well as an act (e.g., a movement) for receiving provision of the content.

In the present embodiment, the activity restricting unit 162A restricts activities based on the data (an example of the state information) in the spatial state memory unit 146A.

Specifically, the activity restricting unit 162A restricts the activities of each user avatar m1 within the virtual space based on the information on success/failure of moving to a next room (see FIG. 24). For example, the activity restricting unit 162A prohibits a general user who does not meet certain content provision conditions from moving to a relevant content provision position. This type of movement prohibition may be realized by any mode. For example, the activity restricting unit 162A may disable an entrance to the relevant content provision position only for the general user who does not meet the relevant content provision conditions. Such disabling may make the entrance invisible or difficult to see, and may be realized by setting a wall at the entrance so that the user avatar m1 cannot pass, or the like.

Conversely, the activity restricting unit 162A allows a general user who meets certain content provision conditions to move to a relevant content provision position. This type of movement allowance may be realized by any mode. For example, the activity restricting unit 162A may enable the entrance to the relevant content provision position only for the general user who meets the relevant content provision conditions. Such enabling (transitioning from the disabled state) changes the entrance from being invisible to being visible, and may be realized by removing the wall at the entrance that the user avatar m1 could not pass, or the like. This type of movement allowance may also be realized based on input from the staff user. In this case, the staff user may detect a user avatar m1 that meets own room movement conditions based on information that is not normally visible (e.g., information on success/failure with respect to next room movement conditions). Division can also be realized by, in addition to such spatial movement and visibility, the first dialogue processor 1601A in an embodiment where the allowed general user is rendered unable to dialogue (e.g., in verbal conversation) with a general who has yet to be allowed. This is thus able to prevent the leak of an unnecessary hint, spoiler, or the like, from, for example, the former general user to the latter general user. Furthermore, since the latter general user cannot advance to a next step until it finds an answer itself, it becomes possible to encourage such a general user to participate (find answers).

The conditions processor 164A mitigates some or all of the content provision conditions of the plurality of specific content that can be provided by the content processor 159A for some or all of the plurality of general users based on input from the staff user. Or, the conditions processor 164A makes some or all of the content provision conditions of the plurality of specific content that can be provided by the content processor 159A stricter for some or all of the plurality of general users based on input from the staff user. That is, the conditions processor 164A may change the content provision conditions applied to a specific general user between normal conditions and mitigated conditions (see FIG. 23) based on input from the staff user. Since this makes it possible to change the strictness of the content provision conditions at the discretion, or the like, of the staff user, the content provision conditions can be set appropriately according to a fitness and level of each general user.

In the present embodiment, the conditions processor 164A may change the content provision conditions based on input from all staff users, and may also change the content provision conditions based on input from a staff user who meets certain conditions. For example, the conditions processor 164A may change the content provision conditions based on input from the staff user with the general authority. Since this enables the setting of content provision conditions that are only appropriate for the staff user with the general authority, it is possible to achieve a fair balance among general users.

The extraction processor 166A detects the first user who has received provision of at least a designated volume of content of the plurality of specific content that can be provided by the content processor 159A, or of the specific content, based on the user state information 900A (see FIG. 24) associated with each general user. The designated volume is any number of one or more, and may be, in a virtual space where N pieces of specific content can be provided, either, for example, N/2 pieces or N pieces.

The role allocating unit 167A grants at least part of a role relating to the staff avatar m2 within the virtual space to the user avatar m1 associated with the general user detected by the extraction processor 166A based on input from the staff user. That is, convert the general user into the staff user. At least part of the role is optional, and, for example, may be a relatively unimportant part of the role of the staff user with the general authority. Furthermore, for example, at least part of the role may be a role, or part thereof, that is the same as that of the staff user to whom the normal authority has been granted. Or, at least part of the role may be a role, or part thereof, that is the same as that of the staff user to whom the operational authority has been granted.

In this case, the role allocating unit 167A may grant at least part of a role relating to the staff avatar m2 within the virtual space based on input from the staff user with the general authority. This enables selection of a candidate general user at the responsibility of the staff user with the general authority. Accordingly, the staff user with the general authority can, for example, can have a general user with an extensive understanding of a role to be granted effectively function as a staff user and play the role thereof appropriately.

The staff user with the general authority is also able, on his/her own, to search for and solicit a candidate general user other than the general user detected by the extraction processor 166A. For example, in a situation where there is no staff user to sell a given product (e.g., clothing an avatar can wear), the staff user with the general authority may search for (e.g., search based on the purchase item information in the user information 600A) a general user who purchases the product very frequently and solicit the general user to act as a staff user who sells a relevant item. In this case, a general user who purchases the product frequently, or in large quantities, is highly likely to be familiar with the product, and can thus be expected to provide appropriate advice as a staff user to a general user intending to purchase the product.

Note that the role allocating unit 167A can increase/decrease a role granted to a user who has been converted from a general user to a staff user based on input from the staff user with the general authority. This enables a burden of a role relating to the user who has been converted from a general user to a staff user to be adjusted appropriately. Various types of information, like that shown for the staff information 602A in FIG. 21, may be assigned to the general user who has been converted to a staff user in this way. In this case, information relating to the role may be associated with the user who has been converted from a general user into a staff user in place of, or in addition to, the authority information in the staff information 602A. The information relating to the role may be provided at any level of granularity, and may be adapted to the granularity of the role. The same applies to the role (authority information) of the staff user.

Thus, in the present embodiment, the user can go from being a general user to being a staff user, and a user who wants to become a staff user can be motivated to receive provision of at least a designated volume of content. A general user who has received provision of at least a designated volume of content is highly likely to have acquired an ability from the content to fulfill a granted role, and can be expected to effectively engage in skill enhancement through specific content.

Note that, in the present embodiment, a user who is able to become a staff user can, when entering into the virtual space, choose to enter as a general user or to enter as a staff user.

The space information generator 168A generates the spatial state information to be stored in the spatial state memory unit 146A described above, and then updates the data in the spatial state memory unit 146A. For example, the space information generator 168A may monitor, of a regular or irregular basis, each entering user in terms of success/failure with respect to next room movement conditions, and then update the information on success/failure with respect to next room movement conditions.

The parameter updating unit 170A updates the staff points described above. For example, the parameter updating unit 170A may update the staff points according to an operating status of each staff user based on the spatial state information shown in FIG. 24. For example, the parameter updating unit 170A may update the staff points by means of a mode whereby more of the staff points are granted the longer an operating time lasts. The parameter updating unit 170A may also update the staff points based on a number of times the general user was supported, or the like (speaking volume, speaking frequency, number of times attended to, number of complaints, or the like), via chat, or the like. Furthermore, the parameter updating unit 170A, in a case where a product or a service is sold in the virtual reality, may update the staff points based on the status (e.g., sales proceeds) of the sale of the product or service by the staff user. Or, the parameter updating unit 170A may update the staff points based on information on a level of satisfaction (e.g., evaluation values, or the like, included in survey information) in the staff user that can be input by the general user. Note that the staff points update may be appropriately executed, for example, periodically, and in batch based on log information.

A product or service sold by the staff user may be a product or service that is usable in reality, or a product or service that can be used in the virtual reality. The product or service sold by the staff user may be related to the content provided at the content provision position, and the content may, for example, include an item, or the like, that can increase an experience relating to the content. For example, in a case where the content is related to the travel described above, the item may be a telescope, or the like, that makes it possible to see a long distance away, or may be feed, or the like, that can be given to an animal, or the like. Furthermore, in a case where the content is related to sports or a concert, the item may be a support good, or a right to take a commemorative photo, or have a conversation, or the like, with a player or an artist.

FIG. 20 shows both a function 500A that is realized using the terminal device 20A relating to the general user, and a function 502A that is realized using the terminal device 20A relating to the staff user. Note that FIG. 20 only shows functions relating to the user support function of the various types of functions realized using the virtual reality application downloaded, or the like, to the terminal device 20A. Note that, the virtual reality application makes it possible to load a user application for executing the function 500A and a staff application for executing the function 502A separately, or to switch between the function 500A and the function 502A within one application through a user operation.

The terminal device 20A relating to the general user includes the assistance request unit 250A. The assistance request unit 250A sends an assistance request to the server device 10A through the network 3 based on input from the general user. Note that, because the assistance request includes a terminal ID associated with the terminal device 20A and a user ID for the virtual reality application logged into, the assistance target user avatar m1 is specified in the server device 10A based on the assistance request.

Note that, in the present embodiment, since the assistance target user avatar m1 is, as is described above, detected by the assistance target detector 157A of the server device 10A, the assistance request unit 250A may be appropriately omitted.

The terminal device 20A relating to the staff user includes a support executing unit 262A, a condition changing unit 263A, and a role granting unit 264A. Note that some or all of the function 502A realized by the terminal device 20A relating to the staff user described below may be realized by the server device 10A. Furthermore, the support executing unit 262A, the condition changing unit 263A, and the role granting unit 264A illustrated in FIG. 20 form one example, and thus some may be omitted.

The support executing unit 262A sends the assistance request for providing the assistance information to the general user from the assistance information providing unit 1544A described above to the server device 10A through the network 3 based on the designated input from the staff user. For example, the support executing unit 262A, in response to the designated input from the staff user, sends the assistance request with the user avatar m1 detected by the assistance target detector 157A of the server device 10A to the server device 10A as an assistance information transmission target. Note that the staff user may determine the assistance information transmission target user avatar m1 on its own. For example, the staff user, as is described above, may specify the assistance target user avatar m1 (the user avatar m1 not detected by the assistance target detector 157A) based on information that is not normally visible (e.g., the information on success/failure with respect to next room movement conditions) that can be superimposed into the terminal image. The assistance request may also include information, or the like, that instructs on the content of the assistance information to be generated.

The condition changing unit 263A sends a request (condition change request) instructing a condition change like that described above by the conditions processor 164A to the server device 10A based on input from the staff user. For example, the condition changing unit 263A, in response input for the condition change from the staff user, sends a condition change request targeting a specific user avatar m1 to the server device 10A. Note that the specific user avatar m1 may be the assistance target user avatar m1 detected by the assistance target detector 157A of the server device 10A, and may, in the same as the assistance information transmission target, be determined by the staff user on its own.

The role granting unit 264A sends a request (role grant request) instructing granting of a role by the role allocating unit 167A like that described above to the server device 10A based on input from the staff user. For example, the role granting unit 264A, in response to input for role granting from the staff user, sends the role grant request to the server device 10A. Note that the role grant request may include information that specifies the user avatar m1 to be targeted for granting of a role, information indicating content of the role to be granted, and the like.

An operation example relating to the user support function described above will be described next with reference to FIG. 25 and beyond. Note that although the following operation example is a specific operation example, an operation relating to the user support function described above may be, as is described above, realized using various functions.

As one example in the following, an operation example relating to the user support function described above will be described below with respect to the virtual space illustrated in FIG. 17B.

Figure 25:
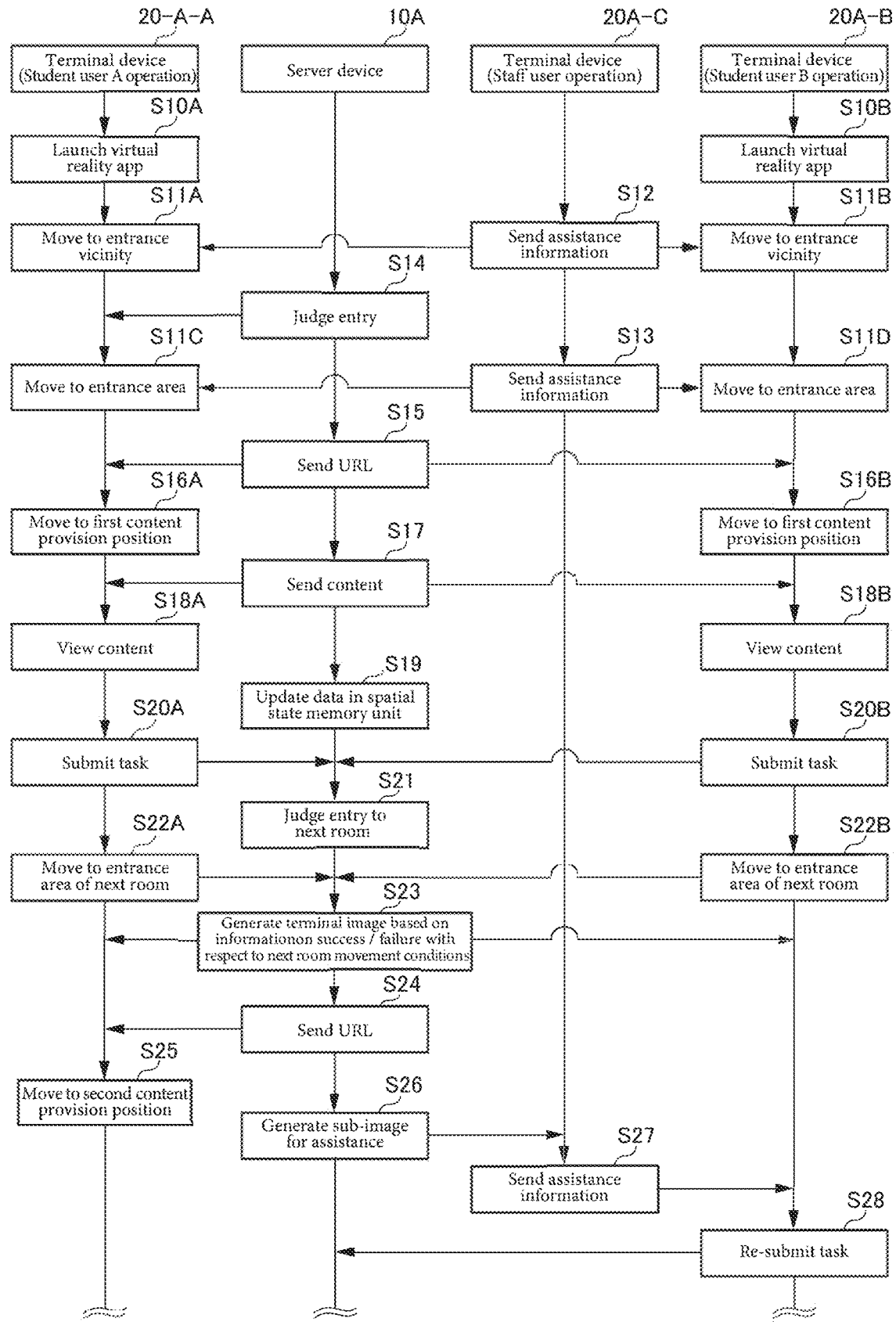
FIG. 25 is a timing chart illustrating an operation example related to a user support function.

FIG. 25 is a timing chart illustrating an operation example related to the user support function described above. In FIG. 25, for purposes of differentiation, the symbol "20A-A" is assigned to a given terminal device 20A relating to the general user, the symbol "20A-B" is assigned to a terminal device 20A relating to a different general user, and the symbol "20A-C" is assigned to the terminal device 20A relating to the staff user. In the following, the general user relating to the terminal device 20A-A is given the user name "ami," the general user relating to a terminal device 20-B is given the user name "fuj," and both are students (e.g. the user name "ami" is a student user A and the user name "fuj" is a student user B). Also in the following, the general user relating to the user name "ami" refers to the student user A, and the general user relating to the user name "fuj" is the student user B. Furthermore, although a plurality of staff users are registered in the following, the terminal device 20A-C is illustrated by a mode that includes each of the terminal devices 20A relating to these staff users. Furthermore, although the sending of the assistance information from the terminal device 20A-C to the terminal devices 20A-A and 20A-B is illustrated in FIG. 25 as being by a direct mode for convenience and to avoid complicating the drawing, the information may also be sent through the server device 10A.

Figure 26:
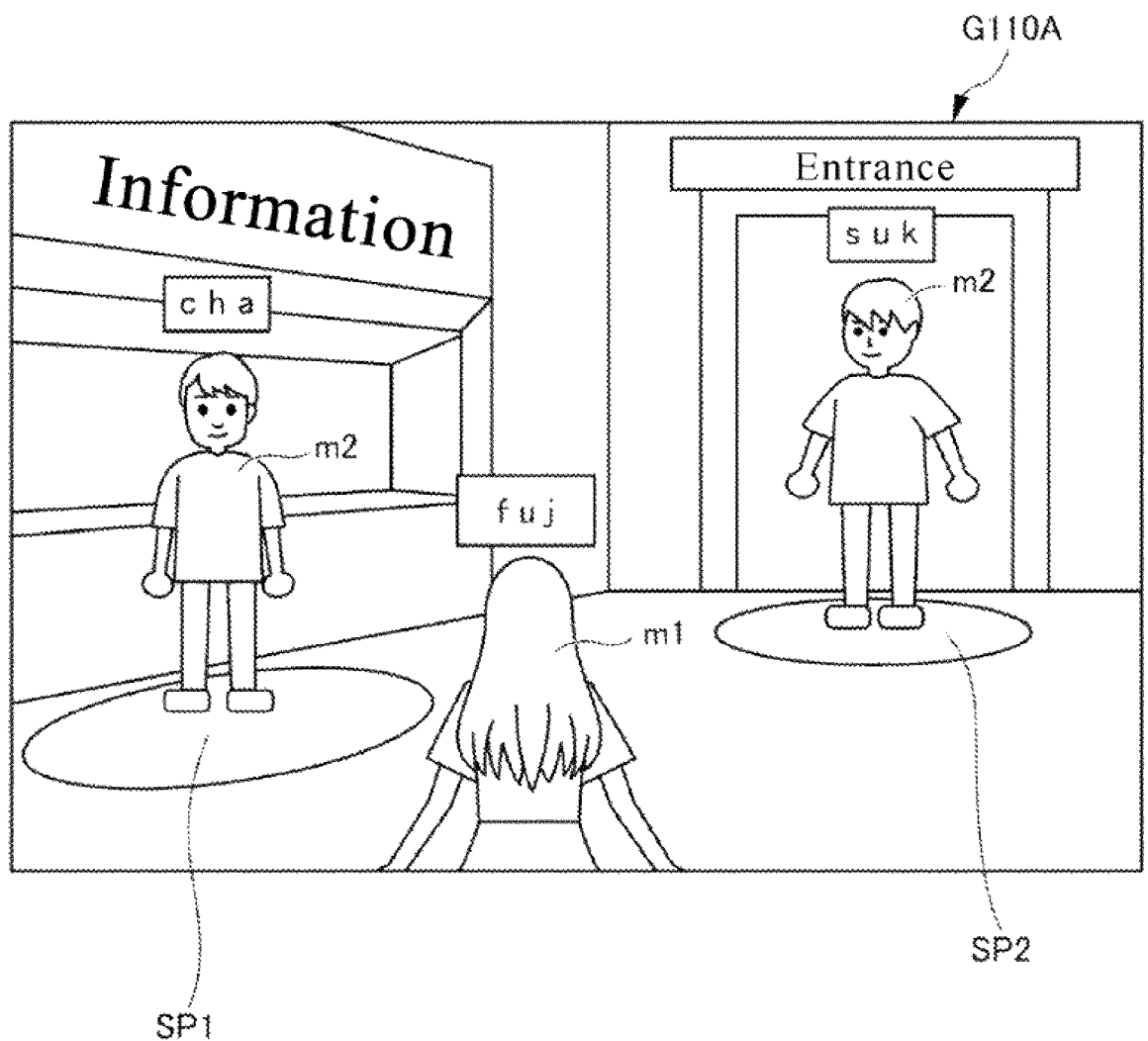
FIG. 26 is a drawing illustrating an example of one scene on a terminal screen.
Figure 27:
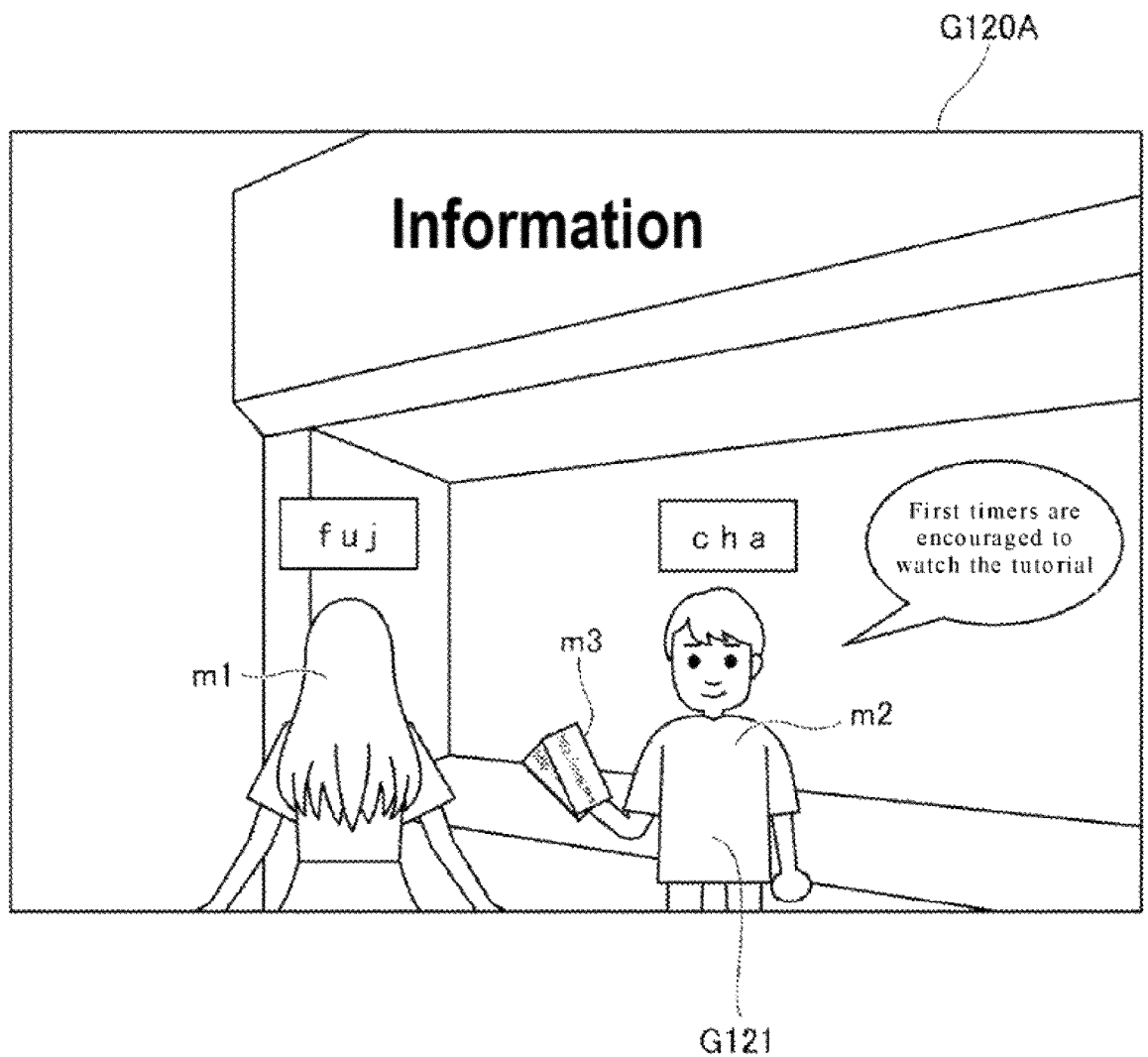
FIG. 27 is a drawing illustrating an example of another scene on a terminal screen.
Figure 28:
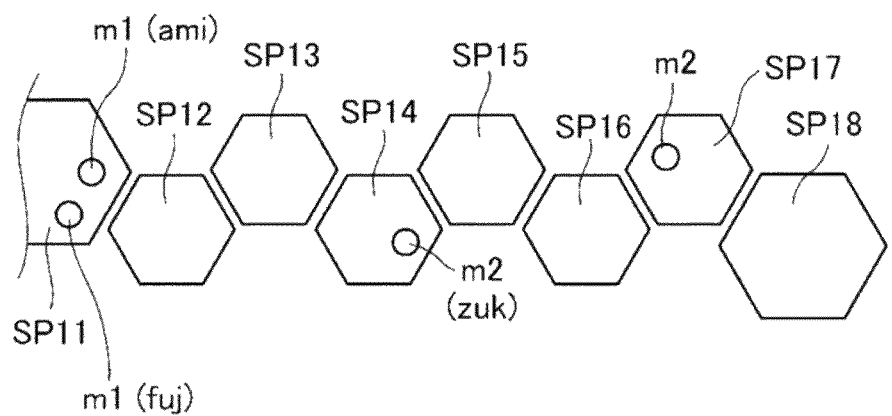
FIG. 28 is a diagram illustrating a state within a virtual space part for content provision at a given point in time.

FIG. 26, FIG. 27, and FIG. 29 through FIG. 33 are explanatory drawings of the operation example illustrated in FIG. 25, and are drawings illustrating one example of the terminal screen in each scene. FIG. 28 is a drawing schematically illustrating a state in the virtual space illustrated in FIG. 17B at a given point in time.

First, the student user A launches the virtual reality application in the terminal device 20A-A in step S10A, and the student user B launches the virtual reality application in the terminal device 20A-B in step S10B. Note that the virtual reality application can be launched in the terminal devices 20A-A and 20A-B, respectively, and that the application may be launched with a time lag at any time. Note that although, here, the staff user is deemed to have already launched the virtual reality application in the terminal device 20A-C, the launch timing is arbitrary.

Next, in step S11A, the student user A enters the virtual space, and then moves its own user avatar m1 to an entrance vicinity relating to a first content provision position. Next, in step S11B, the student user B enters the virtual space, and then, within the virtual space, moves its own user avatar m1 to the entrance vicinity relating to the first content provision position. FIG. 26 illustrates a terminal image G110A for the student user B when the user avatar m1 of the student user B is positioned at the entrance vicinity relating to the first content provision position. Note that, in the state illustrated in FIG. 26, the user avatar m1 of the student user A is deemed to be behind the user avatar m1 of the student user B. As is illustrated in FIG. 26, from terminal image G110A for the student user B, it can be understood that the staff avatar m2 associated with a staff name "cha" is arranged in association with the position SP1, and that the staff avatar m2 associated with a staff name "suk" is arranged in association with the position SP2 corresponding the entrance area relating to the first content provision position.

In this case, the student user A and the student user B may receive the assistance information sent (in step S12) from the staff avatar m2 with the staff name "cha." For example, the student user A and the student user B may receive a guide on viewing the content of the tutorial for admission. The assistance information may include a URL for viewing the content of the tutorial for admission. FIG. 27 illustrates a terminal image G120A for the student user B when receiving assistance from the staff avatar m2 with the staff name "cha" at the position SP1. Note that the chat text saying "First timers are encouraged to watch the tutorial!" is illustrated in FIG. 27 based on input from the staff user with the staff name "cha." Note that this sort of chatting may be generated automatically.

After viewing the tutorial for admission, the student user A and the student user B move toward the position SP2 that corresponds to the entrance area (step S11C and step S11D). At this time, the student user A and the student user B may receive the assistance information sent (in step S13) from the staff avatar m2 with the staff name "suk" at the position SP2. For example, the student user A and the student user B may receive assistance in the form of advice, or the like, relating to the next room movement conditions. In this case, the server device 10A performs a room entry decision (step S14) based on whether or not the student user A and the student user B have met the next room movement conditions before step S13. Here, it is assumed that the student user A and the student user B have been assisted by the staff user and have met the next room movement conditions. In this case, the server device 10A sends (step S15) a URL for moving toward the first content provision position to the terminal device 20A-A and 20A-B, respectively. Note that the URL for moving toward the first content provision position may be rendered in the form of a ticket on the second object m3 (see FIG. 27).

Figure 29:
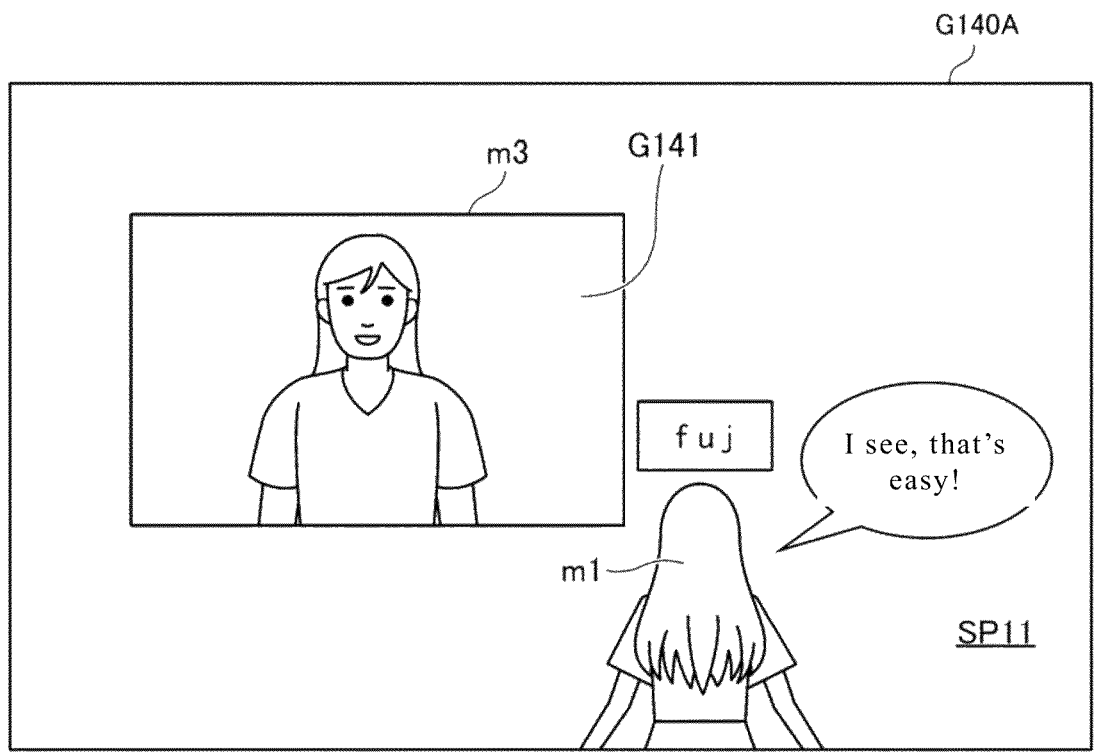
FIG. 29 is a drawing illustrating an example of yet another scene on a terminal screen.

Furthermore, the student user A and the student user B move (steps S16A and S16B) to the first content provision position (see the first position SP11 in FIG. 28) by accessing the URL sent from the server device 10A. After the student user A and the student user B move their user avatars m1 to the first content provision position in this way, the server device 10A sends (step S17) the specific content associated with the first content provision position to the terminal devices 20A-A and 20A-B, respectively. This enables the student user A and the student user B to receive (step S18A and step S18B) provision of the specific content associated with the first content provision position. FIG. 29 illustrates a terminal image G140A for the student user B taken during receipt of provision of the specific content at the first position SP11 in FIG. 28. The terminal image G140A corresponds to a state where video content is being output to the image part G141 corresponding to a big screen (the second object m3). The student user A and the student user B can receive provision of the specific content at the first position SP11 by viewing the video content on the big screen through their terminal images G140A. As is illustrated in FIG. 29, the terminal image G140A includes chat text saying "I see, that's easy!" based on input from the student user B. This enables the student user A and the student user B to receive provision of the specific content associated with the first content provision position while interacting appropriately with one another.

Note that, during this time, either regularly or when a designated change occurs, the server device 10A makes appropriate updates (step S19) to the data (room stay time, and the like, in FIG. 24) in the spatial state memory unit 146A based on the states of the user avatars m1 of the student user A and the student user B, respectively.

The student user A and the student user B, after receiving provision of the specific content associated with the first content provision position, submit tasks (steps S20A and S20B), or the like, relating to the specific content. The tasks, or the like, may be submitted by any method, including the use of a URL for submitting tasks. The server device 10A performs the room entry decision based on whether or not the student user A and the student user B have met the next room movement conditions, and then updates (step S21) the data (see the information on success/failure with respect to next room movement conditions in FIG. 24) in the spatial state memory unit 146A based on the results of the tasks submitted by the student user A and the student user B through their user avatars m1.

The student user A and the student user B, after submitting the tasks, move their user avatars m1, and arrive (steps S22A and S22B) at an entrance area relating to a second content provision position (see FIG. 28). The server device 10A generates (step S23) a terminal image according to success/failure information with respect to next room movement conditions based on success/failure information with respect to next room movement conditions for the student user A and the student user B. Here, the student user A has met the next room movement conditions, but the student user B has not met the next room movement conditions. In this case, for example, the server device 10A generates a terminal image in which an entrance that allows movement to the second content provision position is rendered for the student user A, and a terminal image in which a wall is rendered in the entrance that allows movement to the second content provision position for the student user B. Furthermore, the server device 10A sends (step S24) a URL for moving toward the second content provision position to the terminal device 20A-A. Note that the URL for moving toward the second content provision position may be rendered in the terminal image in which the entrance that allows movement to the second content provision position is rendered. In this case, the terminal device 20A-A may detect and automatically access the URL using image recognition, or the like. This enables the student user A to advance (step S25) its user avatar m1 toward the second content provision position.

Meanwhile, the server device 10A renders (step S26) the user avatar m1 of the student user B in the staff user terminal image as the assistance target user avatar m1 using a mode (the designated rendering mode described above) that is different from that of the other user avatar m1. At this time, the rendering mode for the assistance target user avatar m1 may be one that, as is described above, allows the staff user, upon seeing the mode, to understand what the mode means (e.g., "Receipt of the specific content is complete, but the next room movement conditions have not been met").

Figure 31:
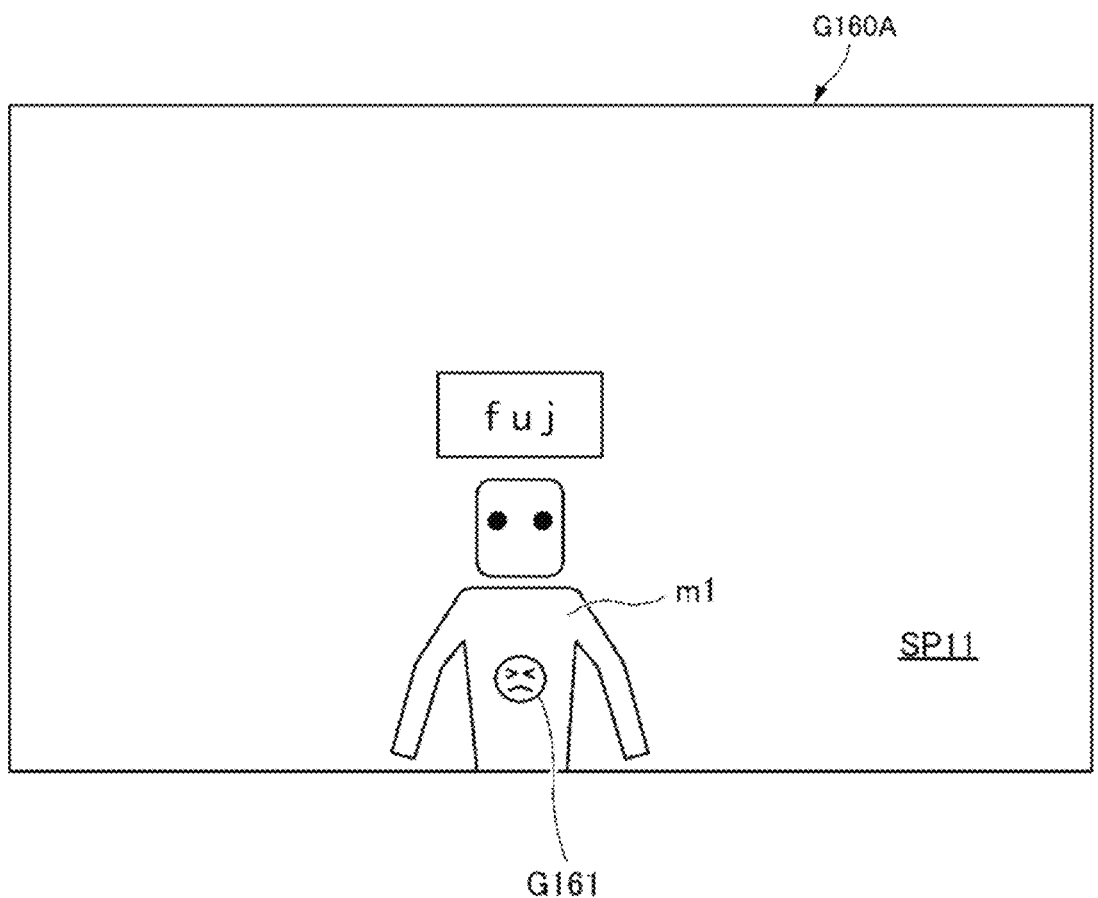
FIG. 31 is a drawing illustrating an example of yet another scene on a terminal screen.

In the present embodiment, the server device 10A, after detecting the assistance target user avatar m1, displays a sub-image for assistance superimposed on a main image in the staff user terminal image. FIG. 30 illustrates a staff user terminal image G150A taken when the assistance target user avatar m1 was detected. A sub-image G156A taken when the assistance target user avatar m1 was detected appears in the staff user terminal image G150A. In this case, the assistance target user avatar m1 (user name "fuj") is depicted in the sub-image G156A. The staff user by, for example, tapping the sub-image G156A, can instantaneously move the staff avatar m2 to a position relating to the sub-image G156A. In this case, the sub-image G156A becomes a full-screen display, and a terminal image G160A like that illustrated in FIG. 31 is displayed on the terminal device 20A-C of the staff user relating to the staff avatar m2 (staff name "zuk") that tapped the sub-image G156A. An image part G161, with characteristics illustrating a high possibility that assistance through a dialogue is needed, is associated with the assistance target user avatar m1 in the terminal image G160A. Accordingly, the staff user can easily specify the assistance target user avatar m1, even in a case where a plurality of user avatars m1 are included in the terminal image G160A. Note that, here, it is assumed that the staff user (staff name "zuk") relating to the staff avatar m2 positioned in a room relating to a position SP14 in FIG. 28 has instantly moved the staff avatar m2 toward the first position SP11 by tapping the sub-image G156A.

Figure 32:
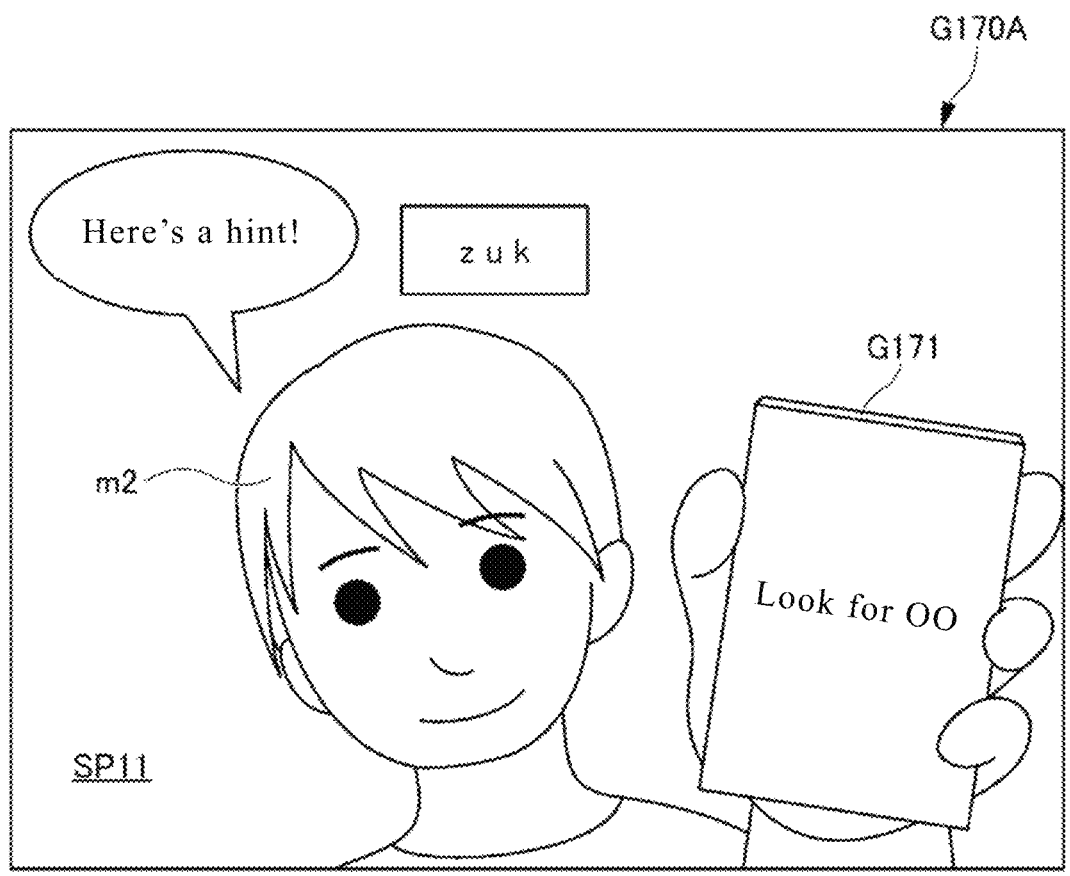
FIG. 32 is a drawing illustrating an example of yet another scene on a terminal screen.

The staff user, upon finding the assistance target user avatar m1 (user name "fuj") in this way, can move its own staff avatar m2 next to the assistance target user avatar m1 (user name "fuj") and transmit the assistance information by a dialogue, or the like. As is described above, information that is not normally visible (e.g., the reason, or the like, that the next room movement conditions have not been met) is superimposed in the staff user terminal image. Accordingly, since the staff user can understand the reason the user avatar m1 with the user name "fuj" did not meet the next room movement conditions, the user can transmit appropriate assistance information corresponding to that reason. Here, the staff user (staff name "zuk") relating to the staff avatar m2 positioned in the room relating to the position SP14 in FIG. 28 instantly moves the staff avatar m2 toward the first position SP11, and transmits (step S27) the assistance information to the general user with the user name "fuj" using a dialogue. FIG. 32 illustrates a terminal image G170A for the student user B taken when the assistance information was transmitted. The terminal image G170A, as is illustrated in FIG. 32, may include an image part G171 showing a hint, or chat text saying "Here's a hint!" based on the input of the staff user relating to the staff avatar m2 (staff name "zuk"). This makes it possible for the student user B to not only learn the reason for not being able to advance to the next room but to also to resubmit (step S28) the task, or the like, so as to meet the next room movement conditions.

Figure 33:
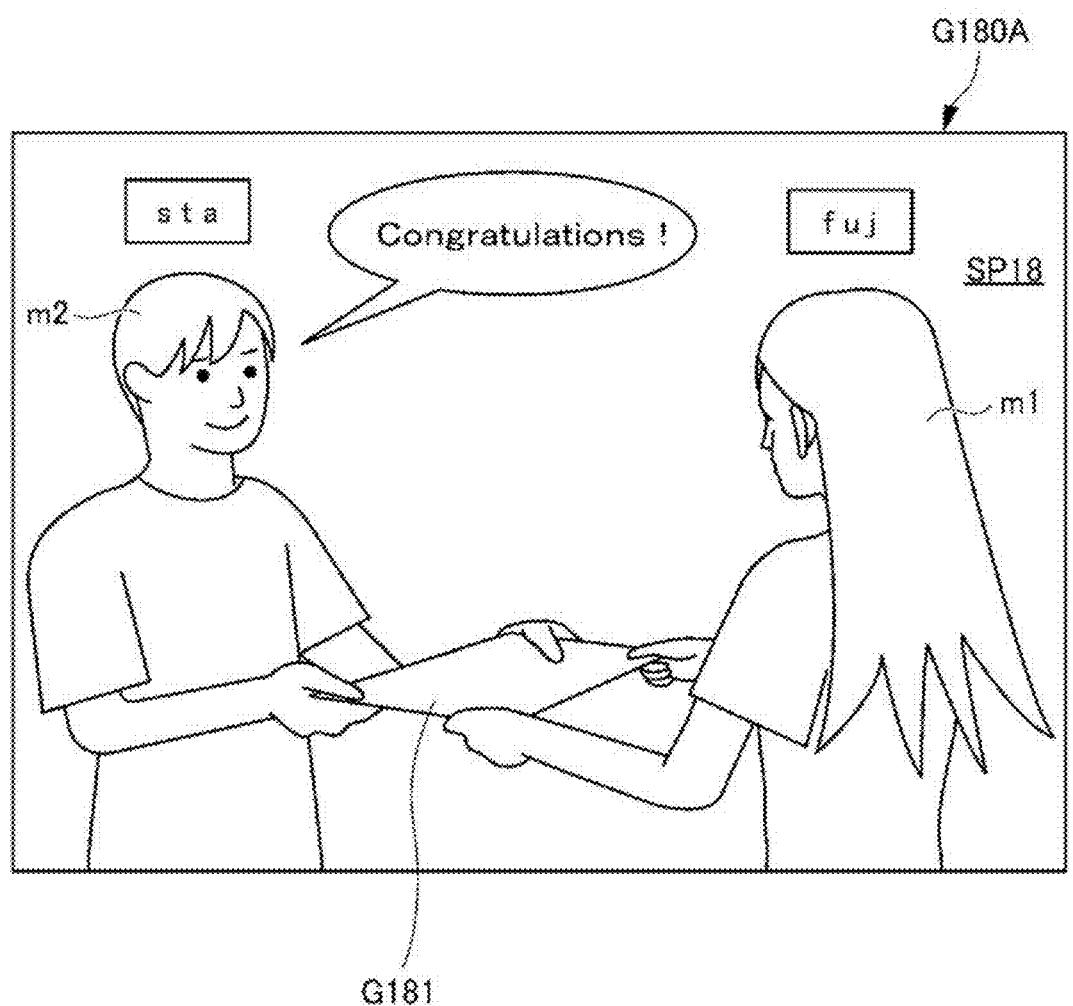
FIG. 33 is a drawing illustrating an example of yet another scene on a terminal screen.

In this way, the student user A and the student user B receive provision of the corresponding specific content in each room (each content provision position), and proceed in order toward the next room by clearing the corresponding task while appropriately receiving assistance from the staff user. During this time, the students are able to advance smoothly to the eight position SP18, which is, for example, a goal, by receiving assistance from the staff user. FIG. 33 illustrates a terminal image G180A for the student user B taken during the successful movement to the eight position SP18, which is the goal. The terminal image G180A, as is illustrated in FIG. 33, may include an image part G181 of a certificate of completion, or chat text saying "Congratulations!" based on the input of the staff user relating to the staff avatar m2 (staff name "sta"). Furthermore, the certificate of completion may disclose current results, or the like. Note that a general user who has acquired this type of certificate of completion may be detected by the extraction processor 166A described above as a candidate to be granted a role enabling the user to function as a staff user in the corresponding virtual space part for content provision. Or, the role enabling the general user who has acquired this type of certificate of completion to function as the staff user in the corresponding virtual space part for content provision may be granted to the user automatically by the role allocating unit 167A described above.

Figure 34:
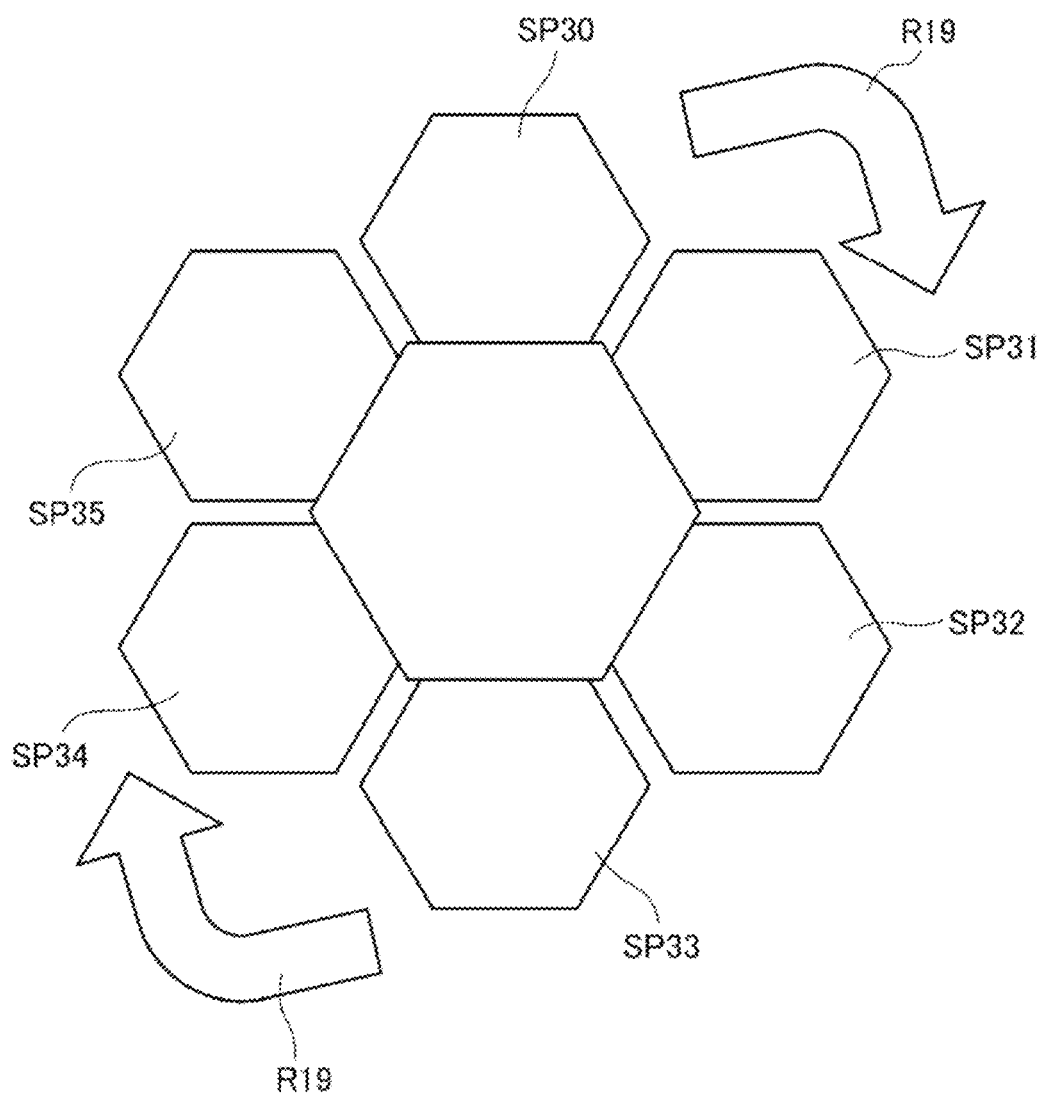
FIG. 34 is an explanatory drawing of yet another example of a virtual reality that can be generated by the virtual reality generating system.

Note that the operation example described above with reference to FIG. 25 through FIG. 33 is, as is described above, an example of an operation example relating to the user support function described above with respect to the virtual space illustrated in FIG. 17B, however, this example may also be applied in the same way to another virtual space. May, for example, be applied in the same way to the other virtual space using a mode (see arrow R19) that, as is illustrated in FIG. 34, starts from a start position (e.g., a position not illustrated in the figure adjacent to a position SP30), orbits clockwise, and visits position SP30 through position SP35, which are content provision positions, in order. Specifically, this mode assumes that all general users will arrive at a goal, but, for example, the following types of conditions may be set.

(1) A defeat judgment resulting in not obtaining a certificate of completion when a time limit according to a timer displaying elapsed time is exceeded.

(2) Being forcibly moved to a previous room or to any room along a loser route, or the like, when failing to correctly respond to a task (e.g., a 3-choice quiz) in any room.

(3) Forcibly moving a loser to a room where a user who is still playing can be observed, to observe this other user.

(4) A condition that cannot to contribute directly to an action but can be revived, or the like, by an option chosen by the other user. In this way, interests, in addition to each content in this type of virtual space, can be effectively enhanced.

This concludes the detailed description of Embodiment 2 with reference to the drawings, however, the specific configuration of the present invention is not limited to Embodiment 2, and thus includes designs, and the like, within a range that does not deviate from the gist thereof.

For example, in Embodiment 2 described above, the staff avatar m2 was operated by the staff user (a person), but may be operated based on a program, such as a bot program. In this case, the staff avatar m2 may, as a mobile medium associated with a non-player, play a role that is the same as that of the staff avatar m2 associated with the staff user (a person), or may play a different role.

Also, in Embodiment 2 described above, although only one of the next content provision positions has been set with respect to a certain content provision position, as is illustrated in, for example, FIG. 17B, the embodiment is not limited to this. That is, two or more of the next content provision positions may be set with respect to a certain content provision position. In this case, the general user of the user avatar m1 that has met the next room movement conditions at the certain content provision position may, by its own choice, advance toward one intended content provision position out of two or more of the next content provision positions. Or, the content provision position, out of the two or more next content provision positions, to which the user will advance next may be determined based on a parameter, or the like, such as a performance on a submitted task or a space stay time at the certain content provision position. Or, the content provision position, out of the two or more next content provision positions, to which the user will advance next may be determined randomly.

Further, in Embodiment 2 described above, although a specification is such that only a general user who has met the content provision conditions relating to the specific content in the next room automatically meets the next room movement conditions and is thus able to move to the next room, the embodiment is not limited this. For example, the specification may also be such that even a general user who does not meet the content provision conditions relating to the specific content in the next room can move to the next room (provided, however, that user will not be able to receive provision of the specific content of the next room).

Moreover, in Embodiment 2 described above, a point with respect to an activity relating to the user avatar m1 in the virtual space may be set as a point similar to the staff points or as a point that is different from the staff points. For example, like the operation example described above with reference to FIG. 25 through FIG. 33, in a case where the general user is a student, the point may reflect a grade (a grade based on a task) of each student.

Finally, in Embodiment 2 described above, although the authority to arrange various types of the second objects m3, to select the content to be provided, and the like, in the virtual space was granted to the staff user to whom the general authority was granted, the embodiment is not limited to this. For example, an authority to design the point itself and/or an authority to customize an event itself may be granted to the user (e.g., the staff user or the general user). In this case, customize may include setting and/or changing content of, for example, an event. In this case, distribution of a movie produced by the user can be set, or the like, as the event. For example, the event can be one based on User Generated Content (UGC) any user can generate. In this case, a specific event can be set based on various content. Note that the UGC can be produced by a content designer (user) in a tabular format (database). The UGC can also be distributed to the content market. Furthermore, a user avatar (a UGC content designer or user avatar relating to a user involved in the production thereof) may directly guide a "trip they personally wish to introduce" as a tour guide relating to a specific event. Furthermore, each user can add an additional experience through a user avatar as a visitor by placing UGCs relating to various types of experiences in a gallery within the virtual space. In this case, the content designer can produce UGCs using a tabular format (database). Furthermore, each user can generate a user experience scenario by setting coordinates, a perspective, an event, and item, a message, or the like.

Furthermore appendices relating to Embodiment 2 described above are disclosed below.

Appendix 1. An information processing system comprising: a space rendering processor that renders a virtual space:
- a medium rendering processor that renders a first mobile medium that is a mobile medium able to move within the virtual space and is associated with each of a plurality of first users and a second mobile medium associated with one or more second users or non-players who are different from the plurality of first users;
- a positioning unit that specifies a position for the first mobile medium and the second mobile medium, respectively, within the virtual space;
- a content processor that provides a plurality of content to the plurality of first users through a plurality of the first mobile mediums using a mode where a content that can be provided varies according to a position within the virtual space based on the positions of the plurality of the first mediums;
- an activity restricting unit that restricts an activity of the plurality of first mobile mediums within the virtual space, which activity relates to the plurality of content;
- a state information processing unit that stores, and associates with the first user, state information representing a state relating to the activity of each of the first mobile mediums within the virtual space; and
- an information providing unit that provides designated information to all or some of the plurality of first users through the second mobile medium based on the state information associated with each of the first users.

Appendix 2. The information processing system according to the first appendix wherein the activity restricting unit restricts the activity based on the state information.

Appendix 3. The information processing system according to appendix 1 or 2 wherein the designated information includes assistance information relating to the provision of the content,
- and the information providing unit provides the assistance information according to an input from the second user based on the input from the second user.

Appendix 4. The information processing system according to appendix 3 wherein the content processor provides a first content in association with one or more first positions within the virtual space, and provides a second content that is different from the first content in association with one or more second positions that are different from the first position within the virtual space,
- the state information processing unit judges whether or not conditions for providing the second content to each of the plurality of first users have been met,
- and the activity restricting unit permits a first user, among the plurality of first users, who has met the conditions for providing the second content, to receive provision of the second content, and the first mobile medium to be moved toward the second position.

Appendix 5. The information processing system according to appendix 4 wherein the state information includes information on whether or not each of the plurality of first users has met the conditions for providing the second content,
- the assistance information includes provision conditions information relating to the conditions for providing the second content,
- and the information providing unit provides the provision conditions information to a first user, among the plurality of first users, who has not met the conditions for providing the second content.

Appendix 6. The information processing system according to appendix 5, also including a conditions processing unit that mitigates the conditions for providing the second content to some of the first users, among the plurality of first users, based on an input from the second user.

Appendix 7. The information processing system according to appendix 5 or 6 wherein the conditions for providing the second content are met in a case where provision of the first content has been received.

Appendix 8. The information processing system according to any one of appendices 4 through 7 wherein, when N is an integer of 3 or more and k is an integer of one or more and N−1 or less,
- the plurality of content, in a relationship where the first content is the kth content that can be provided and the second content is the k+1st content that can be provided, includes content that is the 1st through the Nth content that can be provided to each of the plurality of first users in that order.

Appendix 9. The information processing system according to any one of appendices 5 through 8, also including a first medium processor that moves each of the first mobile mediums within the virtual space based on an input from each of the first users under restrictions according to the activity restricting unit; and a second medium processor that freely moves the second mobile medium within the virtual space based on an input from the second user.

Appendix 10. The information processing system according to appendix 9 wherein the first medium processor moves each of the first mobile mediums within the virtual space according to designated laws that correspond to physical laws in an actual space, and the second medium processor moves the second mobile medium within the virtual space according to the designated laws.

Appendix 11. The information processing system according to any one of appendices 5 through 10, also including a first dialogue processor that enables dialogue through each of the first mobile mediums, the dialogue being between the first user through a communication network based on input from each of the first users, wherein the first dialogue processor determines the first users for whom dialogue is possible based on a position of each of the first mobile mediums.

Appendix 12. The information processing system according to appendix 11 wherein the first dialogue processor also restricts the dialogue between the first users who do not have a designated relationship with the state information more than the dialogue between the first users who do have the designated relationship with the state information based on the state information associated with each of the first users.

Appendix 13. The information processing system according to any one of appendices 5 through 12, wherein the information providing unit includes a second dialogue processor than enables dialogue with each of the first mobile mediums through the second mobile medium, the dialogue being between each of the first users and the second user through a communication network based on input from each of the first users and input from the second user, wherein
the second dialogue processor determines the first users, of the plurality of first users, for whom dialogue with the second user is possible based on the position of each of the first mobile mediums and a position of the second mobile medium,
and the dialogue realized by the second dialogue processor includes the designated information.

Appendix 14. The information processing system according to appendix 13 wherein the second dialogue processor changes the first user for whom dialogue with the second user is possible based on input from the second user.

Appendix 15. The information processing system according to any one of appendices 1 through 14 wherein the state information includes information on whether or not provision of each of the plurality of content has been received,
the system also including a detection processor that detects the first users, of the plurality of first users, who have received provision of a specific content or at least a designated volume of content, of the plurality of content, based on the state information associated with each of the first mobile mediums, and
a role allocating unit that grants at least part of a role relating to the second mobile medium within the virtual space to the first mobile medium associated with the first user detected by the detection processor based on input from the second user.

Appendix 16. The information processing system according to appendix 15, also including a parameter updating unit that updates a value of a parameter associated with the first user based on input for fulfilling the at least part of the role, the input being input from the first user associated with the first mobile medium to which the at least part of the role has been granted.

Appendix 17. A method for processing information using a computer comprising: rendering a virtual space:
rendering mobile media able to move within the virtual space, including a first mobile medium associated with each of a plurality of first users, and a second mobile medium associated with one or more second users who are different from the plurality of first users;
providing a plurality of content to the plurality of first users through the plurality of the first mobile mediums using a mode where a content that can be provided varies based on a position within the virtual space;
restricting an activity relating to the plurality of content, the activity being that of the plurality of first mobile mediums within the virtual space;
storing the state information representing a state relating to the activities of each of the first mobile mediums within the virtual space in association with each of the first users; and
providing designated information to all or part of the plurality of first users through the second mobile medium based on the state information associated with each of the first users.

Appendix 18. An information processing program executed in a computer that: renders a virtual space:
renders mobile media able to move within the virtual space, including a first mobile medium associated with each of a plurality of first users, and a second mobile medium associated with one or more second users who are different from the plurality of first users;
provides a plurality of content to the plurality of first users through the plurality of the first mobile mediums using a mode where a content that can be provided varies based on a position within the virtual space;
restricts an activity relating to the plurality of content, the activity being that of the plurality of first mobile mediums within the virtual space;
stores the state information representing a state relating to the activities of each of the first mobile mediums within the virtual space in association with each of the first users; and
provides designated information to all or part of the plurality of first users through the second mobile medium based on the state information associated with each of the first users.

The invention claimed is:
1. An information processing system, comprising:
processing circuitry configured to
render a virtual space;
render each mobile medium associated with each user, each mobile medium being able to move within the virtual space;
associate designated movement authority information to a first mobile medium, the first mobile medium being associated with a first user based on a first input from the first user;
switch the designated movement authority information from association with the first mobile medium to association with a second mobile medium, the second mobile medium being associated with a second user different from the first user and based on a second input from the first user;
judge, based on the designated movement authority information, whether to allow one mobile medium to move toward a designated position within the virtual space; and
perform (1) or (2), wherein
to perform (1), the processing circuitry is configured to
generate first authentication information based on the second input from the first user, the first authentication information being image-recognizable, and
render the first authentication information within the virtual space associated with the first mobile medium, and
to perform (2), the processing circuitry is configured to
render a designated medium arranged at an entrance to the designated position, and
judge whether or not the designated movement authority information is associated with the one mobile medium based on an input from a third user associated with the designated medium.

2. The information processing system according to claim 1, wherein the processing circuitry is further configured to generate an image of a part of the virtual space within a field of view associated with each of the mobile mediums based on a position of each of the mobile mediums within the virtual space, send the generated image to a user terminal associated with each of the mobile mediums, and in a case that information, is received from one user terminal displaying the image, indicating that the first authentication information is recognized by an image processing performed by the one user terminal on the image, switch an association of the designated movement authority information to the mobile medium associated with the one user terminal.

3. The information processing system according to claim 2, wherein the processing circuitry renders the first authentication information at a position associated with the first mobile medium.

4. The information processing system according to claim 1, wherein the processing circuitry is further configured to, in a case that the designated movement authority information has been associated with one mobile medium and authentication has been established based on second authentication information that is different from the first authentication information, permit the one mobile medium to move toward the designated position.

5. The information processing system according to claim 4, wherein the second authentication information includes input from the second user.

6. The information processing system according to claim 1, wherein the processing circuitry is further configured to, in a case that information indicating that the third user has judged that the designated movement authority information has been associated with the one mobile medium is received from the third user, judge that the designated movement authority information is associated with the one mobile medium.

7. The information processing system according to claim 1, wherein the processing circuitry is further configured to render the one mobile medium using a different mode according to whether or not the designated movement authority information is associated with the one mobile medium.

8. The information processing system according to claim 1, wherein the processing circuitry is further configured to enable a dialogue between users through a communication network based on the input from the third user and on input from a user associated with the one mobile medium.

9. The information processing system according to claim 1, wherein the processing circuitry is further configured to update a value of a parameter associated with the third user based on a service or product within the virtual space, the service or product to be provided to the one mobile medium based on the input from the third user.

10. The information processing system according to claim 1, wherein a user associated with a mobile medium positioned in the designated position can receive provision of a designated service or a designated product, and the first input corresponds to a consumption of money or a medium having monetary value.

11. The information processing system according to claim 1, wherein the first input, in a case that the first mobile medium is in an entrance vicinity relating to the designated position, is made possible or valid, and the second input, in the case that the first mobile medium is in an entrance vicinity relating to the designated position, is made possible or valid.

12. The information processing system according to claim 1, wherein the designated movement authority information is invalidated in a case that movement of the one mobile medium toward the designated position is realized.

13. An information processing method executed by processing circuitry, the information processing method comprising:

rending a virtual space;

rendering a mobile medium associated with a user, the mobile medium being able to move within the virtual space;

associating designated movement authority information to a first mobile medium, the first mobile medium being associated with a first user based on a first input from the first user;

switching the designated movement authority information from association with the first mobile medium to association with a second mobile medium, the second mobile medium being associated with a second user different from the first user and based on a second input from the first user;

judging, based on the designated movement authority information, whether to allow one mobile medium to move toward a designated position within the virtual space; and performing (1) or (2), wherein performing (1) includes:

generating first authentication information based on the second input from the first user, the first authentication information being image-recognizable, and rendering the first authentication information within the virtual space associated with the first mobile medium, and performing (2) includes:

rendering a designated medium arranged at an entrance to the designated position, and judging whether or not the designated movement authority information is associated with the one mobile medium based on an input from a third user associated with the designated medium.

14. The information processing method according to claim 13, further comprising:

generating an image of a part of the virtual space within a field of view associated with each of the mobile mediums based on a position of each of the mobile mediums within the virtual space;

sending the generated image to a user terminal associated with each of the mobile mediums; and in a case that information, is received from one user terminal displaying the image, indicating that the first authentication information is recognized by an image processing performed by the one user terminal on the image, switching an association of the designated movement authority information to the mobile medium associated with the one user terminal.

15. The information processing method according to claim 14, further comprising rendering the first authentication information at a position associated with the first mobile medium.

16. The information processing method according to claim 13, further comprising, in a case that the designated movement authority information has been associated with one mobile medium and authentication has been established based on second authentication information that is different from the first authentication information, permitting the one mobile medium to move toward the designated position.

17. A non-transitory computer readable medium storing computer executable instructions which, when executed by processing circuitry, cause the processing circuitry to:
   render a virtual space;
   render a mobile medium associated with a user, the mobile medium being able to move within the virtual space;
   associate designated movement authority information to a first mobile medium, the first mobile medium being associated with a first user based on a first input from the first user;
   switch the designated movement authority information from association with the first mobile medium to association with a second mobile medium, the second mobile medium being associated with a second user different from the first user and based on a second input from the first user;
   judge, based on the designated movement authority information, whether to allow one mobile medium to move toward a designated position within the virtual space; and
   perform (1) or (2), wherein
   to perform (1), the processing circuitry is configured to
      generate first authentication information based on the second input from the first user, the first authentication information being image-recognizable, and
      render the first authentication information within the virtual space associated with the first mobile medium, and
   to perform (2), the processing circuitry is configured to
      render a designated medium arranged at an entrance to the designated position, and
      judge whether or not the designated movement authority information is associated with the one mobile medium based on an input from a third user associated with the designated medium.

* * * * *